US011979709B1

(12) United States Patent
Zhang et al.

(10) Patent No.: US 11,979,709 B1
(45) Date of Patent: May 7, 2024

(54) EARPHONES

(71) Applicant: SHENZHEN SHOKZ CO., LTD., Guangdong (CN)

(72) Inventors: Lei Zhang, Shenzhen (CN); Peigeng Tong, Shenzhen (CN); Guolin Xie, Shenzhen (CN); Yongjian Li, Shenzhen (CN); Jiang Xu, Shenzhen (CN); Tao Zhao, Shenzhen (CN); Duoduo Wu, Shenzhen (CN); Ao Ji, Shenzhen (CN); Xin Qi, Shenzhen (CN)

(73) Assignee: SHENZHEN SHOKZ CO., LTD., Shenzhen (CN)

( * ) Notice: Subject to any disclaimer, the term of this patent is extended or adjusted under 35 U.S.C. 154(b) by 0 days.

(21) Appl. No.: 18/515,303

(22) Filed: Nov. 21, 2023

Related U.S. Application Data

(63) Continuation of application No. PCT/CN2023/083544, filed on Mar. 24, 2023.

(30) Foreign Application Priority Data

Oct. 28, 2022 (CN) ......................... 202211336918.4
Dec. 1, 2022 (CN) ......................... 202223239628.6
(Continued)

(51) Int. Cl.
*H04R 1/10* (2006.01)
*H04R 1/08* (2006.01)
(Continued)

(52) U.S. Cl.
CPC ........... *H04R 1/342* (2013.01); *H04R 1/1008* (2013.01); *H04R 1/105* (2013.01); *H04R 1/1075* (2013.01);
(Continued)

(58) Field of Classification Search
CPC . H04R 1/02; H04R 1/08; H04R 1/083; H04R 1/105; H04R 1/1016; H04R 1/1075;
(Continued)

(56) References Cited

U.S. PATENT DOCUMENTS 11,140,469 B1 * 10/2021 Miller ...................... H04R 1/08
2007/0009133 A1 1/2007 Gerkinsmeyer
(Continued)

FOREIGN PATENT DOCUMENTS

CN 110958526 A 4/2020
CN 212909891 U 4/2021
(Continued)

OTHER PUBLICATIONS

International Search Report in PCT/CN2023/083544 dated Jul. 12, 2023, 7 pages.
Written Opinion in PCT/CN2023/083544 dated Jul. 12, 2023, 9 pages.

*Primary Examiner* — Thang V Tran
(74) *Attorney, Agent, or Firm* — METIS IP LLC

(57) ABSTRACT

An earphone, including a sound production component; an ear-hook configured to place the sound production component near an ear canal without blocking an opening of the ear canal, at least a portion of the sound production component extends into a concha cavity; and a microphone assembly including a first microphone and a second microphone disposed in the sound production component or the ear hook, the sound production component or the ear hook includes a first sound hole and a second sound hole corresponding to the first microphone and the second microphone, respectively; wherein a projection of the first sound hole on a sagittal plane and a projection of the second sound hole on the sagittal plane have a first distance, a ratio of the first
(Continued)

distance to a size of a projection of the sound production component on the sagittal plane along a major axis direction is 0.7-1.2.

19 Claims, 20 Drawing Sheets

(30) Foreign Application Priority Data

Dec. 30, 2022 (WO) ................ PCT/CN2022/144339
Mar. 2, 2023 (WO) ................ PCT/CN2023/079409

(51) Int. Cl.
*H04R 1/34* (2006.01)
*H04R 25/00* (2006.01)

(52) U.S. Cl.
CPC ........ *H04R 25/607* (2019.05); *H04R 2460/11* (2013.01)

(58) Field of Classification Search
CPC .... H04R 1/345; H04R 1/1066; H04R 1/1058; H04R 1/222; H04R 2460/11; H04R 3/005; H04R 5/0335; H04R 25/60; H04R 25/607; H05R 1/1008
See application file for complete search history.

(56) References Cited

U.S. PATENT DOCUMENTS

| | | | | |
|---|---|---|---|---|
| 2010/0260364 | A1* | 10/2010 | Merks | G10L 25/78 381/328 |
| 2011/0288860 | A1* | 11/2011 | Schevciw | G10L 25/78 704/E15.039 |
| 2016/0134957 | A1 | 5/2016 | Jentz et al. | |
| 2020/0196062 | A1 | 6/2020 | Zhang | |
| 2020/0322712 | A1 | 10/2020 | Williams et al. | |
| 2022/0386006 | A1* | 12/2022 | Meyberg Guzman | H04R 25/407 |
| 2023/0063283 | A1* | 3/2023 | Zheng | H04R 1/406 |
| 2023/0130211 | A1 | 4/2023 | Li et al. | |
| 2023/0336925 | A1* | 10/2023 | Xiao | H04R 25/407 |

FOREIGN PATENT DOCUMENTS

| | | | |
|---|---|---|---|
| CN | 113542956 | A | 10/2021 |
| CN | 113556638 | A | 10/2021 |
| CN | 113573215 | A | 10/2021 |
| CN | 114286228 | A | 4/2022 |
| CN | 114286236 | A | 4/2022 |
| CN | 114286242 | A | 4/2022 |
| CN | 216217487 | U | 4/2022 |
| CN | 115175069 | A | 10/2022 |
| JP | 2015126267 | A | 7/2015 |

* cited by examiner

EARPHONES

CROSS REFERENCE TO RELATED APPLICATIONS

This application is a continuation of International Application No. PCT/CN2023/083544, filed on Mar. 24, 2023, which claims the priority of Chinese application No. 202211336918.4 filed on Oct. 28, 2022, Chinese application No. 202223239628.6 filed on Dec. 1, 2022, PCT application No. PCT/CN2022/144339, filed on Dec. 30, 2022, and PCT application No. PCT/CN2023/079409, filed on Mar. 2, 2023, the entire contents of which are incorporated herein by reference.

TECHNICAL FIELD

The present disclosure relates to the field of acoustic technology, and in particular, to earphones.

BACKGROUND

With the development of acoustic output technology, acoustic devices (e.g., earphones) have been widely used in people's daily life, which may be used in conjunction with electronic devices such as mobile phones and computers to provide users with an auditory feast. In general, the earphone is provided with a microphone to pick up the voice of a user. A sound collection effect of the microphone depends on how the microphone is disposed on the earphone. How to improve the sound pickup effect of the microphone while ensuring the sound collection effect of the earphone output is an urgent problem to be solved.

SUMMARY

According to one of the embodiments of the present disclosure, an earphone is provided, including: a sound production component; an ear hook configured to place the sound production component near an ear canal of a user without blocking an opening of the ear canal, at least a portion of the sound production component extending into a concha cavity of the user; and a microphone assembly, at least including a first microphone and a second microphone, the first microphone or the second microphone being disposed in the sound production component or the ear hook, the sound production component or the ear hook including a first sound hole and a second sound hole corresponding to the first microphone and the second microphone, respectively; wherein a projection of the first sound hole on a sagittal plane and a projection of the second sound hole on the sagittal plane have a first distance, a ratio of the first distance to a dimension of a first projection of the sound production component on the sagittal plane along a major axis direction is 0.7-1.2.

According to one embodiment of the present disclosure, an earphone is provided, including a sound production component; an ear hook configured to place the sound production component near an ear canal of a user without blocking an opening of the ear canal, at least a portion of the sound production component covers an antihelix region of the user; and a microphone assembly, at least including a first microphone and a second microphone, the first microphone or the second microphone being disposed in the sound production component or the ear hook, the sound production component or the ear hook including a first sound hole and a second sound hole corresponding to the first microphone and the second microphone, respectively; wherein a projection of the first sound hole on a sagittal plane and a projection of the second sound hole on the sagittal plane have a first distance, a ratio of the first distance to a dimension of a first projection of the sound production component on the sagittal plane along a major axis direction is 0.7-1.2.

BRIEF DESCRIPTION OF THE DRAWINGS

The present disclosure is further illustrated in terms of exemplary embodiments, and these exemplary embodiments are described in detail with reference to the drawings. These embodiments are not limiting. In these embodiments, the same number indicates the same structure, wherein.

DETAILED DESCRIPTION

Figure 1:
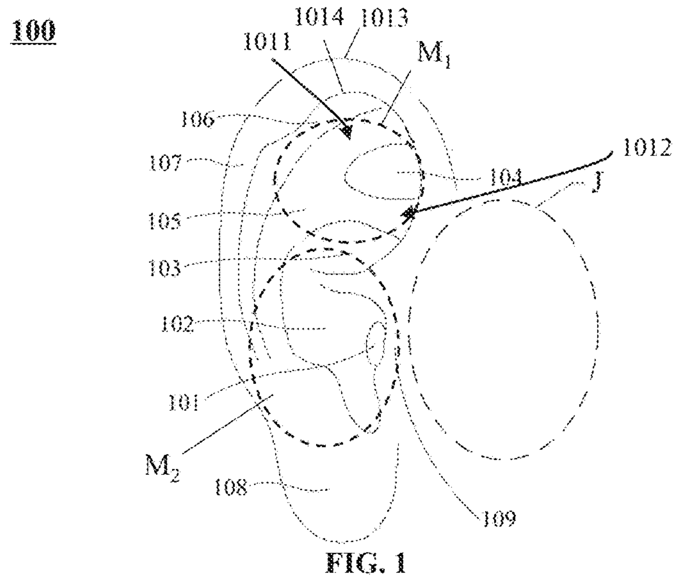
FIG. 1 is a schematic diagram illustrating an exemplary ear according to some embodiments of the present disclosure.

In order to more clearly illustrate the technical solutions related to the embodiments of the present disclosure, a brief introduction of the drawings referred to the description of the embodiments is provided below. Obviously, the drawings described below are only some examples or embodiments of the present disclosure. Those having ordinary skills in the art, without further creative efforts, may apply the present disclosure to other similar scenarios according to these drawings. Unless obviously obtained from the context or the context illustrates otherwise, the same numeral in the drawings refers to the same structure or operation.

FIG. 1 is a schematic diagram illustrating an exemplary ear according to some embodiments of the present disclosure. Referring to FIG. 1, an ear 100 may include an external ear canal 101, a concha cavity 102, a cymba conchae 103, a triangular fossa 104, an antihelix 105, a scapha 106, a helix 107, an earlobe 108, a crus of helix 109, an outer contour 1013, and an inner contour 1014. It should be noted that, for the convenience of description, an upper antihelix crus 1011, a lower antihelix crus 1012, and the antihelix 105 are collectively referred to as the antihelix region in the embodiments of the present disclosure. In some embodiments, an acoustic device may be stably worn through one or more parts of the ear 100 supporting the acoustic device. In some embodiments, the external ear canal 101, the concha cavity 102, the cymba conchae 103, and the triangular fossa 104 may have a certain depth and volume in a three-dimensional space, which may be used to meet the wearing requirements of the acoustic device. For example, the acoustic device (e.g., the earphone) may be worn in the external ear canal 101. In some embodiments, the acoustic device may be worn through other parts of the ear 100 than the external ear canal 101. For example, the acoustic device may be worn through the cymba conchae 103, the triangular fossa 104, the antihelix 105, the scapha 106, or the helix 107, or a combination thereof. In some embodiments, the earlobe 108 of the user and other parts may be further used to improve the wearing comfort and reliability of the acoustic device. By using other parts of the ear 100 than the external ear canal 101 to realize the wearing of the acoustic device and the transmission of sound, the external ear canal 101 of the user may be "freed". When the user wears the acoustic device (earphone), the acoustic device may not block the external ear canal 101 of the user. The user may receive both the sound from the acoustic device and the sound from the environment (e.g., sound of a whistle, sound of a vehicle bell, sound of people around, sound of traffic guidance, etc.), thereby reducing the probability of traffic accidents. In some embodiments, the acoustic device may be designed into a structure adapted to the ear 100 according to a structure of the ear 100, to realize the wearing of the sound production component of the acoustic device at different positions of the ear. For example, when the acoustic device is the earphone, the earphone may include a suspension structure (e.g., an ear hook) and a sound production component. The sound production component and the suspension structure may be physically connected. The suspension structure may be adapted to a shape of the auricle, to place the whole or a portion of the sound production component on a front side (e.g., a region J enclosed by dotted lines in FIG. 1) of the crus of helix 109. As another example, when the user wears the earphone, the whole or a portion the sound production component may be in contact with an upper part (e.g., a position of one or more of the crus of helix 109, the cymba conchae 103, the triangular fossa 104, the antihelix 105, the scapha 106, the helix 107, etc.) of the external ear canal 101. As another example, when the user wears the earphone, the whole or a portion of the sound production component may be located in a cavity (e.g., a region M1 including at least the cymba conchae 103 and the triangular fossa 104 and a region M2 including at least the concha cavity 102 enclosed by the dotted lines in FIG. 1) formed by one or more parts (e.g., the concha cavity 102, the cymba conchae 103, the triangular fossa 104, etc.) of the ear.

Different users may have individual differences, resulting in different shapes, sizes and other dimensional differences in the ears. For ease of description and understanding, unless otherwise specified, the present disclosure mainly takes to an ear model with a "standard" shape and size for reference, and further describes how the acoustic device in different embodiments is worn on the ear model. For example, a simulator containing the head and (left and right) ears thereof prepared based on ANSI: S3.36, S3.25 and IEC: 60318-7 standards, such as GRAS KEMAR, HEAD Acoustics, B&K 4128 series, or B&K 5128 series, may be used as a reference for wearing the acoustic device, to present a situation that most users normally wear the acoustic device. Taking GRAS KEMAR as an example, an ear simulator may be any one of GRAS 45AC, GRAS 45BC, GRAS 45CC, or GRAS 43AG. Taking HEAD Acoustics as an example, an ear simulator may be any one of HMS II.3, HMS II.3 LN, or HMS II.3LN HEC. It should be noted that the range of data measured in the embodiments of the present disclosure is based on GRAS 45BC KEMAR, but it should be understood that there may be differences between different head models and ear models, and there may be a fluctuation of ±10% in the relevant data range when using other models. Merely by way of example, a reference ear model may have the following relevant features: a size of a projection of an auricle on a sagittal plane in a vertical axis direction may be within a range of 55 mm-65 mm, and a size of the projection of the auricle on the sagittal plane in a sagittal axis direction may be within a range of 45 mm-55 mm. The projection of the auricle on the sagittal plane refers to a projection of an edge of the auricle on the sagittal plane. The edge of the auricle may at least include an outer contour of the helix, a contour of the earlobe, a contour of a tragus, an intertragic notch, an antitragus tip, a notch between an antitragus and the antihelix, etc. Therefore, in the present disclosure, descriptions such as "wearing by the user", "in the wearing state" and "in wearing" refer to that the acoustic device described in the present disclosure is worn on the ear of the simulator. Of course, considering the individual differences of different users, the structure, shape, size, thickness, etc. of one or more parts of the ear 100 may be differentiated according to ears of different shapes and sizes. These differentiated designs may be expressed as that feature parameters of one or more parts (e.g., the sound production component, the ear hook, etc. hereinafter) of the acoustic device may have different ranges of values, to adapt to different ears.

It should be noted that in the fields of medicine and anatomy, three basic planes including the sagittal plane, the coronal plane, and the horizontal plane, and three basic axes including the sagittal axis, the coronal axis, and the vertical axis of a human body may be defined. The sagittal plane refers to a section perpendicular to the ground along front and rear directions of the body, which divides the human body into left and right parts; the coronal plane refers to a section perpendicular to the ground along left and right directions of the body, which divides the human body into front and rear parts; and the horizontal plane refers to a section parallel to the ground along a vertical direction of the body, which divides the human body into upper and lower parts. Correspondingly, the sagittal axis refers to an axis along a front-back direction of the body and perpendicular to the coronal plane, the coronal axis refers to an axis along a left-right direction of the body and perpendicular to the sagittal plane, and the vertical axis refers to an axis along a vertical direction of the body and perpendicular to the horizontal plane. Further, the front side of the ear in the present disclosure refers to a side of the ear facing the facial region of the human body along the sagittal axis direction. A schematic diagram illustrating a front contour of the ear as shown in FIG. 1 may be obtained by observing the ear of the simulator along the coronal axis direction of the human body.

The description of the ear 100 is for illustration purposes only and is not intended to limit the scope of the present disclosure. Those skilled in the art can make various variations and modifications based on the description of the present disclosure. For example, part of the structure of the acoustic device may cover part or all of the external ear canal 101. These variations and modifications are still within the protection scope of the present disclosure.

Figure 2:
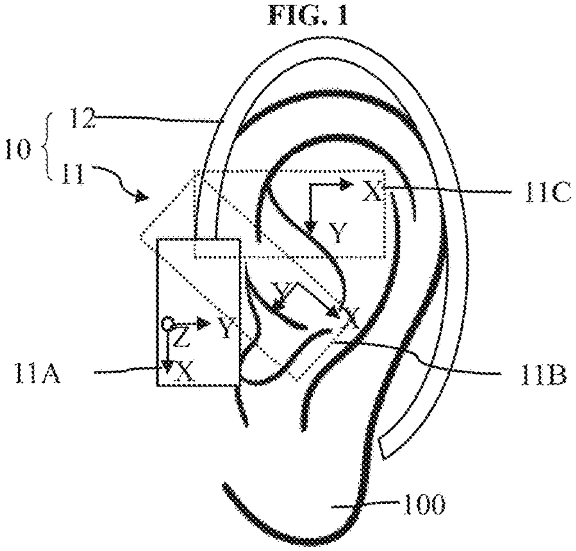
FIG. 2 is a schematic diagram illustrating an exemplary wearing state of an earphone according to some embodiments of the present disclosure.

FIG. 2 is a schematic diagram illustrating an exemplary wearing of an earphone according to some embodiments of the present disclosure. As shown in FIG. 2, the earphone 10 may include a sound production component 11 and a suspension structure 12. In some embodiments, the earphone 10 may enable the sound production component 11 to be worn on a user's body (e.g., the head, neck, or upper torso of the body) through the suspension structure 12. In some embodiments, the suspension structure 12 may be an ear hook. The sound production component 11 may be connected to one end of the ear hook. The ear hook may be set in a shape suitable for the ear of the user. For example, the ear hook may be in an arc structure. In some embodiments, the suspension structure 12 may also be a clamping structure adapted to the auricle of the user, to enable the suspension structure 12 to clamp the auricle of the user. In some embodiments, the suspension structure 12 may include but not limited to the ear hook, an elastic band, etc., so that the earphone 10 may be better hung on the user to prevent from falling during use for the user.

In some embodiments, the sound production component 11 may be worn on the user's body. A loudspeaker may be disposed in the sound production component 11 to produce sound input to the ear of the user 100. In some embodiments, the earphone 10 may be combined with products such as glasses, a headset, a head-mounted display device, an AR/VR helmet, etc. In this case, the sound production component 11 may be suspended or clamped near the ear 100 of the user. In some embodiments, the sound production component 11 may be circular, elliptical, polygonal (regular or irregular), U-shaped, V-shaped, or semicircular, so that the sound production component 11 may be directly hung on the ear 100 of the user.

Referring to FIG. 1 and FIG. 2, in some embodiments, when the user wears the earphone 10, at least a portion of the sound production component 11 may be located in a region J on a front side of a tragus of the ear 100 of the user or regions M1 and M2 on a front outer side of an auricle in FIG. 1. An exemplary description may be given below in conjunction with different wearing positions of the sound production component (11A, 11B, and 11C). It should be noted that the front outer side of the auricle mentioned in the embodiments of the present disclosure refers to the side of the auricle away from the head along the coronal axis direction, and correspondingly, a rear inner side of the auricle refers to the side of the auricle facing the head along the coronal axis direction. In some embodiments, the sound production component 11A may be located on a side of the ear 100 of the user facing the facial region along the sagittal axis direction, i.e., the sound production component 11A may be located on a human facial region J on a front side of the ear 100. Further, a loudspeaker may be disposed inside a housing of the sound production component 11A. At least one sound guiding hole (not shown in FIG. 2) may be disposed on the housing of the sound production component 11A. The sound guiding hole may be disposed on a sidewall of the housing of the sound production component facing or close to the external ear canal 101 of the user. The loudspeaker may output sound to the external ear canal 101 of the user through the sound guiding hole. In some embodiments, the loudspeaker may include a diaphragm. A cavity inside the housing of the sound production component 11 may be at least divided into a front cavity and a rear cavity by the diaphragm. The sound guiding hole may be acoustically coupled with the front cavity. The diaphragm may vibrate to drive the air in the front cavity to vibrate to produce air-conducted sound. The air-conducted sound produced by the front cavity may be transmitted to the outside through the sound guiding hole. In some embodiments, the housing of the sound production component 11 may further include one or more pressure relief holes. The pressure relief hole may be located on a sidewall of the housing adjacent to or opposite to a sidewall where the sound guiding hole is located. The pressure relief hole may be acoustically coupled with the rear cavity. When the diaphragm vibrates, the vibration may also drive the air in the rear cavity to vibrate to produce air-conducted sound. The air-conducted sound produced by the rear cavity may be transmitted to the outside through the pressure relief hole. For example, in some embodiments, the loudspeaker in the sound production component 11A may output sounds with a phase difference (e.g., opposite phases) through the sound guiding hole and the pressure relief hole. The sound guiding hole may be located in a sidewall of the housing of the sound production component 11A facing the external ear canal 101 of the user, and the pressure relief hole may be located on a side of the housing of the sound production component 11 away from the external ear canal 101 of the user. At this time, the housing may act as a baffle for increasing a sound path difference from the sound guiding hole and the pressure relief hole to the external ear canal 101, thereby increasing a sound intensity at the external ear canal 101 while reducing the volume of far-field leakage. In some embodiments, the sound production component 11 may have a major axis direction X and a minor axis direction Y which are perpendicular to a thickness direction Z and orthogonal to each other. The major axis direction X may be defined as a direction (e.g., when a projection shape is a rectangle or an approximate rectangle, the major axis direction may be a length direction of the rectangle or the approximate rectangle) with a maximum extension size in a shape of a two-dimensional projection plane (e.g., a projection of the sound production component 11 on a plane where an outer surface of the sound production component is located, or a projection of the sound production component 11 on the sagittal plane) of the sound production component 11. The minor axis direction Y may be defined as a direction (e.g., when a projection shape is a rectangle or an approximate rectangle, the minor axis direction may be a width direction of the rectangle or the approximate rectangle) in a shape of a projection of the sound production component 11 on the sagittal plane perpendicular to the major axis direction X. The thickness direction Z may be defined as a direction perpendicular to the two-dimensional projection plane, e.g., which is consistent with the coronal axis direction, both pointing to the left and right directions of the body. In some embodiments, when the sound production component 11 is in a tilted state when worn, the major axis direction X and the minor axis direction Y may still be parallel or approximately parallel to the sagittal plane. A certain included angle may be formed between the major axis direction X and the sagittal axis direction, i.e., the major axis direction X may also be tilted accordingly. A certain included angle may be formed between the minor axis direction Y and the vertical axis direction, i.e., the minor axis direction Y may also be tilted, as shown in the wearing state of the sound production component of FIG. 2. In some embodiments, the whole or a portion of the sound production component 11B may extend into the concha cavity, i.e., a projection of the sound production component 11B on the sagittal plane and a projection of the concha cavity on the sagittal plane may have an overlapping part. The specific description regarding the sound production component 11B may be found elsewhere in the present disclosure (e.g., FIG. 3 and corresponding content thereof). In some embodiments, the sound production component 11 may also be in a horizontal state or approximately horizontal state in the wearing state, as shown in the sound production component 11C of FIG. 2. The major axis direction X may be consistent or approximately consistent with the sagittal axis direction, both pointing to the front-back direction of the body. The minor axis direction Y may be consistent or approximately consistent with the direction of the vertical axis, both pointing to the up-down direction of the body. It should be noted that in the wearing state, the sound production component 11C in the approximately horizontal state may mean that an included angle between the major axis direction X of the sound production component 11C shown in FIG. 2 and the sagittal axis may be within a specific range (e.g., not greater than 20°). In addition, the wearing position of the sound production component may not be limited to the sound production component 11A, the sound production component 11B, and the sound production component 11C in FIG. 2. The wearing position of the sound production component 11 may meet the region J, the region M1, or the M2 in FIG. 1. For example, the whole or a portion of the sound production component 11 may be located in the region J enclosed by the dotted lines in FIG. 1. As another example, the whole or a portion of the sound production component may be in contact with the position of one or more parts of the ear 100 such as the crus of helix 109, the cymba conchae 103, the triangular fossa 104, the antihelix 105, the scapha 106, and the helix 107. As another example, the whole or a portion of the sound production component 11 may be located in a cavity (e.g., the region M1 enclosed by the dotted lines in FIG. 1 that includes at least the cymba conchae 103 and the triangular fossa 104, and the region M2 enclosed by the dotted lines in FIG. 1 that includes at least the concha cavity 102) formed by one or more parts of the ear 100 (e.g., the concha cavity 102, the cymba conchae 103, the triangular fossa 104, etc.).

To improve the stability of the earphone 10 in the wearing state, the earphone 10 may adopt any one or a combination of the following methods. First, at least a portion of the suspension structure 12 may be configured as a profiling structure that fits at least one of the rear inner side of the auricle and the head, to increase a contact area between the suspension structure 12 and the ear and/or the head, thereby increasing the resistance preventing the acoustic device 10 from falling off from the ear. Second, at least a portion of the suspension structure 12 may be set as an elastic structure, so that the suspension structure 12 may have a certain amount of deformation in the wearing state, to increase the positive pressure of the suspension structure 12 on the ear and/or the head, thereby increasing the resistance preventing the earphone 10 from falling off from the ear. Third, at least a portion of the suspension structure 12 may be set to abut against the ear and/or the head in the wearing state, to form a reaction force that presses the ear and make the sound production component 11 press against the front outer side (e.g., the regions M1 and M2 shown in FIG. 1) of the auricle, thereby increasing the resistance preventing the earphone 10 from falling off from the ear. Fourth, the sound production component 11 and the suspension structure 12 may be set to clamp the antihelix region, the region of the concha cavity, etc. from the front outer side and the rear inner side of the auricle in the wearing state, thereby increasing the resistance preventing the earphone 10 from falling off from the ear. Fifth, the sound production component 11 or a structure connected thereto may be arranged to at least partially extend into cavities such as the concha cavity 102, the cymba conchae 103, the triangular fossa 104, and the scapha 106, thereby increasing the resistance preventing the earphone 10 from falling off from the ear.

Figure 3:
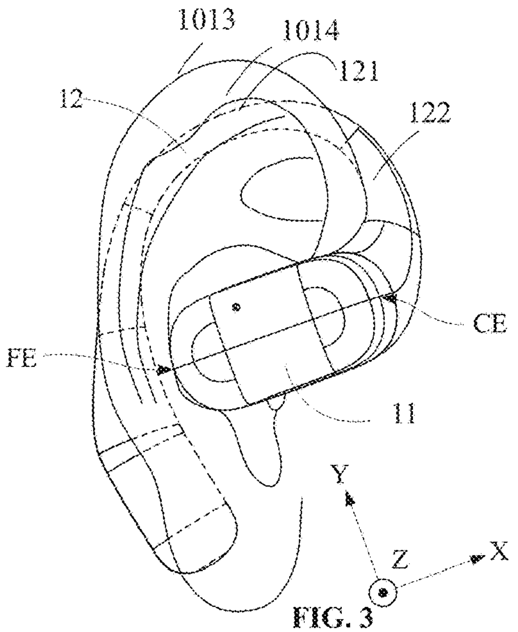
FIG. 3 is a schematic diagram illustrating a wearing process that a sound production component of an earphone extends into a cavity of auricular concha according to some embodiments of the present disclosure.

Exemplarily, referring to FIG. 3, in the wearing state, a rear side FE (also referred to as a free end) of the sound production component 11 may extend into the concha cavity. In some embodiments, the sound production component 11 and the suspension structure 12 may be configured to clamp the ear region from the front and rear sides of the ear region corresponding to the concha cavity, thereby increasing the resistance preventing the earphone 10 from falling off from the ear, and further improving the stability of the earphone 10 in the wearing state. For example, the rear side FE of the sound production component may be pressed in the concha cavity in the thickness direction Z. As another example, the rear side FE may abut against the concha cavity (e.g., abut against an inner wall of the concha cavity facing the rear side FE) in the major axis direction X and/or the minor axis direction Y. It should be noted that the rear side FE of the sound production component 11 refers to an end of the sound production component 11 opposite to a fixed end connected to the suspension structure 12, which is also referred to as the free end. The sound production component 11 may be a regular or irregular structure. An exemplary description is given to further illustrate the rear side FE of the sound production component 11. For example, when the sound production component 11 is a cuboid structure, an end wall of the sound production component 11 may be a plane, and the rear side FE of the sound production component 11 may be an end sidewall opposite to the fixed end connected to the suspension structure 12 in the sound production component 11. As another example, when the sound production component 11 is a sphere, an ellipsoid, or an irregular structure, the rear side FE of the sound production component 11 may be a specific region away from the fixed end obtained by cutting the sound production component 11 along a Y-Z plane (a plane formed by the minor axis direction Y and the thickness direction Z). A ratio of a size of the specific region along the major axis direction X to the size of the sound production component along the major axis direction X may be within a range of 0.05-0.2.

Figure 4:
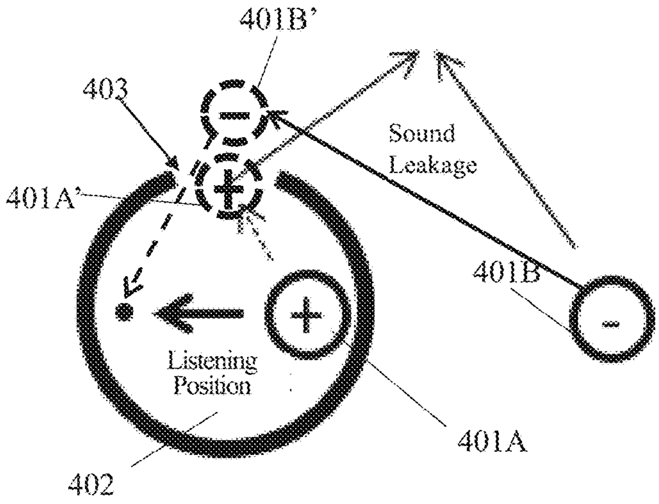
FIG. 4 is a schematic diagram illustrating a quasi-cavity structure acoustic model according to some embodiments of the present disclosure.

By extending at least a portion of the sound production component 11 into the concha cavity, the listening volume at the listening position (e.g., at the opening of the ear canal), especially the listening volume at the middle and low frequencies, may be improved, while still maintaining good effect of far-field sound leakage cancellation. Merely by way of example, when the whole or a portion of the sound production component 11 extends into the concha cavity 102, the sound production component 11 and the concha cavity 102 may form a structure similar to a cavity (hereinafter referred to as a quasi-cavity structure). In the embodiments of the disclosure, the quasi-cavity structure may be understood as a semi-closed structure enclosed by the sidewall of the sound production component 11 and the concha cavity 102. The semi-closed structure may make the listening position (e.g., the opening of the ear canal) not completely sealed off from the external environment, but have a leakage structure (e.g., an opening, a gap, a tube, etc.) in acoustic communication with the external environment. When the user wears the earphone 10, one or more sound guiding holes may be disposed on a side of the housing of the sound production component 11 near or facing the ear canal of the user. One or more pressure relief holes may be disposed on other sidewalls (e.g., sidewalls away from the ear canal of the user) of the housing of the sound production component 11. The sound guiding hole may be acoustically coupled with a front cavity of the earphone 10, and the pressure relief hole may be acoustically coupled with a rear cavity of the earphone 10. Taking the sound production component 11 including one sound guiding hole and one pressure relief hole as an example, the sound output from the sound guiding hole and the sound output from the pressure relief hole may be approximately regarded as two sound sources. Sound phases of the two sound sources may be opposite to form a dipole. Inner walls corresponding to the sound production component 11 and the concha cavity 102 may form the quasi-cavity structure, wherein the sound source corresponding to the sound guiding hole may be located in the quasi-cavity structure, and the sound source corresponding to the pressure relief hole may be located outside the quasi-cavity structure, forming an acoustic model shown in FIG. 4. As shown in FIG. 4, the quasi-cavity structure 402 may include a listening position and at least one sound source 401A. The "include" here may mean that at least one of the listening position and the sound source 401A is located inside the quasi-cavity structure 402, and may also mean that at least one of the listening position and the sound source 401A is located at an inner edge of the quasi-cavity structure 402. The listening position may be equivalent to the opening of the ear canal, an acoustic reference point of the ear, such as ERP, DRP, etc., or an entrance structure leading to the listener, etc. The sound source 401B may be located outside the quasi-cavity structure 402. The sound sources 401A and 401B with opposite phases may form a dipole. The dipole may respectively radiate sound to the surrounding space and produce the phenomenon of interference and cancellation of sound waves, thereby realizing the effect of sound leakage cancellation. As the sound path difference between the two sounds is relatively large at the listening position, the effect of sound cancellation may be relatively insignificant, and a relatively large sound may be heard at the listening position than at other positions. Specifically, as the sound source 401A is surrounded by the quasi-cavity structure 402, most of the sound radiated from the sound source 401A may reach the listening position through direct radiation or reflection. In contrast, most of the sound radiated from the sound source 401A may not reach the listening position without the quasi-cavity structure 402. Therefore, the arrangement of the quasi-cavity structure 402 may significantly increase the sound volume reaching the listening position. Meanwhile, only a small part of anti-phase sound radiated from an anti-phase sound source 401B outside the quasi-cavity structure 402 may enter the quasi-cavity structure 402 through the leakage structure 403 of the quasi-cavity structure 402. This may be equivalent to generating a secondary sound source 401B' at the leakage structure 403, of which the intensity may be significantly smaller than the sound source 401B and also be significantly smaller than the sound source 401A. The sound produced by the secondary sound source 401B' may have a weak anti-phase cancellation effect on the sound source 401A in the cavity, which may significantly increase the listening volume at the listening position. For sound leakage, the sound source 401A may radiate sound to the outside through the leakage structure 403 of the cavity, which may be equivalent to generating the secondary sound source 401A' at the leakage structure 402. As almost all the sound radiated by the sound source 401A comes from the leakage structure 403, and a scale of the quasi-cavity structure 402 is much smaller than the spatial scale of evaluating sound leakage (the difference is at least one order of magnitude), it may be considered that the intensity of the secondary sound source 401A' may be equivalent to that of the sound source 401A. For the external space, the sound cancellation effect produced by the secondary sound source 401A' and the sound source 401B may be equivalent to the sound cancellation effect produced by the sound source 401A and the sound source 401B. That is to say, a considerable sound leakage reduction effect may still be maintained under the quasi-cavity structure.

Figure 5:
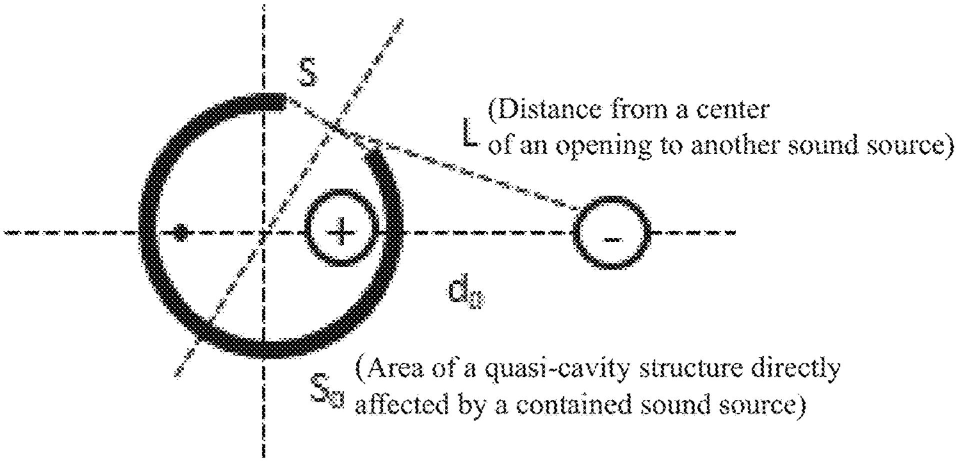
FIG. 5 is a schematic diagram illustrating a quasi-cavity structure according to some embodiments of the present disclosure.
Figure 6:
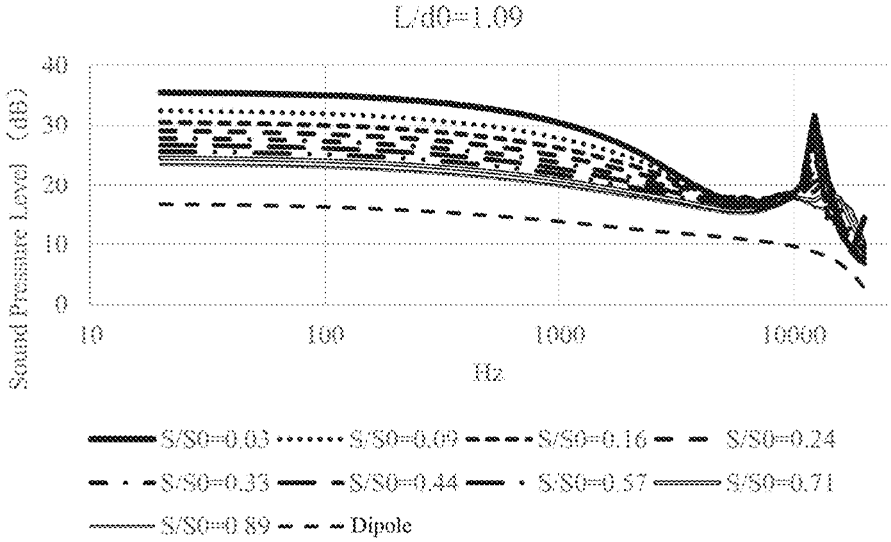
FIG. 6 is a curve diagram illustrating an audibility index of a quasi-cavity structure having leakage structures of different sizes according to some embodiments of the present disclosure.

In a specific application scenario, an outer wall surface of the housing of the sound production component 11 may usually be a plane or a curved surface, while a contour of the concha cavity of the user may be an uneven structure. By extending a portion or the whole of the sound production component 11 into the concha cavity, the sound production component 11 and the contour of the concha cavity may form the quasi-cavity structure that communicates with the outside. Further, the sound guiding hole may be arranged on the housing of the sound production component facing the opening of the ear canal of the user and near the edge of the concha cavity, and the pressure relief hole may be arranged at a position on the sound production component 11 deviating from or away from the opening of the ear canal. In such cases, the acoustic model shown in FIG. 4 may be obtained, so as to improve the listening volume at the opening of the ear canal when the user wears the earphone, and reduce the far-field leakage. As described above, when the user wears the earphone 10, at least a portion of the sound production component 11 may extend into the concha cavity of the user, forming the acoustic model shown in FIG. 4. The outer wall surface of the housing of the sound production component 11 may usually be the plane or the curved surface, and the contour of the concha cavity of the user may be the uneven structure. When the portion of the whole of the sound production component 11 extends into the concha cavity, a gap may be formed since the sound production component 11 cannot closely fit with the concha cavity. The gap may correspond to the leakage structure 403 in FIG. 4. FIG. 5 is a schematic diagram illustrating a quasi-cavity structure according to some embodiments of the present disclosure. FIG. 6 is a diagram illustrating audibility indexes of a quasi-cavity structure having leakage structures of different sizes according to some embodiments of the present disclosure. As shown in FIG. 5, an opening area of the leakage structure on the quasi-cavity structure may be represented as S, and an area of the quasi-cavity structure directly affected by a contained sound source (e.g., "+" shown in FIG. 5) may be represented as S0. The "directly affected" here means that the sound emitted by the contained sound source may directly acoustically act on a wall of the quasi-cavity structure without passing through the leakage structure. A distance between two sound sources is do, and a distance from a center of an opening of the leakage structure to another sound source (e.g., "−" in FIG. 5) is L. As shown in FIG. 6, keeping $L/d_0=1.09$ constant, the larger the relative opening S/S0, the smaller the listening index. This is because the larger the relative opening, the more sound components that the contained sound source radiates directly outward, and the less sound reaching the listening position, which causes the listening volume to decrease with the increase of the relative opening, thereby resulting in the decrease of the listening index. It may be inferred that the larger the opening, the lower the listening volume at the listening position.

Figure 7:
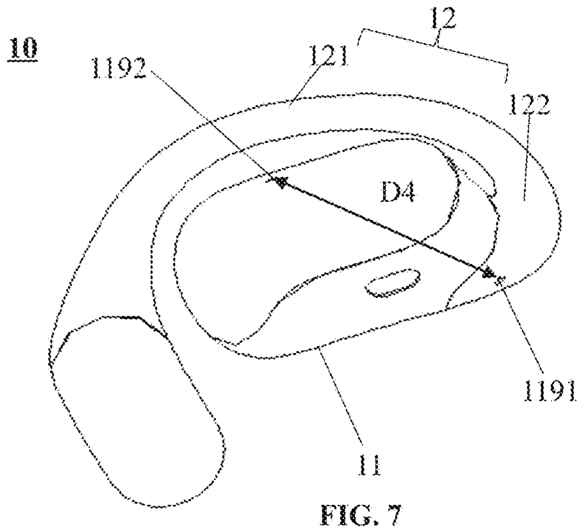
FIG. 7 is a schematic diagram illustrating an exemplary structure of an earphone according to some embodiments of the present disclosure.

FIG. 7 is a schematic diagram illustrating an exemplary wearing of an earphone according to some embodiments of the present disclosure. Referring to FIG. 7, the earphone 10 may include a sound production component 11 and the suspension structure 12. In some embodiments, the sound production component 11 of the earphone may include a transducer and a housing for containing the transducer. The transducer may be an element capable of receiving an electrical signal and converting the electrical signal into a sound signal for output. In some embodiments, by frequency, types of the transducer may include low frequency (e.g., 30 Hz-150 Hz) loudspeakers, medium and low frequency (e.g., 150 Hz-500 Hz) loudspeakers, medium and high frequency (e.g., 500 Hz-5 kHz) loudspeakers, high frequency (e.g., 5 kHz-16 kHz) loudspeakers, full range (e.g., 30 Hz-16 kHz) loudspeakers, or any combination thereof. The low frequency, high frequency, etc. mentioned here may only represent an approximate range of the frequency, and in different application scenarios, there may be different division methods. For example, a frequency division point may be determined, the low frequency may represent a frequency range below the frequency division point, and the high frequency may represent a frequency range above the frequency division point. The frequency division point may be any value within an audible range of the human ear, e.g., 500 Hz, 600 Hz, 700 Hz, 800 Hz, 1000 Hz, or the like.

In some embodiments, the transducer may include a diaphragm. When the diaphragm vibrates, the sounds may be emitted from the front and rear sides of the diaphragm, respectively. In some embodiments, a front cavity (not shown) for sound transmission may be disposed at the front side of the diaphragm in the housing. The front cavity may be acoustically coupled with the sound guiding hole, and the sound from the front side of the diaphragm may be emitted from the sound guiding hole through the front cavity. A rear cavity (not shown) for sound transmission may be disposed at the rear side of the diaphragm in the housing. The rear cavity may be acoustically coupled with the pressure relief hole, and the sound from the rear side of the diaphragm may be emitted from the pressure relief hole through the rear cavity. Referring to FIG. 3, an example of the suspension structure 12 is illustrated here with an ear hook. In some embodiments, the ear hook may include a first portion 121 and a second portion 122 connected in sequence, wherein the first portion may be hung between the rear inner side of the auricle of the user and the head of the user, the second portion may extend toward a front outer side (a side of the auricle away from the head along the coronal axis) of the auricle and connect the sound production component 11, and the sound production component may be located close to the ear canal but not block the opening of the ear canal. In some embodiments, the sound guiding hole may be disposed on the sidewall of the housing of the sound production component 11 facing the auricle, and the sound produced by the transducer may be exported out of the housing and transmitted to the opening of the ear canal of the user.

Referring to FIG. 7, an example of the suspension structure 12 is illustrated here with an ear hook. In some embodiments, the ear hook may include a first portion 121 and a second portion 122 connected in sequence, wherein the first portion 121 may be hung between the rear inner side of the auricle of the user and the head of the user, the second portion 122 may extend toward a front outer side (a side of the auricle away from the head along the coronal axis) of the auricle and connect the sound production component 11, and the sound production component may be located close to the ear canal but not block the opening of the ear canal. In some embodiments, the sound guiding hole may be disposed on the sidewall of the housing of the sound production component 11 toward the auricle, and the sound produced by the transducer may be exported out of the housing and transmitted to the opening of the ear canal of the user. In some embodiments, at least a portion of the sound production component 11 may extend into the concha cavity of the user (e.g., a position of the sound production component 11B relative to the ear as shown in FIG. 2) when the user wears the earphone 10, thereby forming the quasi-cavity structure described herein to increase the listening volume at the opening of the ear canal.

In some embodiments, the earphone 10 may further include a microphone for collecting acoustic signals (such as the user's voice, an ambient sound, etc.). The microphone may be disposed in the ear hook or in the sound production component. The sound production component or the ear hook may include a sound hole in acoustic communication with the microphone. In some embodiments, the earphone 10 may include a microphone assembly, and the microphone assembly may include a first microphone and a second microphone. The first microphone and the second microphone may respectively collect the sound signals such as the user voice, the ambient sound, etc. at corresponding positions thereof. In some embodiments, the first microphone and the second microphone may be disposed in the sound production component 11. In some embodiments, the first microphone and the second microphone may be disposed in the ear hook. In some embodiments, one of the first microphone and the second microphone may be disposed in the ear hook, and the other may be disposed in the sound production component 11. The following will be described in conjunction with FIG. 7 as an example. As shown in FIG. 7, the first microphone (not shown in FIG. 7) is disposed in the ear hook, and a first sound hole 1191 in the acoustic communication with the first microphone is disposed on the ear hook. The second microphone (not shown in FIG. 7) is disposed in the sound production component 11. A second sound hole 1192 is disposed on the sound production component 11 and is in an acoustic communication with the second microphone. When the user wears the earphone, neither the first sound hole 1191 nor the second sound hole 1192 are blocked, so as to receive sound information when the user speaks or the sound information from the outside.

In some embodiments, the first sound hole 1191 and the second sound hole 1192 may be a dual-hole structure. The shape of the first sound hole 1191 may be the same as or different from the shape of the second sound hole 1192.

Figure 8A:
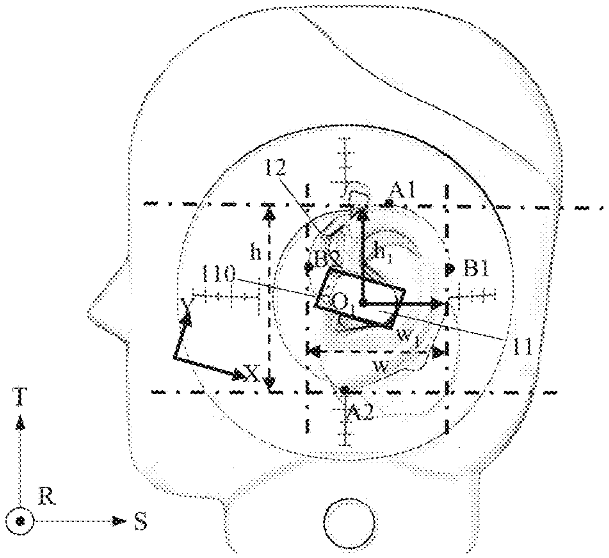
FIG. 8A is a schematic diagram illustrating an exemplary wearing of an earphone according to some embodiments of the present disclosure.
Figure 8B:
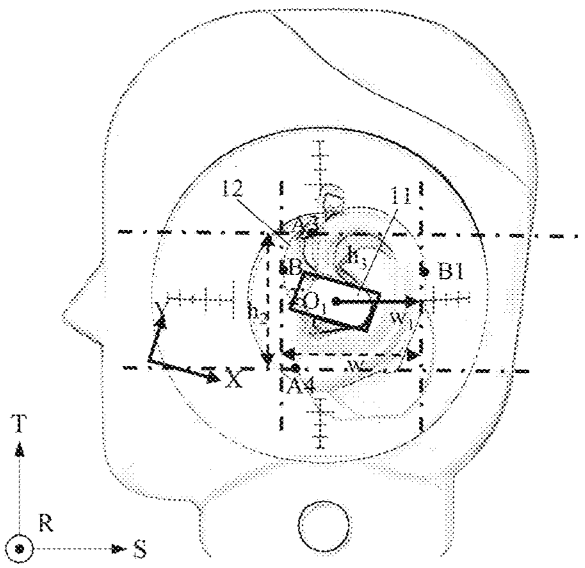
FIG. 8B is a schematic diagram illustrating an exemplary wearing of an earphone according to some embodiments of the present disclosure.

FIGS. 8A and 8B are schematic diagrams illustrating exemplary wearing states of earphones according to some embodiments of the present disclosure. In some embodiments, considering that a relative position of the sound production component 11 and the ear canal of the user (e.g., the concha cavity) may affect a size of the gap formed between the sound production component 11 and the concha cavity. For example, when the rear side FE of the sound production component 11 abuts against the concha cavity, the size of the gap may be relatively small, and when the rear side FE of the sound production component 11 does not abut against the cavity of the auricular concha, the size of the gap may be relatively large. The gap formed between the sound production component 11 and the concha cavity may be referred to as the leakage structure in the acoustic model in FIG. 4. The relative position of the sound production component 11 and the ear canal of the user (e.g., the concha cavity) may affect a count of the leakage structure of the quasi-cavity structure formed by the sound production component 11 and the concha cavity and the opening size of the leakage structure, and the opening size of the leakage structure may directly affect the listening quality. Specifically, the larger the opening of the leakage structure, the more sound components that the sound production component 11 radiate directly outward, and the less sound reaching the listening position. Accordingly, to balance the listening volume of the sound production component 11 and the sound leakage reduction effect to ensure the acoustic output quality of the sound production component 11, the sound production component 11 may be fit as closely as possible to the concha cavity of the user. In some embodiments, a position of the earphone in the wearing state relative to the ear may be illustrated by a position relationship of a centroid of a projection of the sound production component on a sagittal plane (i.e., a first projection) relative to a projection of the auricle on the sagittal plane (i.e., a second projection). Correspondingly, a ratio of a distance $h_1$ between the centroid $O_1$ of a first projection and the highest point of the second projection in the vertical axis direction to the height h of the second projection in the vertical axis direction may be controlled to be within a range of 0.35-0.6, while a ratio of a distance w1 between the centroid $O_1$ of the first projection and an end point of the second projection in the sagittal axis direction to a width w of the second projection in the sagittal axis direction may be controlled to be within a range of 0.4-0.65. Preferably, in some embodiments, to improve the wearing comfort of the earphone while ensuring the acoustic output quality of the sound production component 11, the ratio of the distance $h_1$ between the centroid $O_1$ of the first projection and the highest point of the second projection in the vertical axis direction to the height h of the second projection in the vertical axis direction may be within a range of 0.35-0.55, and the ratio of the distance w1 between the centroid $O_1$ of the first projection and the end point of the second projection in the sagittal axis direction to the width w of the second projection in the sagittal axis direction may be within a range of 0.45-0.68. In some embodiments, the ratio of the distance $h_1$ between the centroid $O_1$ of the first projection and the highest point of the second projection in the vertical axis direction to the height h of the second projection in the vertical axis direction may be within a range of 0.35-0.5, and the ratio of the distance w1 between the centroid $O_1$ of the first projection and the end point of the second projection in the sagittal axis direction to the width w of the second projection in the sagittal axis direction may be within a range of 0.48-0.6. In some embodiments, the shape of the sound production component 11 may be a regular or an irregular three-dimensional shape. Correspondingly, the first projection of the sound production component 11 on the sagittal plane may be a regular or irregular shape. For example, when the shape of the sound production component 11 is a cuboid, a quasi-cuboid shape, or a cylinder, the first projection of the sound production component 11 on the sagittal plane may be a rectangle or a quasi-rectangle shape (e.g., a racetrack shape). Considering that the first projection of the sound production component 11 on the sagittal plane may be the irregular shape, in order to describe the first projection more clearly, the thickness direction Z, the major axis direction X, and the minor axis direction Y may be introduced according to a three-dimensional structure of the sound production component 11, wherein the major axis direction X and the minor axis direction Y are perpendicular, and the thickness direction Z may be perpendicular to a plane formed by the major axis direction X and the minor axis direction Y. Merely by way of example, a determination process of a solid line box 110 may be as follows: two farthest points of the sound production component 11 in the major axis direction X may be determined, and a first line segment and a second line segment parallel to the minor axis direction Y through the two farthest points may be drawn, respectively; two farthest points of the sound production component 11 in the minor axis direction Y may be determined, a third line segment and a fourth line segment parallel to the major axis direction X through the two farthest points may be drawn, and the rectangular region of the solid line box 110 in FIG. 8 may be obtained by a region formed by the above line segments. In some embodiments, the size of the first projection along the major axis direction X is within a range of 18 mm-29 mm, and the size of the first projection along the minor axis direction Y is within a range of 10 mm-15 mm.

The highest point of the second projection may be understood as a point with a largest distance in the vertical axis direction relative to a projection of a certain point on the neck of the user on the sagittal plane among all the projection points, i.e., a projection of the highest point of the auricle (e.g., point A1 in FIG. 8A) on the sagittal plane may be the highest point of the second projection. A lowest point of the second projection may be understood as a point with a smallest distance in the vertical axis direction relative to the projection of a certain point of the neck of the user on the sagittal plane among all the projection points, i.e., a projection of the lowest point of the auricle (e.g., point A2 in FIG. 8A) on the sagittal plane may be the lowest point of the second projection. A height of the second projection in the vertical axis direction may be a difference (height h shown in FIG. 8A) between the point with the largest distance and the point with the smallest distance in the vertical axis direction relative to a projection of a certain point of the neck of the user on the sagittal plane among all the projection points in the second projection, i.e., the distance between point A1 and point A2 in the vertical axis direction T. The end point of the second projection may be understood as a point with the largest distance in the sagittal axis direction relative to the projection of the nose tip of the user on the sagittal plane among all the projection points, i.e., the projection of the end point of the auricle (e.g., point B1 in FIG. 8A) on the sagittal plane may be the end point of the second projection. The front end point of the second projection may be understood as a point with the smallest distance in the sagittal axis direction relative to the projection of the nose tip of the user on the sagittal plane among all projection points, i.e., the projection of the front end point of the auricle (e.g., point B2 shown in FIG. 5) on the sagittal plane may be the front end point of the second projection. The width of the second projection in the sagittal axis direction may be a difference (the width w shown in FIG. 8A) between the point with the largest distance and the point with the smallest distance along the sagittal axis direction relative to the projection of the nose tip on the sagittal plane among all projection points in the second projection, i.e., the distance between the point B1 and the point B2 in the sagittal axis direction S. It should be noted that the projections of structures such as the sound production component 11 or the auricle on the sagittal plane in the embodiments of the present disclosure refer to projections on the sagittal plane along the coronal axis direction R, which is not emphasized in the disclosure hereinafter.

In some embodiments, when the ratio of the distance $h_1$ between the centroid O of the first projection and the highest point of the second projection in the vertical axis direction to the height h of the second projection in the vertical axis direction is within the range of 0.25-0.6, and the ratio of the distance w1 between the centroid O of the first projection and the end point of the second projection in the sagittal axis direction to the width w of the second projection in the sagittal axis direction is within the range of 0.4-0.7, the portion or the whole of the sound production component 11 may substantially cover the antihelix region of the user (e.g., the position in the triangular fossa, the upper anticrus of helix, the lower anticrus of helix, or the position of the antihelix, the position of the sound production component 11C relative to the ear shown in FIG. 2), or the portion or the whole structure of the sound production component 11 may extend into the concha cavity (e.g., the position of the sound production component 11B relative to the ear shown in FIG. 2). In some embodiments, in order to make the whole or the portion of the sound production component 11 cover the antihelix region of the user (e.g., the position in the triangular fossa, the upper anticrus of helix, the lower anticrus of helix, or the position of the antihelix), as the position of the sound production component 11C relative to the ear shown in FIG. 2, the ratio of the distance $h_1$ between the centroid O of the first projection and the highest point of the second projection in the vertical axis direction to the height h of the second projection in the vertical axis direction may be within a range of 0.25-0.4; and the ratio of the distance w1 between the centroid O of the first projection and the end point of the second projection in the sagittal axis direction to the width w of the second projection may be within a range of 0.4-0.6. When the whole or a portion of the sound production component 11 covers the antihelix region of the user, the housing of the sound production component 11 may act as a baffle to increase a sound path difference from the sound guiding hole and the pressure relief hole to the opening of the ear canal, thereby increasing the sound intensity at the opening of the ear canal. Furthermore, in the wearing state, the sidewall of the sound production component 11 may be close to the antihelix region, and a concave-convex structure of the antihelix region may also act as a baffle to increase a sound path of the transmission of the sound from the pressure relief hole to the opening of the ear canal, thereby increasing the sound path difference between the sound guiding hole and the pressure relief hole to the opening of the ear canal. In addition, when the whole or a portion of the sound production component 11 covers the antihelix region of the user, the sound production component 11 may not extend into the opening of the ear canal of the user, which may ensure that the opening of the ear canal remains fully open such that the user may obtain sound information in the external environment, thereby improving the wearing comfort for the user. The specific description regarding the whole or a portion of the sound production component 11 substantially covering the antihelix region of the user may be found elsewhere in the present disclosure.

In some embodiments, to make the whole or a portion of the sound production component 11 extend into the concha cavity, as the position of the sound production component 11B relative to the ear shown in FIG. 2, the ratio of the distance $h_1$ between the centroid $O_1$ of the first projection and the highest point of the second projection in the vertical axis direction to the height h of the second projection in the vertical axis direction may be within a range of 0.35-0.6, and the ratio of the distance $w_1$ between the centroid $O_1$ of the first projection and the end point of the second projection in the sagittal axis direction to the width w of the second projection in the sagittal axis direction may be within a range of 0.4-0.65. For the earphone provided in the embodiments of the present disclosure, when the user wears the earphone, the ratio of the distance $h_1$ between the centroid $O_1$ of the first projection and the highest point of the second projection in the vertical axis direction to the height h of the second projection in the vertical axis direction may be controlled to be within the range of 0.35-0.6, and the ratio of the distance $w_1$ between the centroid of the first projection and the end point of the second projection in the sagittal axis direction to the width w of the second projection in the sagittal axis direction may be controlled to be with the range of 0.4-0.65, so that at least a portion of the sound production component 11 may extend into the concha cavity and form the acoustic model shown in FIG. 4 with the concha cavity of the user, thereby improving the listening volume of the earphone at the listening position (e.g., at the opening of the ear canal), especially the listening volume at the medium and low frequency, while maintaining a good effect of far-field sound leakage cancellation. When a portion or the whole of the sound production component 11 extends into the concha cavity, the sound guiding hole may be closer to the opening of the ear canal, which further increases the listening volume at the opening of the ear canal. In addition, the concha cavity may support and limit the sound production component 11 to a certain extent, thereby improving the stability of the earphone in the wearing state.

It should also be noted that an area of the first projection of the sound production component 11 on the sagittal plane may be generally much smaller than an area of a projection of the auricle on the sagittal plane to ensure that the opening of the ear canal of the user may not be blocked when the user wears the earphone 10, and a load on the user when wearing the earphone may be reduced, which is convenient for the user to carry daily. On this premise, in the wearing state, when the ratio of the distance $h_1$ between the centroid $O_1$ of the projection (the first projection) of the sound production component 11 on the sagittal plane and the projection (the highest point of the second projection) of the highest point A1 of the auricle on the sagittal plane in the vertical axis direction to the height h of the second projection in the vertical axis direction is too small or too large, a portion of the sound production component 11 may be located above the top of the auricle or at the earlobe of the user such that the auricle cannot sufficiently support and limit the sound production component 11, and there may be a problem that the wearing is unstable and earphone is easy to fall off. On the other hand, the sound guiding hole set on the sound production component 11 may be away from the opening of the ear canal, affecting the listening volume at the opening of the ear canal of the user. To ensure that the earphone does not block the opening of the ear canal of the user and ensure the stability and comfort of the user wearing the earphone and a good listening effect, in some embodiments, the ratio of the distance $h_1$ between the centroid $O_1$ of the first projection and the highest point A1 of the second projection in the vertical axis direction to the height h of the second projection in the vertical axis direction may be controlled to be within a range of 0.35-0.6, so that when a portion or the whole of the sound production component extends into the concha cavity, the force exerted by the concha cavity on the sound production component 11 may support and limit the sound production component 11 to a certain extent, thereby improving the wearing stability and comfort of the earphone. Meanwhile, the sound production component 11 may also form the acoustic model shown in FIG. 4 with the concha cavity, to ensure the listening volume of the user at the listening position (e.g., the opening of the ear canal) and reduce the far-field leakage volume. Preferably, the ratio of the distance $h_1$ between the centroid $O_1$ of the first projection and the highest point A1 of the second projection in the vertical axis direction to the height h of the second projection in the vertical axis direction may be controlled to be within a range of 0.35-0.55. More preferably, the ratio of the distance $h_1$ between the centroid $O_1$ of the first projection and the highest point of the second projection in the vertical axis direction to the height h of the second projection in the vertical axis direction may be controlled to be within a range of 0.4-0.5.

Similarly, when the ratio of the distance $w_1$ between the centroid $O_1$ of the first projection and the end point of the second projection in the sagittal axis direction to the width w of the second projection in the sagittal axis direction is too large or too small, the portion of the whole of the sound production component 11 may be located in a facial region on the front side of the ear, or extend out of the outer contour of the auricle, which may also cause the problem that the sound production component 11 cannot construct the acoustic model in FIG. 4 with the concha cavity, and also lead to unstable wearing of the earphone 10. According to the earphone provided in the embodiments of the present disclosure, the ratio of the distance w1 between the centroid $O_1$ of the first projection and the end point of the second projection in the sagittal axis direction to the width w of the second projection in the sagittal axis direction may be controlled to be within a range of 0.4-0.7, thereby improving the wearing stability and comfort of the earphone while ensuring the acoustic output effect of the sound production component. Preferably, the ratio of the distance w1 between the centroid $O_1$ of the first projection and the end point of the second projection in the sagittal axis direction to the width w of the second projection in the sagittal axis direction may be controlled to be within a range of 0.45-0.68. More preferably, the ratio of the distance w1 between the centroid $O_1$ of the first projection and the end point of the second projection in the sagittal axis direction to the width w of the second projection in the sagittal axis direction may be controlled to be within a range of 0.5-0.6.

As mentioned above, when the user wears the earphone 10, at least a portion of the sound production component 11 of the earphone 10 may extend into the concha cavity of the user to form the acoustic model in FIG. 4. The outer wall surface of the housing of the sound production component 11 may usually be the plane or the curved surface, and the contour of the concha cavity of the user may be the uneven structure. When the portion of the whole of the sound production component 11 extends into the concha cavity, a gap may be formed since the sound production component 11 cannot closely fit with the concha cavity, and the gap may correspond to the leakage structure 403 in FIG. 4.

In some embodiments, considering that the relative position of the sound production component 11 and the ear canal of the user (e.g., the concha cavity) may affect the size of the gap formed between the sound production component 11 and the concha cavity, e.g., when an end FE of the sound production component 11 abuts against the concha cavity, the size of the gap may be relatively small, and when the end FE of the sound production component 11 does not abut against the concha cavity, the size of the gap may be relatively large. The gap formed between the sound production component 11 and the concha cavity may be referred to as the leakage structure in the acoustic model in FIG. 4. The relative position of the sound production component 11 and the ear canal of the user (e.g., the concha cavity) may affect a count of the leakage structures of the quasi-cavity structure formed by the sound production component 11 and the concha cavity and the opening size of the leakage structure, and the opening size of the leakage structure may directly affect the listening quality. Specifically, the larger the opening of the leakage structure, the more sound components that the sound production component 11 radiates directly outward, and the less sound reaching the listening position. Accordingly, to balance the listening volume of the sound production component 11 and the sound leakage reduction effect to ensure the acoustic output quality of the sound production component 11, the sound production component 11 may be fit as closely as possible to the concha cavity of the user. Correspondingly, the ratio of the distance $h_1$ between the centroid $O_1$ of the first projection and the highest point of the second projection in the vertical axis direction to the height h of the second projection in the vertical axis direction may be controlled to be within a range of 0.35-0.6, while the ratio of the distance w1 between the centroid $O_1$ of the first projection and the end point of the second projection in the sagittal axis direction to the width w of the second projection in the sagittal axis direction may be controlled to be within a range of 0.4-0.65. Preferably, in some embodiments, to improve the wearing comfort of the open earphone while ensuring the acoustic output quality of the sound production component 11, the ratio of the distance $h_1$ between the centroid $O_1$ of the first projection and the highest point of the second projection in the vertical axis direction to the height h of the second projection in the vertical axis direction may be within a range of 0.35-0.55, and the ratio of the distance w1 between the centroid $O_1$ of the first projection and the end point of the second projection in the sagittal axis direction to the width w of the second projection in the sagittal axis direction may be within a range of 0.45-0.68. More preferably, the ratio of the distance $h_1$ between the centroid $O_1$ of the first projection and the highest point of the second projection in the vertical axis direction to the height h of the second projection in the vertical axis direction may be within a range of 0.35-0.5, and the ratio of the distance $w_1$ between the centroid $O_1$ of the first projection and the end point of the second projection in the sagittal axis direction to the width w of the second projection in the sagittal axis direction may be within a range of 0.48-0.6.

In some embodiments, considering that there may be certain differences in the shape and size of the ears of different users, the ratio range may fluctuate within a certain range. For example, when the earlobe of the user is long, the height h of the second projection in the vertical axis direction may be larger than that of the general situation. At this time, when the user wears the open earphone 100, the ratio of the distance h1 between the centroid $O_1$ of the first projection and the highest point of the second projection in the vertical axis direction to the height h of the second projection in the vertical axis direction may be smaller, e.g., which may be within a range of 0.2-0.55. Similarly, in some embodiments, when the helix of the user is bent forward, the width w of the second projection in the sagittal axis direction may be smaller than that of the general situation, and the distance w1 between the centroid $O_1$ of the first projection and the end point of the second projection in the sagittal axis direction may also be relatively small. At this time, when the user wears the open earphone 100, the ratio of the distance $w_1$ between the centroid $O_1$ of the first projection and the end point of the second projection in the sagittal axis direction to the width w of the second projection in the sagittal axis direction may be larger, e.g., which may be within a range of 0.4-0.75.

The ears of different users are different. For example, some users have longer earlobes. At this time, it may have an effect if the open earphone 10 is defined using the ratio of the distance (the seventh distance) between the centroid $O_1$ of the first projection and the highest point of the second projection to the height of the second projection on the vertical axis. As shown in FIG. 8B, a highest point A3 and a lowest point A4 of a connection region between the auricle of the user and the head of the user may be selected for illustration. The highest point of the connection part between the auricle and the head may be understood as a position where the projection of the connection region of the auricle and the head on the sagittal plane has a largest distance from a projection of a specific point on the neck on the sagittal plane. The lowest point of the connection part between the auricle and the head may be understood as a position where the projection of the connection region of the auricle and the head on the sagittal plane has a smallest distance from a projection of a specific point on the neck on the sagittal plane. To balance the listening volume of the sound production component 11 and the sound leakage reduction effect to ensure the acoustic output quality of the sound production component 11, the sound production component 11 may be fit as closely as possible to the concha cavity of the user. Correspondingly, a ratio of a distance $h_3$ between the centroid $O_1$ of the first projection and a highest point of a projection of the connection region of the auricle and the head on the sagittal plane in the vertical axis direction to a height $h_2$ between a highest point and a lowest point of the projection of the connection region of the auricle and the head on the sagittal plane in the vertical axis direction may be controlled to be within a range of 0.4-0.65. Meanwhile, the ratio of the distance $w_1$ between the centroid $O_1$ of the first projection and the end point of the second projection in the sagittal axis direction to the width w of the second projection in the sagittal axis direction may be controlled to be within a range of 0.4-0.65. Preferably, in some embodiments, to improve the wearing comfort of the open earphone while ensuring the acoustic output quality of the sound production component 11, the ratio of the distance $h_3$ between the centroid $O_1$ of the first projection and the highest point of the projection of the connection region of the auricle and the head on the sagittal plane in the vertical axis direction to the height $h_2$ between the highest point and the lowest point of the projection of the connection region of the auricle and the head on the sagittal plane in the vertical axis direction may be controlled to be within a range of 0.45-0.6, and the ratio of the distance $w_1$ between the centroid $O_1$ of the first projection and the end point of the second projection in the sagittal axis direction to the width w of the second projection in the sagittal axis direction may be within a range of 0.45-0.68. More preferably, the ratio of the distance $h_3$ between the centroid $O_1$ of the first projection and the highest point of the projection of the connection region of the auricle and the head on the sagittal plane in the vertical axis direction to the height $h_2$ between the highest point and the lowest point of the projection of the connection region of the auricle and the head on the sagittal plane in the vertical axis direction may be within a range of 0.5-0.6, and the ratio of the distance $w_1$ between the centroid $O_1$ of the first projection and the end point of the second projection in the sagittal axis direction to the width w of the second projection in the sagittal axis direction may be within a range of 0.48-0.6.

The positions of the first sound hole 1191 and the second sound hole 1192 relative to the ear of the user are related to the position of the sound production component 11 relative to the ear when the earphone is in the wearing state, and the positions of the sound production component 11 relative to the ear are illustrated in FIGS. 8A and 8B and the corresponding contents thereof. To more clearly illustrate the positions of the first sound hole 1191 and the second sound hole 1192 relative to the ear of a human body, the following will be specifically illustrated in conjunction with FIG. 9.

Figure 9:
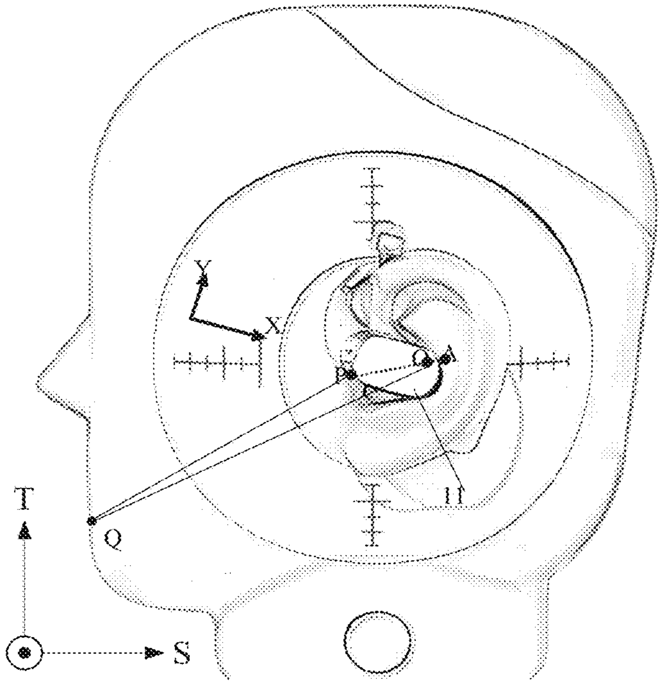
FIG. 9 is a schematic diagram illustrating a position distribution of a first sound hole and a second sound hole according to some embodiments of the present disclosure.

FIG. 9 is a schematic diagram illustrating an exemplary wearing of an earphone according to some embodiments of the present disclosure. Referring to FIG. 8 and FIG. 9, in some embodiments, at least a portion of the sound production component 11 may extend into a concha cavity of the user when the earphone 10 is in a wearing state. In some embodiments, a line connecting the first sound hole 1191 and the second sound hole 1192 may point to the user's mouth such that a first microphone and a second microphone have a good sound collection effect. In some embodiments, in the wearing state, the first sound hole 1191 may be disposed at a position closest to the mouth on the earphone 10, so as to improve the sound collection effect when the first microphone collects the sound from the user's mouth. Both the first sound hole 1191 and the second sound hole 1192 are relatively close to the user's mouth such that the sound from the user's mouth is a near-field sound for the first microphone and the second microphone. In addition, the distance from the first sound hole 1191 to the user's mouth is different from the distance from the second sound hole 1192 to the user's mouth such that there is a difference between the sound received by the first microphone and the sound received by the second microphone from the user's mouth (e.g., amplitudes or phases of the noises are difficult). Noise from the environment may be regarded as far-field sound for the first microphone and the second microphone, and the noises received by the first microphone and the second microphone are approximately the same (e.g., the amplitudes or phases of the noises are approximately the same). Then a better human voice effect after a noise cancellation may be obtained by subtracting a signal received by the second microphone from the signal received by the first microphone and then amplifying the signal subtracted. In such cases, a certain distance needs to be disposed between the first sound hole 1191 and the second sound hole 1192 for a subsequent signal processing. In some embodiments, the distance between the first sound hole 1191 and the second sound hole 1192 may be not less than 10 mm. To ensure the portability of the earphone and the comfort of the user when wearing the earphone, the size of the sound production component 11 should not be too large. Correspondingly, the distance between the first sound hole 1191 and the second sound hole 1192 may be limited by the size of the sound production component 11. In some embodiments, the distance between the first sound hole 1191 and the second sound hole 1192 may be not greater than 50 mm. In some embodiments, considering a size limitation of the sound production component 11 and to make the first microphone and the second microphone have a better sound collection effect and facilitate the subsequent signal processing, the distance between the first sound hole 1191 and the second sound hole 1192 may be between 10 mm-50 mm. The distance between the first sound hole 1191 and the second sound hole 1192 mentioned here refers to a straight-line distance between centers of openings of the first sound hole 1191 and the second sound hole 1192 on the outer side of the sound production component 11 or the ear hook 12 (for example, the distance D4 shown in FIG. 7). Considering that a too large size of the sound production component 11 may affect the stability and comfort when wearing the earphone, on the premise that the first microphone and the second microphone may have a better sound collection effect and are easy to perform the subsequent signal processing, the distance between the first sound hole 1191 and the second sound hole 1192 may be appropriately reduced such that the size of the sound production component 11 may be relatively small. For example, in some embodiments, the distance between the first sound hole 1191 and the second sound hole 1192 may be between 20 mm and 47 mm. As another example, to make the sound signal received by the first microphone and the second microphone have a sufficient difference, and to make the sound production component 11 have a suitable size, the distance between the first sound hole 1191 and the second sound hole 1192 may be between 27 mm-32 mm. Merely by way of example, the distance between the first sound hole 1191 and the second sound hole 1192 may be 26 mm. In some embodiments, the distance between the first sound hole 1191 and the second sound hole 1192 may be reflected by a distance between a first projection point P of the first sound hole 1191 on the sagittal plane and a second projection point O of the second sound hole 1192 on the sagittal plane. It should be understood that when the line connecting the first sound hole 1191 and the second sound hole 1192 is not parallel to the sagittal plane of the user, the distance between the first sound hole 1191 and the second sound hole 1192 may have certain difference from the distance between the first projection point P and the second projection point O. Specifically, the distance between the first sound hole 1191 and the second sound hole 1192 may be greater than the distance between the first projection point P and the second projection point O. Referring to the descriptions regarding the distance between the first sound hole 1191 and the second sound hole 1192, considering the limitation of the size of the sound production component 11 and to make the first microphone and the second microphone have better sound collection effects to facilitate the subsequent signal processing, in some embodiments, the distance between the first projection point P of the first sound hole 1191 on the sagittal plane and the second projection point O of the second sound hole 1192 on the sagittal plane may be between 8 mm-48 mm. For example, the distance between the first projection point P of the first sound hole 1191 on the sagittal plane and the second projection point O of the second sound hole 1192 on the sagittal plane may be between 18 mm and 45 mm. As another example, the distance between the first projection point P of the first sound hole 1191 on the sagittal plane and the second projection point O of the second sound hole 1192 on the sagittal plane may be between 25 mm-30 mm. It should be noted that in the present disclosure, the first projection point P refers to a centroid of the projection of the first sound hole 1191 on the sagittal plane of the user. Similarly, the second projection point O refers to the centroid of the projection of the second sound hole 1192 on the sagittal plane of the user. When sizes of the first sound hole 1191 and the second sound hole 1192 are relatively small (e.g., diameters of the first sound hole 1191 and the second sound hole 1192 are less than 2 mm), the projections of the first sound hole 1191 and the second sound hole 1192 on the sagittal plane may be approximately regarded as two points.

Considering that the distance between the first sound hole 1191 and the second sound hole 1192 is limited by the dimensions of the sound production component 11. In some embodiments, the distribution of the sound hole 1191 and the second sound hole 1192 on the sound production component 11 may be represented by a ratio of the distance between the first projection point P and the second projection point O to a size of the first projection in the major axis direction. Referring to FIG. 9, taking the first sound hole 1191 and the second sound hole 1192 being disposed on the sound production component 11 as an example, the first projection point P of the first sound hole 1191 on the sagittal plane and the second projection point O of the second sound hole 1192 on the sagittal plane are respectively disposed in diagonal corners of the first projection, e.g., a lower-left corner and an upper-right corner, such that the first projection point P may have a relatively large distance from the second projection point O. The first projection point P of the first sound hole 1191 on the sagittal plane and the second projection point O of the second sound hole 1192 on the sagittal plane are not limited to be located in the diagonal corners of the first projection as illustrated in FIG. 9, with the first projection point P and the second projection point O are sufficiently separated from each other within a specific distance range. In conjunction with the descriptions above, the size of the sound production component 11 should not be too large, and on the premise that the size of the sound production component 11 is limited, the distance between the first projection point P and the second projection point O is made as large as possible, and based on this, to make the first sound hole 1191 have a relatively large distance from the second sound hole 1192, the first projection point P and the second projection point O may be distributed as far as possible along any diagonal line of the first projection and a vicinity thereof. In some embodiments, a ratio of the distance between the first projection point P of the first sound hole 1191 on the sagittal plane and the second projection point O of the second sound hole 1192 on the sagittal plane to the size of the first projection along the major axis direction X may be within a range of 0.7-1.2. Further, considering that when a user wears the earphones, the first projection point P of the first sound hole 1191 on the sagittal plane and the second projection point O of the second sound hole 1192 on the sagittal plane are located at the diagonal corner of the first projection, the second sound hole 1192 may be very close to the antihelix of the user of the human body, which may cause the antihelix to generate a reflection effect on the sound wave generated by the voice of the user or an external sound wave when the voice is transmitted to the antihelix, especially in a frequency range of 3 kHz-8 kHz, thereby resulting in that the sound received by the second microphone is larger than the sound received by the first microphone, and affecting a subsequent noise cancellation and a sound reception effect. Based on this, in some embodiments, to minimize the influence of the antihelix of the user on the second microphone, and to ensure the reception effect of the first microphone and the second microphone, the position of the second microphone should be provided at intervals from the antihelix of the user by a certain distance, for example, the second projection point O of the second sound hole 1192 on the sagittal plane in FIG. 9 should be appropriately far away from a upper-right boundary of the sound production component in contact with the antihelix. In some embodiments, the ratio of the distance between the first projection point P and the second projection point O to the size of the first projection along the major axis direction X may be within a range of 0.7-1.2. In some embodiments, to further minimize the influence of the antihelix of the user on the second microphone, ensure the sound collection effect of the first microphone and the second microphone, and have a large distance between the first microphone and the second microphone, the ratio of the distance between the first projection point P and the second projection point O to the dimension of the first projection along the major axis direction X may be within a range of 0.75-1. In some embodiments, the ratio of the distance between the first projection point P and the second projection point O to the size of the first projection along the major axis direction X may be within a range of 0.8-1.

In the wearing state, the distance between the first sound hole 1191 and the user's mouth (point Q in FIG. 9) may be smaller than the distance between the second sound hole 1192 and the user's mouth, that is, the first sound hole 1191 may be closer to the user's mouth than the second sound hole 1192, so as to facilitate the subsequent signal processing. As shown in FIG. 9, when the earphone 10 is in the wearing state, a third projection point Q may be used to represent a projection of the user's mouth (e.g., lips) on the sagittal plane of the user. A distance between P and Q is less than a distance between 0 and Q. In some embodiments, the line connecting the first projection point P of the first sound hole 1191 on the sagittal plane of the user and the second projection point O of the second sound hole 1192 on the sagittal plane approximately points to the third projection point Q of the user's mouth on the sagittal plane. In such cases, a directivity algorithm may be constructed based on the sounds received by the first microphone and the second microphone such that a clearer voice of the user may be received. In some embodiments, a line PQ connecting the first projection point P and the third projection point Q may form a certain angle with a line OQ connecting the second projection point O and the third projection point Q. To ensure a directivity of the first sound hole 1191 and the second sound hole 1192, the angle between PQ and OQ may be smaller than 30°. In some embodiments, the angle between PQ and OQ may be 5°-25°. For example, the angle between PQ and OQ may be 8°-15°. Merely by way of example, in some embodiments, the angle between PQ and OQ may be 0°, 3°, 9° or 15°, etc.

Since when the earphone 10 is in the wearing state, at least a portion of the sound production component 11 extends into the concha cavity, on the premise that the first sound hole 1191 is placed close to the user's mouth and a certain distance is between the first sound hole 1191 and the second sound hole 1192, the second sound hole 1192 may be relatively close to the antihelix. As a result, when a sound wave generated by the user's speech or an external sound wave is transmitted to the antihelix, the antihelix may have a reflection effect on the sound wave, especially in a frequency range of 3 kHz-8 kHz, resulting in that the sound received by the second microphone is greater than the sound received by the first microphone, which may affect the noise reduction and the sound collection effect. Based on the above problem, in some embodiments, the distance between the first sound hole 1191 and the second sound hole 1192 and a distance between the second sound hole 1192 and an edge of the antihelix of the user may be adjusted to ensure the noise reduction effect and the sound collection effect of the earphone. In some embodiments, an extension line of a line connecting the first projection point P of the first sound hole on the sagittal plane of the user and the second projection point O of the second sound hole on the sagittal plane has an intersection point A with the projection of the antihelix of the user on the sagittal plane. The distance between the second sound hole 1192 and the antihelix of the user may be reflected by a distance between the second projection point O of the second sound hole on the sagittal plane and the intersection point A. In some embodiments, to ensure that the first microphone and the second microphone in the earphone 10 have better sound collection effect and noise reduction effect, a ratio of a first distance OP between the first projection point P and the second projection point O to a second distance OA between the second projection point O and the intersection point A is between 1.8-4.4. To reduce the influence of the antihelix on the second microphone, the distance between the second sound hole 1192 and the antihelix may be increased, and the distance between the first sound hole 1191 and the second sound hole 1192 may be increased to facilitate the subsequent signal processing. For example, the ratio of the first distance OP to the second distance OA may be between 2.5-3.8. As another example, when a wearing position of the earphone remains unchanged, to further reduce the influence of the antihelix on the second microphone, the distance between the second sound hole 1192 and the antihelix may be increased, and the distance between the first sound hole 1191 and the second sound hole 1191 may be increased to facilitate the subsequent signal processing. In some embodiments, the ratio of the first distance OP to the second distance OA may be between 2.5-3.5. To reduce the influence of the antihelix on the second microphone and facilitate the subsequent signal processing, the distance between the second sound hole 1192 and the antihelix may be further increased, and the distance between the first sound hole 1191 and the second sound hole 1192 may be further increased. In some embodiments, the ratio of the first distance OP between the first projection point P and the second projection point O to a fourth distance OA between the second projection point O and the intersection point A may be between 3.0-3.3.

To more clearly describe the position relationship between the second sound hole 1192 and the antihelix so that the antihelix has less influence on the second sound hole 1192, it is described herein in conjunction with the distance between the second projection point O and the intersection point A is described. Due to a limited size of the sound production component 11, it is necessary to ensure a relatively great distance between the first sound hole 1191 and the second sound hole 1192. When the second sound hole 1192 is far away from the antihelix, the distance between the first sound hole 1191 and the second sound hole 1192 may become smaller, which may affect the subsequent signal processing. In such cases, in some embodiments, to ensure that the sound from the user's mouth received by the first microphone has a sufficient difference from the sound from the user's mouth received by the second microphone, and to reduce a sound enhancement effect of the antihelix on the second sound hole 1192, the distance between the second projection point O of the second sound hole 1192 on the sagittal plane and the intersection point A may be between 2 mm-10 mm. To further reduce the sound enhancement effect of the antihelix on the second sound hole 1192 and improve the sound collection effect of the first microphone and the second microphone, the distance between the second sound hole 1192 and the antihelix may be increased. In some embodiments, the distance between the projection point O and the intersection point A may be between 4 mm-10 mm. In some embodiments, the distance between the second projection point O and the intersection point A may be between 6 mm-10 mm. When the distance between the second projection point O and the intersection A is maintained at a relatively large range, the second sound hole 1192 is disposed at a position relatively far from the antihelix, so as to avoid the sound enhancement effect of the antihelix on the second sound hole 1192.

Figure 10A:
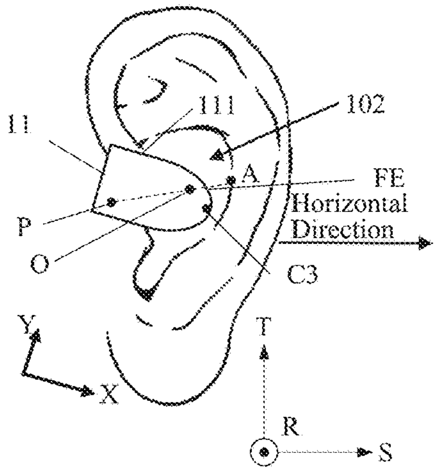
FIG. 10A is a schematic diagram illustrating an exemplary wearing of an earphone according to some embodiments of the present disclosure.
Figure 10B:
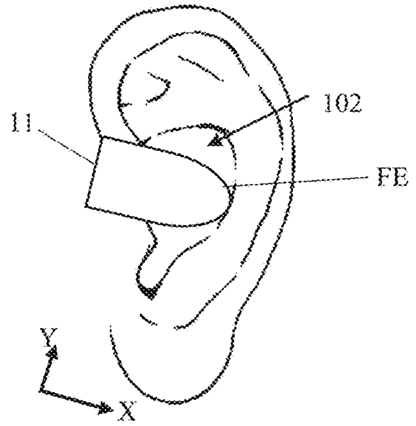
FIG. 10B is a schematic diagram illustrating another exemplary wearing of an earphone according to some embodiments of the present disclosure.
Figure 10C:
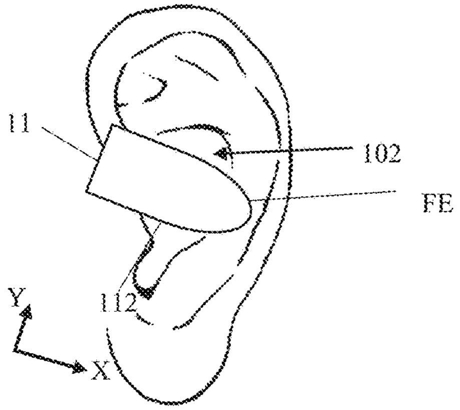
FIG. 10C is a schematic diagram illustrating another exemplary wearing of an earphone according to some embodiments of the present disclosure.

FIGS. 10A-FIG. 10C are schematic diagram illustrating different exemplary fit positions of the earphones to a user's ear canal according to the present disclosure. As shown in FIG. 10A—FIG. 10C, the line connecting the first projection point P of the first microphone hole 1191 on the sagittal plane and the second projection point O of the second microphone hole 1192 on the sagittal plane intersects with the projection of the antihelix on the sagittal plane at the intersection point A. The intersection point A is relevant to the distribution of the first microphone hole 1191 and the second microphone hole 1192 on the sound production component 11, as well as the wearing position of the sound production component 11 relative to the concha cavity 102, especially the distance from the rear side FE (also referred to as the end or free end of the sound production component 11) of the sound production component 11 relative to the concha cavity 102. In addition, the distance of the rear side of the sound production component 11 relative to the edge of the concha cavity affects the size of the gap that is formed between the sound production component 11 and the edge of the concha cavity, and the greater the size of the gap, the worse the hearing effect at the opening of the ear canal of the user. The specific position of the sound production component 11 in the wearing state may be limited by limiting the distance of the rear side of the sound production component 11 relative to the edge of the concha cavity, so as to improve the listening volume at the mouth of the ear canal of the user and at the same time improve the sound collection effect of the first microphone and the second microphone. Specifically, one end of the sound production component 11 is connected to the suspension structure 12 (the second portion 122 of the ear hook), which is positioned relatively forward when worn by the user, and a distance between the rear side FE (also known as a fixed end, i.e., the end at which the sound production component 11 is connected to the ear hook) of the sound production component 11 and the front side may reflect the size of the sound production component 11 along the size of the sound production component along the major axis direction X, and thus the position of the rear side FE of the sound production component 11 relative to the concha cavity may affect the area of the concha cavity covered by the sound production component 11, and thereby affecting the size of the gap formed between the sound production component 11 and the contour of the concha cavity, affecting the sound volume to be listened to at the opening of the user's ear canal. The distance between the projection of the rear side FE of the sound production component 11 on the sagittal plane and the projection of the edge of the concha cavity on the sagittal plane (also referred to as a fifth distance) may reflect the position of the rear side FE of the sound production component 11 relative to the concha cavity and the extent to which the sound production component 11 covers the concha cavity of the user. In some embodiments, the distance between the projection of the rear side FE of the sound production component 11 on the sagittal plane and the projection of the edge of the concha cavity on the sagittal plane may be the distance between the midpoint of the projection of the rear side FE of the sound production component 11 on the sagittal plane and the projection of the edge of the concha cavity on the sagittal plane. The concha cavity refers to a concave region below the crus of helix, i.e., the edge of the concha cavity may be at least defined by the sidewall below the crus of helix, the contour of the tragus, the intertragic notch, the antitragus apex, the notch between the antitragus and the antihelix, and the contour of the antihelix corresponding to the concha cavity. It should be noted that when the projection of the rear side FE of the sound production component 11 on the sagittal plane is a curved line or a broken line, the midpoint of the projection of the rear side FE of the sound production component 11 on the sagittal plane may be selected by the following exemplary method. A line segment may be drawn by selecting two farthest points on the projection of the rear side FE on the sagittal plane along the minor axis direction Y, a mid-perpendicular line may be drawn by selecting a midpoint on the line segment, and an interaction point of the mid-perpendicular line and the projection may be the midpoint of the projection of the rear side FE of the sound production component 11 on the sagittal plane. In some embodiments, when the rear side FE of the sound production component 11 is a curved surface, a tangent point where a tangent line parallel to the minor axis direction Y on the projection may also be selected as the midpoint of the projection of the rear side FE of the sound production component 11 on the sagittal plane.

As shown in FIG. 10A, when the sound production component 11 does not abut against the edge of the concha cavity 102, the rear side FE of the sound production component 11 may be located in the concha cavity 102, i.e., the midpoint of the projection of the rear side FE of the sound production component 11 on the sagittal plane may not overlap with the projection of the edge of the concha cavity 102 on the sagittal plane. As shown in FIG. 10B, the sound production component 11 of the earphone 10 may extend into the concha cavity 102, and the rear side FE of the sound production component 11 may abut against the edge of the concha cavity 102. It should be noted that, in some embodiments, when the rear side FE of the sound production component 11 abuts against the edge of the concha cavity 102, the midpoint of the projection of the rear side FE of the sound production component 11 on the sagittal plane may overlap with the projection of the edge of the concha cavity 102 on the sagittal plane. In some embodiments, when the rear side FE of the sound production component 11 abuts against the edge of the concha cavity 102, the midpoint of the projection of the rear side FE of the sound production component 11 on the sagittal plane may not overlap with the projection of the edge of the concha cavity 102 on the sagittal plane. For example, the concha cavity 102 may be a concave structure, the sidewall corresponding to the concha cavity 102 may not be a flat wall surface, and the projection of the edge of the concha cavity on the sagittal plane may be an irregular two-dimensional shape. The projection of the sidewall corresponding to the concha cavity 102 on the sagittal plane may be on or outside the contour of the shape. Therefore, the midpoint of the projection of the rear side FE of the sound production component 11 on the sagittal plane may not overlap with the projection of the edge of the concha cavity 102 on the sagittal plane. For example, the midpoint of the projection of the rear side FE of the sound production component 11 on the sagittal plane may be located on an inner side or an outer side of the projection of the edge of the concha cavity 102 on the sagittal plane. In the embodiments of the present disclosure, when the rear side FE of the sound production component 11 is located in the concha cavity 102, the distance between the midpoint of the projection of the rear side FE of the sound production component 11 on the sagittal plane and the projection of the edge of the concha cavity 102 on the sagittal plane may be within a specific range (e.g., not greater than 6 mm), which may be considered as that the rear side FE of the sound production component 11 abuts against the edge of the concha cavity 102. As shown in FIG. 10C, the sound production component 11 of the earphone 10 may cover the concha cavity, and the rear side FE of the sound production component 11 may be located between the edge of the concha cavity 102 and the inner contour 1014 of the auricle.

In conjunction with FIGS. 10A-10C, when the rear end FE of the sound production component 11 is located inside the edge of the cavity of auricular concha 102, if a distance between a midpoint C3 of the projection of the rear end FE of the sound production component 11 on the sagittal plane and the projection of the edge of the concha cavity 102 on the sagittal plane is too small, the area of the concha cavity 102 covered by the sound production component 11 may be too small, and the size of the gap formed between the sound production component 11 and the edge of the concha cavity may be relatively large, which may affect the listening volume at the opening of the ear canal of the user. When the midpoint C3 of the projection of the rear end FE of the sound production component on the sagittal plane is located at a position between the projection of the edge of the concha cavity 102 on the sagittal plane and a projection of the inner contour 1014 of the auricle on the sagittal plane, if the distance between the midpoint C3 of the projection of the rear end FE of the sound production component on the sagittal plane and the projection of the edge of the concha cavity 102 on the sagittal plane is too large, the rear end FE of the sound production component 11 may interfere with the auricle, and the area of the concha cavity 102 covered by the sound production component 11 may not be increased. In addition, when the user wears the earphone, if the rear end FE of the sound production component 11 is not located in the concha cavity 102, the edge of the concha cavity 102 may not limit the sound production component 11, and the earphone may be liable to fall off. In addition, an increase in the size of the sound production component 11 in a certain direction may increase the weight of the sound production component 11, which may affect the wearing comfort and portability of the user. Accordingly, to ensure that the earphone 10 has a better listening effect and the wearing comfort and stability of the user, and reduce the influence of the antihelix on the second sound hole 1192, in some embodiments, the distance between the midpoint C3 of the projection of the rear end FE of the sound production component 11 on the sagittal plane and the projection of the edge of the concha cavity on the sagittal plane may be not greater than 16 mm. In some embodiments, the distance between the midpoint C3 of the projection of the rear end FE of the sound production component 11 on the sagittal plane and the projection of the edge of the concha cavity on the sagittal plane may be not greater than 13 mm, and the distance between the second projection point O of the second sound hole 1192 on the sagittal plane and the intersection point A may be 2 mm-10 mm. In some embodiments, the distance between the midpoint C3 of the projection of the rear end FE of the sound production component 11 on the sagittal plane and the projection of the edge of the concha cavity on the sagittal plane may be not greater than 8 mm, and the distance between the second projection point O of the second sound hole 1192 on the sagittal plane and the intersection point A may be 4 mm-10 mm. It should be noted that, in some embodiments, the distance between the midpoint C3 of the projection of the rear end FE of the sound production component 11 on the sagittal plane and the projection of the edge of the concha cavity 102 on the sagittal plane may be a minimum distance between the midpoint C3 of the projection of the rear end FE of the sound production component 11 on the sagittal plane and the projection of the edge of the concha cavity 102 on the sagittal plane. In some embodiments, the distance between the midpoint C3 of the projection of the rear end FE of the sound production component 11 on the sagittal plane and the projection of the edge of the concha cavity 102 on the sagittal plane also refers to a distance along the sagittal axis. In addition, in a specific wearing scenario, it may also be that the points, other than the midpoint C3, of the projection of the rear end FE of the sound production component 11 on the sagittal plane may abut against the edge of the concha cavity. At this time, the distance between the midpoint C3 of the projection of the rear end FE of the sound production component 11 on the sagittal plane and the projection of the edge of the concha cavity on the sagittal plane may be greater than 0 mm. In some embodiments, the distance between the midpoint C3 of the projection of the rear end FE of the sound production component 11 on the sagittal plane and the projection of the edge of the concha cavity on the sagittal plane may be within a range of 2 mm-16 mm. In some embodiments, the distance between the midpoint C3 of the projection of the rear end FE of the sound production component 11 on the sagittal plane and the projection of the edge of the concha cavity on the sagittal plane may be within a range of 4 mm-10.48 mm.

Figure 11:
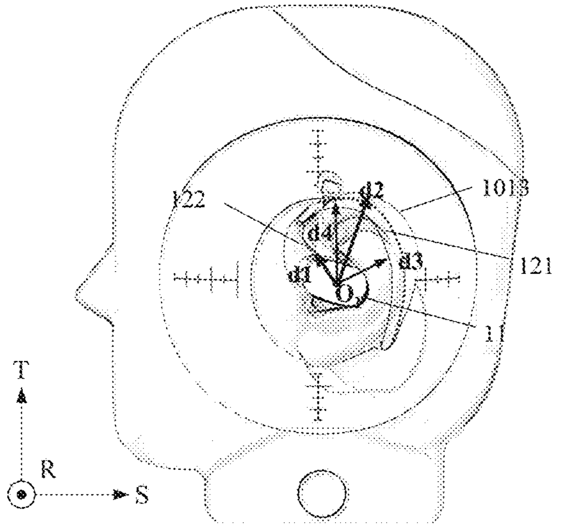
FIG. 11 is a schematic diagram illustrating an exemplary wearing of an earphone according to some embodiments of the present disclosure.

FIG. 11 is a schematic diagram illustrating an exemplary wearing of an earphone according to some other embodiments of the present disclosure. In conjunction with FIGS. 3 and 11, when the user wears the earphone 10 and the sound production component 11 extends into the concha cavity, the centroid $O_1$ of the first projection may be located in a region enclosed by a contour of the second projection, wherein the contour of the second projection may be understood as a projection of an outer contour of the helix of the user, an earlobe contour, a tragus contour, a contour of the intertragic notch, a contour of the antitragus apex, a contour of the notch between the antitragus and the antihelix, etc. on the sagittal plane. In some embodiments, the listening volume of the sound production component, the sound leakage reduction effect, and the wearing comfort and stability may be improved by adjusting a distance between the centroid $O_1$ of the first projection and the contour of the second projection. For example, when the sound production component 11 is located at the top of the auricle, the earlobe, the facial region on the front side of the auricle, or between the inner contour 1014 of the auricle and the outer edge of the concha cavity, which may be specifically embodied as that a distance between the centroid $O_1$ of the first projection and a point of a certain region of the contour of the second projection is too small and a distance between the centroid $O_1$ of the first projection and a point of another region of the contour of the second projection is too large, the sound production component may not form a quasi-cavity structure (the acoustic model in FIG. 4) with the concha cavity, which affects the acoustic output effect of the earphone 10. To ensure the acoustic output quality when the user wears the earphone 10, in some embodiments, the distance between the centroid $O_1$ of the first projection and the contour of the second projection may be within a range of 10 mm-52 mm, i.e., the distance between the centroid $O_1$ of the first projection and any point of the contour of the second projection may be within a range of 10 mm-52 mm. In some embodiments, to further improve the wearing comfort of the earphone 10 and optimize the quasi-cavity structure formed by the sound production component 11 and the concha cavity, the distance between the centroid $O_1$ of the first projection and the contour of the second projection may be within a range of 12 mm-50.5 mm. In some embodiments, the distance between the centroid $O_1$ of the first projection and the contour of the second projection may also be within a range of 13.5 mm-50.5 mm. In some embodiments, by controlling the distance between the centroid $O_1$ of the first projection and the contour of the second projection to be within a range of 10 mm-52 mm, most of the sound production component 11 may be located near the ear canal of the user, and at least a portion of the sound production component may extend into the concha cavity of the user to form the acoustic model in FIG. 4, thereby ensuring that the sound output by the sound production component 11 may be better transmitted to the user. For example, in some embodiments, a minimum distance d1 between the centroid $O_1$ of the first projection and the contour of the second projection may be 10 mm, and a maximum distance d2 between the centroid $O_1$ of the first projection and the contour of the second projection may be 52 mm.

In some embodiments, considering that when the user wears the earphone 10, if a distance (also referred to as a sixth distance) between the centroid $O_1$ of the first projection and a projection of the first portion 121 of the ear hook on the sagittal plane is too large, it may cause unstable wearing (at this time, an effective clamping of the ear may not be formed between the sound production component 11 and the ear hook), and the sound production component 11 may not effectively extend into the concha cavity. If the distance is too small, it may affect the relative position of the sound production component to the concha cavity of the user and the opening of the ear canal, and may also cause the sound production component 11 or the ear hook to press the ear, resulting in poor wearing comfort. Accordingly, to avoid the problems, in some embodiments, the distance between the centroid $O_1$ of the first projection and the projection of the first portion 121 of the ear hook on the sagittal plane may be within a range of 18 mm-43 mm. By controlling the distance to be within the range of 18 mm-43 mm, the ear hook may fit the ear of the user better, the sound production component 11 may be ensured to be just located at the concha cavity of the user, and the acoustic model in FIG. 4 may be formed, thereby ensuring that the sound output by the sound production component 11 may be better transmitted to the user. In some embodiments, to further improve the wearing stability of the earphone and ensure the listening effect of the sound production component 11 at the opening of the ear canal, in some embodiments, the distance between the centroid $O_1$ of the first projection and the projection of the first portion 121 of the ear hook on the sagittal plane may be within a range of 20 mm-41 mm. In some embodiments, the distance between the centroid $O_1$ of the first projection and the projection of the first portion 121 of the ear hook on the sagittal plane may be within a range of 22 mm-40.5 mm. For example, a minimum distance d3 between the centroid $O_1$ of the first projection and the projection of the first portion 121 of the ear hook on the sagittal plane may be 21 mm, and a maximum distance d4 between the centroid $O_1$ of the first projection on the sagittal plane of the user and the projection of the first portion 121 of the ear hook on the sagittal plane may be 41.2 mm. In some embodiments, a ratio of the distance (the fourth distance) between the second projection point O of the second sound hole 1192 on the sagittal plane and the intersection point A to the distance (the sixth distance) between the centroid $O_1$ of the first projection and the projection of the first portion 121 of the ear hook in the sagittal plane may reflect the position of the second sound hole 1192 on the earphone and the distance of the second sound hole 1192 relative to the antihelix, e.g., the greater the ratio, the greater the distance of the second sound hole 1192 relative to the antihelix. The sound enhancement effect of the antihelix on the second sound hole 1192 may be reduced by increasing the distance of the second sound hole 1192 relative to the antihelix, but since the size of the sound production component 11 is limited, the distance between the first microphone hole 1191 and the second microphone hole 1192 should also be considered. In such cases, in some embodiments, the ratio of the fourth distance OA to the distance between the centroid $O_1$ of the first projection and the projection of the first portion 121 of the ear hook on the sagittal plane may be 0.19-0.44. To further reduce the sound enhancement effect of the antihelix on the second sound hole 1192, the distance between the second projection point O of the second sound hole 1192 on the sagittal plane and the intersection point A may be further increased. In some embodiments, the fourth distance OA to the distance between the centroid $O_1$ of the first projection and the projection of the first portion 121 of the ear hook on the sagittal plane may be 0.25-0.44. In some embodiments, the ratio of the fourth distance OA to the distance between the centroid $O_1$ of the first projection and the projection distance of the first portion 121 of the ear hook on the sagittal plane may be 0.3-0.44.

In some embodiments, due to the elasticity of the ear hook, the distance between the sound production component 11 and the ear hook may vary in the wearing state and the non-wearing state (usually the distance in the non-wearing state may be smaller than that in the wearing state). For example, in some embodiments, when the earphone 10 is not worn, a distance between a centroid of a projection of the sound production component 11 on a specific reference plane and a centroid of a projection of the first portion 121 of the ear hook on the specific reference plane may be within a range of 15 mm-38 mm. In some embodiments, when the earphone 100 is not worn, the distance between the centroid of the projection of the sound production component 11 on the specific reference plane and the centroid of the projection of the first portion 121 of the ear hook on the specific reference plane may be within a range of 16 mm-36 mm. In some embodiments, the distance between the centroid of the projection of the sound production component on the specific reference plane and the centroid of the projection of the first portion 121 of the ear hook on the specific reference plane may be slightly smaller in the non-wearing state than in the wearing state, so that when the earphone 100 is in the wearing state, the ear hook may generate a certain clamping force on the ear of the user, thereby improving the wearing stability for the user without affecting the wearing experience of the user. In some embodiments, the specific reference plane may be the sagittal plane. At this time, in the non-wearing state, the centroid of the projection of the sound production component on the sagittal plane may be compared to the centroid of the projection of the sound production component on the specific reference plane. For example, the non-wearing state may be represented by removing the auricle structure from the human head model, and fixing the sound production component on the human head model in the same posture as the wearing state by using a fixing component or adhesive. In some embodiments, the specific reference plane may be an ear hook plane. An ear hook structure may be an arc structure. The ear hook plane may be a plane formed by three most protruding points on the ear hook, i.e., the plane that supports the ear hook when the ear hook is placed freely (i.e., not subject to external force). For example, when the ear hook is freely placed on a horizontal plane, the horizontal plane may support the ear hook, and the horizontal plane may be regarded as the ear hook plane. In other embodiments, the ear hook plane also refers to a plane formed by a bisector that bisects or roughly bisects the ear hook along a length extension direction of the ear hook. In the wearing state, although the ear hook plane has a certain angle relative to the sagittal plane, the ear hook may be approximately regarded as fitting the head at this time, and thus the angle is very small. For the convenience of calculation and description, it may also be possible to use the ear hook plane as the specific reference plane instead of the sagittal plane.

Figure 12:
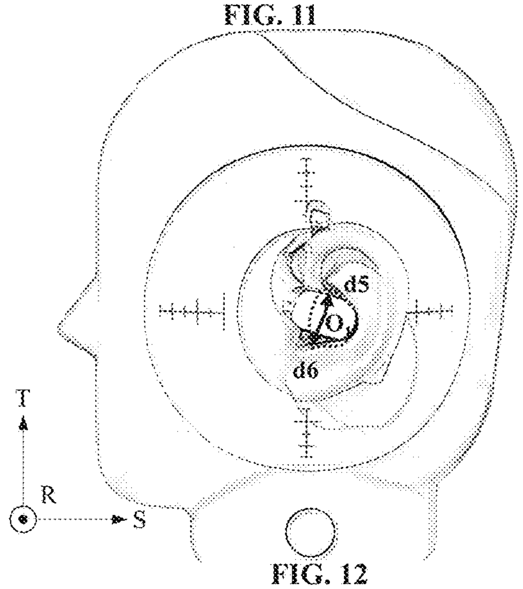
FIG. 12 is a schematic diagram illustrating an exemplary wearing of an earphone according to some embodiments of the present disclosure.

FIG. 12 is a schematic diagram illustrating an exemplary wearing of an earphone according to some other embodiments of the present disclosure. Referring to FIG. 12, in some embodiments, the projection of the sound production component on the sagittal plane may overlap with the projection of the concha cavity of the user (e.g., the dotted line in FIG. 9) on the sagittal plane, i.e., when the user wears the earphone, a portion or the whole of the sound production component may cover the concha cavity, and when the earphone is in the wearing state, the centroid $O_1$ of the first projection may be located in a projection region of the concha cavity of the user on the sagittal plane. The position of the centroid $O_1$ of the first projection may be related to a size of the sound production component. For example, if the size of the sound production component 11 in the major axis direction X or the minor axis direction Y is too small, a volume of the sound production component 11 may be relatively small, thus an area of the diaphragm disposed therein may also be relatively small, resulting in low efficiency of the diaphragm pushing the air inside the housing of the sound production component 11 to produce sound, which may affect the acoustic output effect of the earphone. When the size of the sound production component 11 in the major axis direction X or the minor axis direction Y is too large, the sound production component 11 may exceed the range of the concha cavity, and may not extend into the concha cavity or form the quasi-cavity structure, or a total size of the gap formed between the sound production component 11 and the concha cavity may be very large, affecting the listening volume at the opening of the ear canal when the user wears the earphone 10 and the far-field sound leakage effect. In some embodiments, to obtain better acoustic output quality when the user wears the earphone 10, a distance between the centroid $O_1$ of the first projection and a projection of an edge of the concha cavity of the user on the sagittal plane may be within a range of 4 mm-25 mm. In some embodiments, the distance between the centroid of the first projection and the projection of the edge of the concha cavity of the user on the sagittal plane may be within a range of 6 mm-20 mm. In some embodiments, the distance between the centroid of the first projection and the projection of the edge of the concha cavity of the user on the sagittal plane may be within a range of 10 mm-18 mm. For example, in some embodiments, a minimum distance d5 between the centroid of the first projection and the projection of the edge of the concha cavity of the user on the sagittal plane may be 5 mm, and a maximum distance d6 between the centroid of the first projection and the projection of the edge of the concha cavity of the user on the sagittal plane may be 24.5 mm. In some embodiments, by controlling the distance between the centroid of the first projection and the projection of the edge of the concha cavity of the user on the sagittal plane to be within the range of 4 mm-25 mm, at least a portion of the sound production component 11 may cover the concha cavity to form a quasi-cavity acoustic model with the concha cavity. Therefore, the sound output by the sound production component may be better transmitted to the user, and the wearing stability of the earphone 100 may be improved by the force exerted by the concha cavity on the sound production component 11.

It should be noted that the positional relationship between the sound production component 11 and the auricle or the concha cavity in the embodiments of the present may be determined by the following exemplary method. First, at a specific position, a picture of a human head model with ears may be taken in the direction facing the sagittal plane, the edge of the concha cavity and the contour of the auricle (e.g., inner and outer contours) may be marked, which may be regarded as the contours of projections of various structures of the ear on the sagittal plane; then at the specific position, a picture of the earphone worn on the human head model may be taken at the same angle, and the contour of the sound production component may be marked, which may be regarded as the projection of the sound production component on the sagittal plane, and the positional relationship between the sound production component (e.g., the centroid, an end, etc.) and the edge of the concha cavity and the auricle may be determined through comparative analysis.

Figure 13:
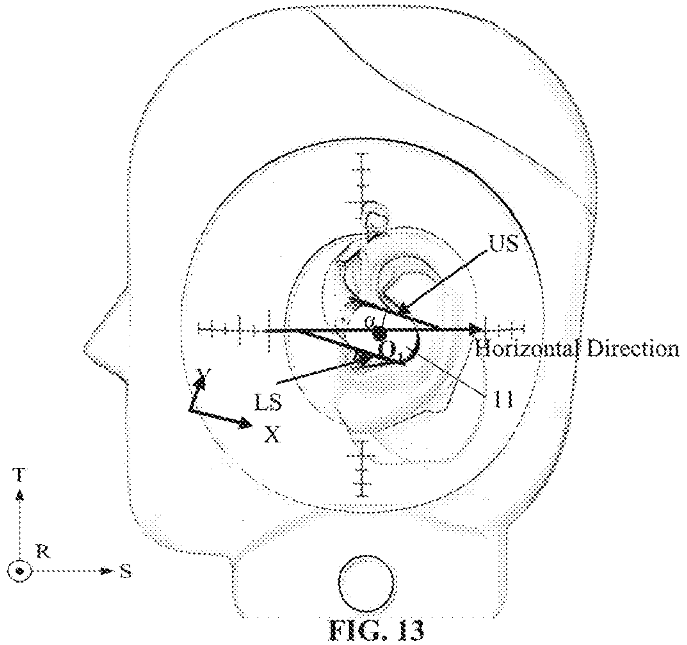
FIG. 13 is a schematic diagram illustrating an exemplary wearing of an earphone according to some embodiments of the present disclosure.
Figure 14:
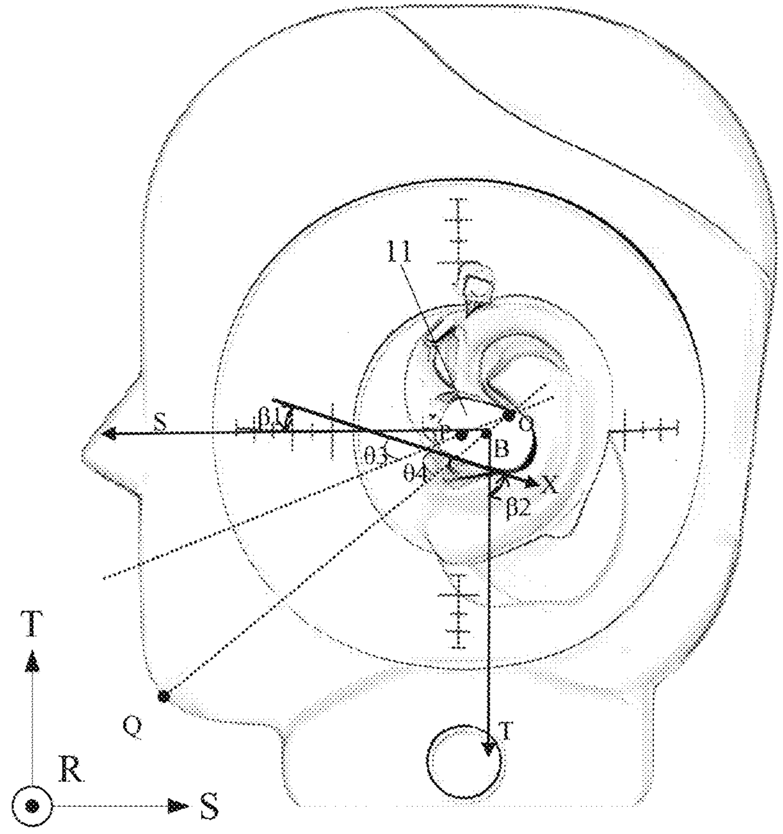
FIG. 14 is a schematic diagram illustrating an exemplary wearing of an earphone according to some embodiments of the present disclosure.

In some embodiments, while ensuring that the ear canal is not blocked, it may also be necessary to consider that the size of the gap formed between the sound production component 11 and the concha cavity may be as small as possible, and the overall volume of the sound production component 11 may not be too large or too small. On the premise that the overall volume or shape of the sound production component 11 is determined, the wearing angle of the sound production component 11 relative to the auricle and the concha cavity may be considered. Referring to FIG. 13 and FIG. 14, for example, when the sound production component 11 is a quasi-cuboid structure and the user wears the earphone 10, and when an upper side US (also referred to as an upper sidewall) or a lower side LS (also referred to as a lower sidewall) of the sound production component 11 is parallel with or approximately parallel with and perpendicular to or approximately perpendicular to (also be understood that a projection of the upper side US or the lower side LS of the sound production component 11 on the sagittal plane is parallel with or approximately parallel with and perpendicular to or approximately perpendicular to the sagittal axis) the horizontal plane, a large gap may be formed when the sound production component 11 fits or covers a portion of the concha cavity of the ear, which may affect the listening volume of the user.

Based on the above description, to make the whole or a portion of the sound production component 11 extend into the concha cavity, increase an area of the region of the concha cavity covered by the sound production component 11, reduce the size of the gap formed between the sound production component 11 and the edge of the concha cavity, and improve the listening volume at the opening of the ear canal, in some embodiments, an inclination angle α between a projection of the upper side US or the lower side LS of the sound production component 11 on the sagittal plane and the horizontal direction may be within a range of 10°-28° when the earphone 10 is in the wearing state. In some embodiments, the inclination angle α between the projection of the upper side US or the lower side LS of the sound production component 11 on the sagittal plane and the horizontal direction may be within a range of 13°-21° when the earphone 10 is in the wearing state. In some embodiments, the inclination angle α between the projection of the upper side US or the lower side LS of the sound production component 11 on the sagittal plane and the horizontal direction may be within a range of 15°-19° when the earphone 10 is in the wearing state. It should be noted that the inclination angle between the projection of the upper side US of the sound production component 11 on the sagittal plane and the horizontal direction and the inclination angle between the projection of the lower side LS of the sound production component 11 on the sagittal plane and the horizontal direction may be the same or different. For example, when the upper side US is parallel to the lower side LS of the sound production component 11, the inclination angle between the projection of the upper side US on the sagittal plane and the horizontal direction and the inclination angle between the projection of the lower side LS on the sagittal plane and the horizontal direction may be the same. As another example, when the upper side US is not parallel to the lower side LS of the sound production component 11, or one of the upper side US or the lower side LS is a planar wall, and the other of the upper side US or the lower side LS is a non-planar wall (e.g., a curved wall), the inclination angle between the projection of the upper side US on the sagittal plane and the horizontal direction and the inclination angle between the projection of the lower side LS on the sagittal plane and the horizontal direction may be different. In addition, when the upper side US or the lower side LS is a curved surface, the projection of the upper side US or the lower side LS on the sagittal plane may be a curved line or a broken line. At this time, the inclination angle between the projection of the upper side US on the sagittal plane and the horizontal direction may be an included angle between a tangent line to a point at which the curved line or the broken line has a largest distance from the ground plane and the horizontal direction, and the inclination angle between the projection of the lower side LS on the sagittal plane and the horizontal direction may be an included angle between a tangent line to a point at which the curved line or the broken line has a smallest distance from the ground plane and the horizontal direction. In some embodiments, when the upper side US or the lower side LS is the curved surface, a tangent line parallel to the major axis direction X on the projection may also be selected, and an included angle between the tangent line and the horizontal direction may be used to represent the inclination angle between the projection of the upper side US or the lower side LS on the sagittal plane and the horizontal direction.

In addition to this, when the user wears the earphone, the line connecting the first sound hole 1191 and the second sound hole 1192 needs to be pointed toward the mouth of the user to better collect the sound of the user's speech. On the basis that there exists a certain inclination angle of the upper side US or the lower side LS of the sound production component 11 relative to the horizontal direction, the line connecting the first sound hole 1191 and the second sound hole 1192 is further provided to tilt relative to the upper side US or the lower side LS of the sound production component 11, such that the directivity of the first microphone and the second microphone may be better satisfied. For example, the directivity of the first microphone and the second microphone may be reflected by the inclination angle of the sound production component relative to the horizontal direction in the wearing state, and by the inclination angle between a line connecting the first projection point P of the first sound hole 1191 on the sagittal plane and the second projection point O of the second sound hole 1192 on the sagittal plane and the projection of the upper side or the lower side of the sound production component on the sagittal plane. The angle between the line connecting the first projection point P and the second projection point O and the projection of the upper side or the lower side of the sound production component on the sagittal plane may be represented by an included angle θ3 between the line connecting the first projection point P and the second projection point O and the major direction X of the projection of the sound production component 11 on the sagittal plane. It should be noted that the line connecting the first sound hole 1191 and the second sound hole 1192 refers to the line connecting the center of the first sound hole 1191 and the center of the second sound hole 1192. When the first sound hole 1191 or the second sound hole 1192 is in an irregular shape, the line connecting the first sound hole 1191 and the second sound hole 1192 may also refer to the line connecting the centroid of the first sound hole 1191 and the centroid of the second sound hole 1192. It should be understood that when the earphone 10 is in the wearing state, the position of the sound production component 11 relative to the ear may be regarded as unchanged. In such cases, an included angle θ4 between a line connecting the fifth projection point Q' of a bottom of a mandible of the user on the sagittal plane and a centroid B of a projection of the opening of the ear canal of the user on the sagittal plane and the major axis direction X of the projection of the sound production component 11 may be approximately regarded as unchanged. The closer θ3 is to θ4, the better the directivity of the line connecting the first sound hole 1191 and the second sound hole 1192. Based on this, in some embodiments, the directivity of the first sound hole 1191 and the second sound hole 1192 may be improved by controlling the angle between the line connecting the first projection point P and the second projection point O and the major axis direction X of the projection of the sound production component 11 on the sagittal plane. As shown in FIG. 14, the sagittal axis S and the vertical axis T may indicate critical directions of the line connecting the first projection point P and the second projection point O relative to the major axis direction X of the projection of the sound production component 11 on the sagittal plane. That is, when the line connecting the first projection point P and the second projection point O is in the coordinate system S-T, the sound collection effect of the first microphone and the second microphone when the user speaks may be improved. The critical direction is described in connection with the wearing state of the earphone. As shown in FIG. 14, the mouth is at the lower left of the ear. If the line connecting the first projection point P and the second projection point O points to the upper left, the upper, the lower right, the upper right, or the right of the ear, a sound signal obtained by the first microphone and the second microphone when the user speaks may be extremely small. In such cases, the line connecting the first projection point P and the second projection point O pointing to the left side of the ear may be a critical direction, and the line connecting the first projection point P and the second projection point O pointing to the lower side of the ear may be a critical direction. It should be understood that the critical direction mentioned in the embodiment of the present disclosure is used to represent a critical value which the line connecting the first projection point P and the second projection point O (or the line connecting the first sound hole 1191 and the second sound hole 1192) points to. For example, as shown in FIG. 14, when the line connecting the first projection point P and the second projection point O points between the two critical directions, the first microphone and the second microphone may have better directivity. The sagittal axis S and vertical axis T of the user are used to represent the two critical directions mentioned above. Specifically, in some embodiments of the present disclosure, when the earphone 10 is in the wearing state, an included angle β1 between the major axis direction X and the sagittal axis S may be about 20°, and an included angle β2 between the major axis direction X and the vertical axis T may be about 45°. The included angle θ4 between the line connecting the fifth projection point Q' of the bottom of the mandible of the user on the sagittal plane and the centroid B of the projection of the opening of the ear canal of the user on the sagittal plane and the major axis direction X of the projection of the sound production component 11 may be between 50°-75°. Accordingly, in some embodiments, the angle between the line connecting the first projection point P and the second projection point O and the major axis direction X of the projection of the sound production component 11 on the sagittal plane may be represented by taking a negative direction of the major axis direction X shown in FIG. 14 as 0° and the counterclockwise direction as the positive direction. Then the included angle θ3 between the line connecting the first projection point P and the second projection point O and the major axis direction X of the projection of the sound production component 11 on the sagittal plane may be between 20°-135°. In some embodiments, the included angle θ3 may be 45°-70°. In such cases, the line connecting the first projection point P and the second projection point O may more accurately point to the region between the user's mouth and the bottom of the mandible of the user.

Based on the description above, to make the whole or a portion of the sound production component 11 extend into the concha cavity, increase an area of the region of the concha cavity covered by the sound production component 11, reduce the size of the gap formed between the sound production component 11 and the edge of the concha cavity, and improve the listening volume at the opening of the ear canal, in some embodiments, when the earphone 10 is in the wearing state, an inclination angle α between a projection of the upper side or the lower side of the sound production component 11 on the sagittal plane and the horizontal direction may be within a range of 10°-28°, and the angle θ3 between the line connecting the first projection point P and the second projection point a O and the projection of the upper side or lower side of the sound production component on the sagittal plane may be within a range of 20°-135°. In some embodiments, to make the line connecting the first sound hole and the second sound hole point to a region near the user's mouth, when the earphone 10 is in the wearing state, the inclination angle α between the projection of the upper side or the lower side of the sound production component 11 on the sagittal plane and the horizontal direction may be within a range of 15°-19°, and the angle θ3 between the connecting line OP and the projection of the upper side or lower side of the sound production component on the sagittal plane may be within a range of 30°-70°. In some embodiments, the included angle θ3 between the connecting line OP and the projection of the upper side or lower side of the sound production component on the sagittal plane may be within a range of 40°-60°. In such cases, the line connecting the first sound hole and the second sound hole may point to the mouth of the user more accurately, and the collection effect of the user's speech by the first microphone and the second microphone is better.

Figure 15:
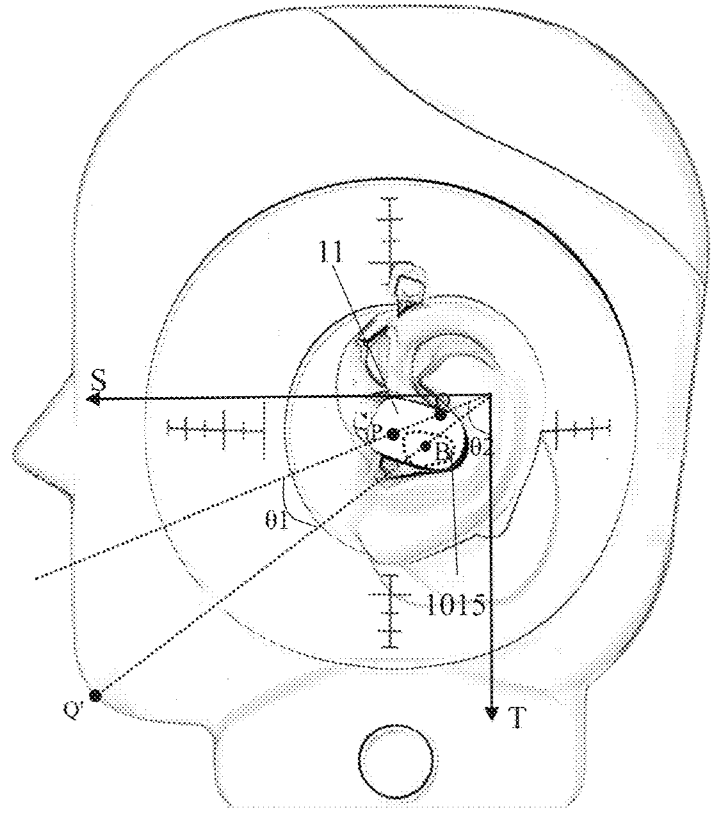
FIG. 15 is a schematic diagram illustrating an exemplary wearing of an earphone according to some embodiments of the present disclosure.

FIG. 15 is a schematic diagram illustrating an exemplary wearing of an earphone according to some other embodiments of the present disclosure. When the line connecting the first sound hole 1191 and the second sound hole 1192 points to the face of the user (e.g., when the line points to a middle region between a sagittal axis S and a vertical axis T in FIG. 15), the first microphone and the second microphone may have a relatively good sound collection effect. When the line connecting the first sound hole 1191 and the second sound hole 1192 points to the region between the user's mouth and the bottom of the mandible of the user, the sound collection effect of the first microphone and the second microphone may be relatively good. In such cases, in some embodiments, to improve the sound collection effect of the earphone 10, the line connecting the first sound hole 1191 and the second sound hole 1192 may point to or approximately point to the region between the user's mouth and the bottom of the mandible of the user. In some embodiments, the bottom of the mandible of the user refers to a point of the mandible of the user farthest from the user's ear.

Referring to FIG. 15, when the earphone 10 is in the wearing state, the bottom of the mandible of the user may have a fifth projection point Q' on the sagittal plane of the user, and the centroid of the projection of the opening of the ear canal of the user on the sagittal plane (e.g., the dotted line region 1015 in FIG. 15) is B. Since a least a portion of the sound production component 11 of the earphone 10 extends into the user's concha cavity in the wearing state, a line connecting the fifth projection point Q' and the centroid B of the projection of the opening of the ear canal on the sagittal plane may reflect the relative position relationship between the sound production component 11 and the bottom of the mandible of the user.

Figure 18:
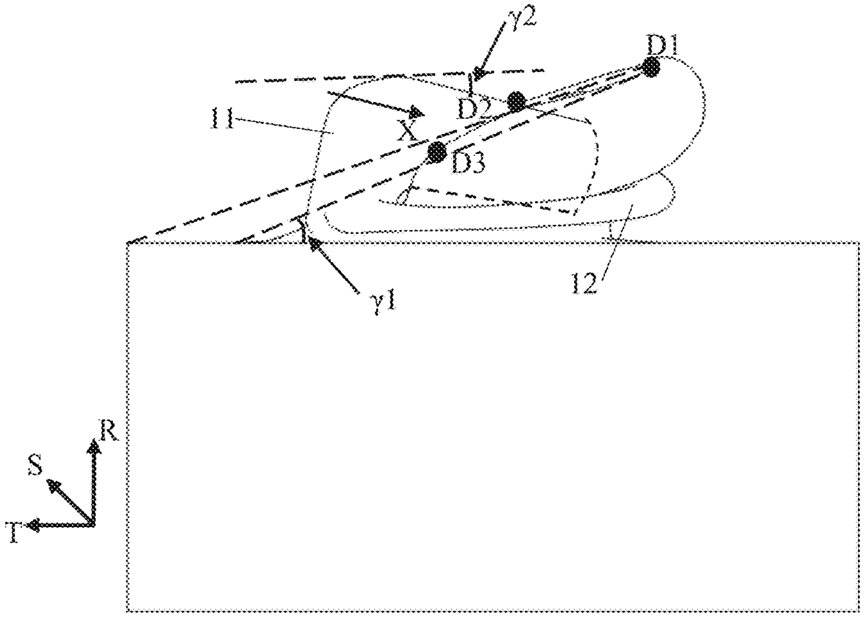
FIG. 18 is a schematic diagram illustrating an exemplary position distribution of a sound production component relative to an auricular according to some embodiments of the present disclosure.

Continuing to refer to FIG. 18, the first sound hole 1191 may have a first projection point P on the sagittal plane of the user, and the second sound hole 1192 may have a second projection point O on the sagittal plane of the user. In some embodiments, to make the first sound hole 1191 and the second sound hole 1192 have better directivity, that is, to make the line connecting the first sound hole 1191 and the second sound hole 1192 point to the region between the user's mouth and the bottom of the mandible, an angle θ1 between the line connecting the first projection point P and the second projection point O and the line connecting the fifth projection point Q' and the centroid B of the projection of the opening of the ear canal on the sagittal plane may be not greater than 45°. In some embodiments, the angle θ1 may be 6°-35°. In such cases, the line connecting the first sound hole 1191 and the second sound hole 1192 may point to the region near the user's mouth. In some embodiments, the angle θ1 may be 10°-25°, in such cases, the line connecting the first sound hole 1191 and the second sound hole 1192 may point to the user's mouth more accurately.

When the line connecting the first projection point P of the first sound hole 1191 on the sagittal plane and the second projection point O of the second sound hole 1192 on the sagittal plane points to the region between the user's mouth and the bottom of the mandible, the first microphone and the second microphone may have better sound collection effects. The positions of the first projection point P and the second projection point O are further described by taking the vertical axis of the user as a reference. Referring to FIG. 13 and FIG. 15, to make the line connecting the first projection point P and the second projection point O point to the region between the user's mouth and the end point of the bottom of the mandible, so as to obtain the user's voice when speaking effectively, the line connecting the first projection point P and the second projection point O has corresponding critical directions, for example, the sagittal axis S and the vertical axis T shown in FIG. 13. When the line connecting the first projection point P and the second projection point O is in the S-T coordinate system, the sound collection effect of the first microphone and the second microphone may be improved. Based on the descriptions above, to make the whole or a portion of the sound production component 11 extend into the concha cavity, increase an area of the region of the concha cavity covered by the sound production component 11, reduce the size of the gap formed between the sound production component 11 and the edge of the concha cavity, and improve the listening volume at the opening of the ear canal, in some embodiments, the inclination angle α between the projection of the upper side or the lower side of the sound production component 11 on the sagittal plane and the horizontal direction may be within a range of 10°-28° when the earphone 10 is in the wearing state, and the angle θ2 between the line connecting the first projection point P and the second projection point O and the vertical axis of the user may be less than 90°. To make the line connecting the first projection point P and the second projection point 0 point to the region between the user's mouth and the bottom of the mandible of the user, so as to improve the sound collection effect of the first microphone and the second microphone when the user speaks, in some embodiments, the angle α between the projection of the upper side US or the lower side LS of the sound production component on the sagittal plane and the horizontal direction may be within a range of 13°-21°, and the angle θ2 between the line connecting the first projection point P and the second projection point O and the vertical axis of the user may be in a range of 20°-80°. In some embodiments, to make the line connecting the first projection point P and the second projection point O point to the mouth of the user, the angle α between the projection of the upper side US or the lower side LS of the sound production component on the sagittal plane and the horizontal direction may be within a range of 14°-19°, and the angle θ2 between the line connecting the first projection point P and the second projection point O and the vertical axis of the user may be in a range of 40°-60°. In such cases, the line connecting the first projection point P and the second projection point O may point to the user's mouth more accurately.

Figure 16A:
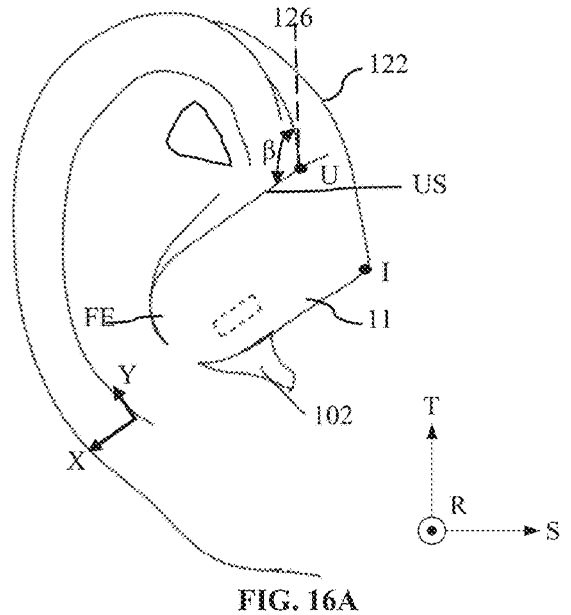
FIG. 16A is a schematic diagram illustrating an exemplary wearing of an earphone according to some embodiments of the present disclosure.
Figure 16B:
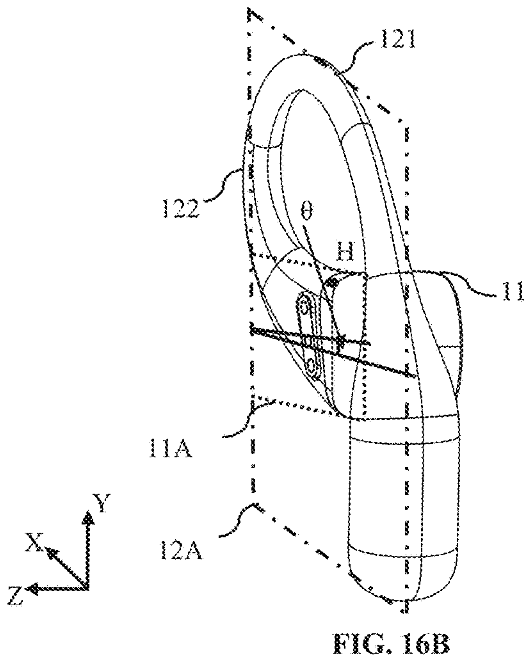
FIG. 16B is a schematic diagram illustrating a structure of an earphone in a non-wearing state according to some embodiments of the present disclosure.

FIG. 16A is a schematic diagram illustrating an exemplary wearing of an earphone according to some embodiments of the present disclosure. FIG. 16B is a schematic diagram illustrating a structure of an earphone in a non-wearing state according to some embodiments of the present disclosure.

Referring to FIG. 16A, in some embodiments, when the user wears the earphone, to make a portion or the whole of the sound production component may extend into the concha cavity, a certain included angle may be formed between the upper side US of the sound production component 11 and the second portion 122 of the ear hook. The included angle may be expressed by an included angle β between the projection of the upper side US of the sound production component 11 on the sagittal plane and a tangent line 126 of a projection of a connection part between the second portion 122 of the ear hook and the upper side US of the sound production component 11 on the sagittal plane. Specifically, the upper sidewall of the sound production component 11 and the second portion 122 of the ear hook may have the connection part. The projection of the connection part on the sagittal plane may be a point U. The tangent line 126 of the projection of the second portion 122 of the ear hook may be drawn through the point U. When the upper side US is a curved surface, the projection of the upper side US on the sagittal plane may be the curved line or the broken line. At this time, the included angle between the projection of the upper side US on the sagittal plane and the tangent line 126 may be an included angle between a tangent line to a point at which the curved line or the broken line has a largest distance from the ground plane and the tangent line 126. In some embodiments, when the upper side US is the curved surface, a tangent line parallel to the major axis direction X on the projection may also be selected, and an included angle between the tangent line and the horizontal direction may represent an included angle between the projection of the upper side US on the sagittal plane and the tangent line 126. In some embodiments, the included angle β may be within a range of 100°-150°. In some embodiments, the included angle β may be within a range of 110°-140°. In some embodiments, the included angle β may be within a range of 120°-135°.

The human head is approximately regarded as a quasi-sphere structure, and the auricle is a structure that protrudes relative to the head. When the user wears the earphone, a portion of the ear hook may be attached to the head of the user. To make the sound production component 11 extend into the concha cavity 102, a certain inclination angle may be formed between the sound production component 11 and the ear hook plane. The inclination angle may be represented by an included angle between a plane corresponding to the sound production component 11 and the ear hook plane. In some embodiments in the present disclosure, the ear hook plane refers to a plane (e.g., a plane where the dotted line 12A in FIG. 14B is located) formed by a bisector that bisects or roughly bisects the ear hook along a length extension direction of the ear hook 12. In some embodiments, the ear hook plane may also be a plane formed by three most protruding points on the ear hook, i.e., a plane that supports the ear hook when the ear hook is placed freely (without external force). For example, when the ear hook is placed on a horizontal plane, the horizontal plane may support the ear hook, and the horizontal plane may be regarded as the ear hook plane. In some embodiments, a plane 11A corresponding to the sound production component 11 may include a sidewall (also referred to as an inner side) of the sound production component 11 facing the anterolateral side of the auricle of the user, or a sidewall (also referred to as an outer side) away from the anterolateral side of the auricle of the user. When the sidewall of the sound production component 11 facing the anterolateral side of the auricle of the user or the sidewall of the sound production component 11 away from the anterolateral side of the auricle of the user is a curved surface, the plane corresponding to the sound production component 11 refers to a tangent plane corresponding to the curved surface at a center position, or a plane approximately coinciding with a curve enclosed by the contour of the edge of the curved surface. Taking the plane 11A of the sound production component 11 facing the anterolateral side of the auricle of the user as an example, the included angle θ formed between the plane 11A and an ear hook plane 12A may be the inclination angle of the sound production component 11 relative to the ear hook plane. In some embodiments, the included angle θ may be measured by the following exemplary method. The projection of the sidewall (hereinafter referred to as the inner side) of the sound production component 11 close to the ear hook 12 on an X-Y plane and the projection of the ear hook 12 on the X-Y plane may be obtained along the minor axis direction Y, respectively. A first straight line may be drawn by selecting two most protruding points of a side of the projection of the ear hook 12 on the X-Y plane close to (or away from) the projection of the inner side of the sound production component 11 on the X-Y plane. When the projection of the inner side of the sound production component 11 on the XY plane is a straight line, an included angle between the first straight line and the projection of the inner side on the X-Y plane may be the included angle θ. When the inner side of the sound production component 11 is the curved line, the included angle between the first straight line and the major axis direction X may be approximately regarded as the included angle θ. It should be noted that the inclination angle θ of the sound production component 11 relative to the ear hook plane in both the wearing state and the non-wearing state of the earphone may be measured using the method. The difference lies in that in the non-wearing state, the inclination angle θ may be directly measured using the method; in the wearing state, the inclination angle θ may be measured using the method when the earphone is worn on the human head model or an ear model. Considering that if the angle is too large, the contact area between the sound production component 11 and the anterolateral side of the auricle of the user may be small, which may not provide sufficient contact resistance, and the earphone may be prone to fall off when the user wears the earphone. In addition, the size of the gap formed in the quasi-cavity structure between the sound production component 11 and the concha cavity 102 of the user may be too large, which may affect the listening volume at the opening of the ear canal of the user. If the angle is too small, the sound production component 11 may not effectively extend into the concha cavity when the user wears the earphone.

Figure 17A:
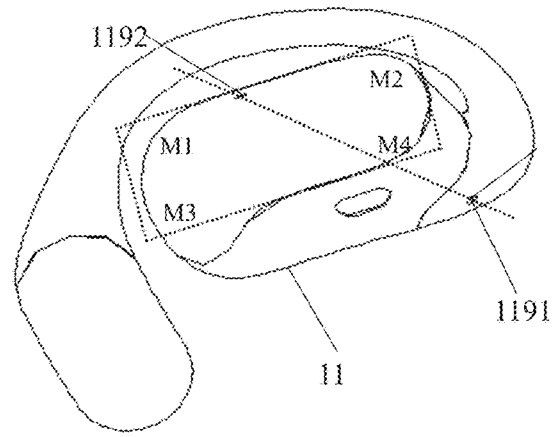
FIG. 17A is a schematic diagram illustrating an exemplary structure of an earphone according to some other embodiments of the present disclosure.
Figure 17B:
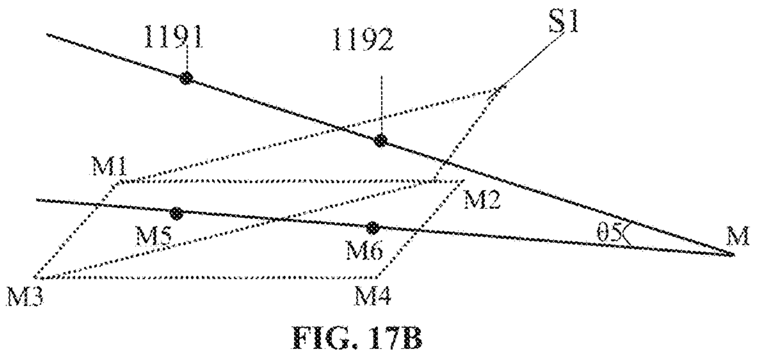
FIG. 17B is a schematic diagram illustrating an angle between a line connecting a first sound hole and a second sound hole and an outer side of a sound production component according to some embodiments of the present disclosure.

Considering from the perspective of microphone collection, the line connecting the first sound hole 1191 and the second sound hole 1192 on the sound production component 11 needs to point to the region between the mouth of the user and the end point of the bottom of the mandible as far as possible to ensure the microphone sound collection effect, so that the line connecting the first sound hole 1191 and the second sound hole 1192 need to be at an angle to the outer or inner side of the sound production component 11. Specific descriptions are found in FIG. 17A or FIG. 17B and their corresponding contents. FIG. 17A is a schematic diagram illustrating an exemplary structure of an earphone according to some other embodiments of the present disclosure. FIG. 17B is a schematic diagram illustrating the angle between the line connecting the first sound hole and the second sound hole and the outer side of the sound production component according to some embodiments of the present disclosure. Referring to FIGS. 17A and 17B, in some embodiments, the angle between the line connecting the first sound hole 1191 and the second sound hole 1192 and the outer side of the sound production component 11 may be indicated as θ5. In some embodiments, the outer side of the sound production component 11 may be a plane. In such cases, the angle between the line connecting the first sound hole and the second sound hole and the outer side may be an angle between the line connecting the first sound hole and the second sound hole and the plane. In some embodiments, the outer side of the sound production component 11 may be a curved plane, and the angle between the line connecting the first sound hole and the second sound hole and the outer side refers to an angle between the line connecting the first sound hole and the second sound hole and a plane tangent to the curved plane of the outer side. Take the outer side being a plane as an example for illustration. In some embodiments, the outer side of the sound production component 11 may be indicated by four points M1, M2, M3, and M4 on the outer side. In some embodiments, the first sound hole 1191 and the second sound hole 1192 may be disposed on the same side or on different sides of the sound production component 11. For example, in some embodiments, the first sound hole 1191 and the second sound hole 1192 may both be disposed on the outer side of the sound production component 11. As another example, in some embodiments, the first sound hole 1191 may be disposed on the front side of the sound production component 11, and the second sound hole 1192 may be disposed on the outer side of the sound production component 11. As another example, in some embodiments, the first sound hole 1191 may be disposed on the lower side of the sound production component 11, and the second sound hole 1192 may be disposed on the outer side of the sound production component 11.

As shown in FIG. 17B, the first sound hole 1191 has a projection point M5 on the outer side M1M2M3M4, and the second sound hole 1192 has a projection point M6 on the outer side M1M2M3M4.

The angle θ5 between the line connecting the first sound hole 1191 and the second sound hole 1192 and the outer side of the sound production component 11 refers to an angle between the line connecting the projection point M5 and the projection point M6 and the line connecting the first sound hole 1191 and the second sound hole 1192. It should be understood that the angle θ5 may reflect the relative position relationship between the first sound hole 1191 and the second sound hole 1192 in the thickness direction of the sound production component 11, and may further reflect the directivity of the line connecting the first sound hole 1191 and the second sound hole 1192 relative to the user's mouth.

In conjunction with FIG. 16A to FIG. 17B, to ensure that the user may have a better listening effect and the stability when wearing the earphone 10, and also to make the line connecting the first sound hole 1191 and the second sound hole 1192 have the better directivity, thereby ensuring that the first sound hole 1191 and the second sound hole 1192 have a better sound collection effect, in some embodiments, when the earphone is in a wearing state, the included angle θ of the sound production section 11 relative to the ear hook plane may be within a range of 15°-28°, and the included angle θ5 between the line connecting the first sound hole 1191 and the second sound hole 1192 and the outer side of the sound production section 11 is controlled to be within a range of 0°-60°, wherein the ear hook plane may be represented by Si shown in FIG. 17B, and to enable the line connecting the first sound hole 1191 and the second sound hole 1192 to point to a region on the front side of the user, an inclination direction of the sound production component 11 (the outer side of the sound production component 11) relative to the ear hook plane is different from that of the line connecting the first sound hole 1191 and the second sound hole 1192 relative to the outer side of the sound production component 11. From the perspective of vectors, if the included angle of the sound production component 11 (the outer side of the sound production component 11) relative to the ear hook plane is considered to be positive, the included angle of the line connecting the first sound hole 1191 and the second sound hole 1192 relative to the outer side of the sound production component 11 is negative. In some embodiments, in order to make the line connecting the first sound hole and the second sound hole point to the region between the mouth of the user and the endpoint of the bottom of the mandible, the first sound hole and the second sound hole may be provided on different sides of the sound production component, the included angle θ of the sound production component 11 relative to the ear hook plane may be within a range of 16° to 25°, and the included angle θ5 between the line connecting the first sound hole 1191 and the second sound hole 1192 and the outer side of the sound production component 11 may be within a range of 18° to 50°, where the angle between the line connecting the first sound hole 1191 and the second sound hole 1192 and the outer side of the sound production component 11 is greater than the inclination angle of the sound production component 11 relative to the ear hook plane, which may make the line connecting first sound hole 1191 and the second sound hole 1192 more accurately point to the mouth area of the user. In some embodiments, the included angle θ of the sound production component 11 relative to the ear hook plane of the ear hook may be within a range of 18°-23°, and the included angle θ5 between the line connecting the first sound hole 1191 and the second sound hole 1192 and the outer side of the sound production component 11 may be within a range of 25°-38°.

Due to the elasticity of the ear hook, the included angle of the sound production component 11 relative to the ear hook plane 12A may vary in the wearing state and the non-wearing state. For example, the included angle in the non-wearing state may be smaller than that in the wearing state. In some embodiments, when the earphone is in the non-wearing state, the included angle of the sound production component 11 relative to the ear hook plane may be within a range of 15°-23°, and the ear hook of the earphone 100 may produce a certain clamping force on the ear of the user when the earphone 100 is in the wearing state, thereby improving the wearing stability for the user without affecting the wearing experience of the user. In some embodiments, in the non-wearing state, the included angle of the sound production component 11 relative to the ear hook plane 12A may be within a range of 16.5°-21°. In some embodiments, in the non-wearing state, the included angle of the sound production component 11 relative to the ear hook plane 12A may be within a range of 18°-20°.

When the size of the sound production component 11 in the thickness direction Z is too small, a volume of the front cavity and the rear cavity formed by the diaphragm and the housing of the sound production component 11 may be too small, a vibration amplitude of the vibration may be limited, and a large sound volume may not be provided. When the size of the sound production component 11 in the thickness direction Z is too large, the end FE of the sound production component 11 may not completely abut against the edge of the concha cavity 102 in the wearing state, causing the earphone to easily fall off. The sidewall of the sound production component 11 facing the ear of the user in the coronal axis direction may have an inclination angle relative to the ear hook plane, and a distance between a point on the sound production component 11 farthest from the ear hook plane and the ear hook plane may be the size of the sound production component 11 in the thickness direction Z. As the sound production component 11 is arranged obliquely relative to the ear hook plane, the point on the sound production component 11 farthest from the ear hook plane refers to an intersection point I between the fixed end connected to the ear hook, the lower side, and the outer side of the sound production component 11. Further, the extent to which the sound production component 11 extends into the concha cavity 11 may be determined by the distance between a point on the sound production component 11 closest to the ear hook plane and the ear hook plane. The size of the gap formed between the sound production component 11 and the concha cavity may be small and the wearing comfort for the user may be improved by setting the distance between the point on the sound production component 11 closest to the ear hook plane and the ear hook plane to be within an appropriate range. The point on the sound production component 11 closest to the ear hook plane refers to an intersection point H between the end FE, the upper sidewall, and the inner side of the sound production component 11. In some embodiments, to ensure that the sound production component 11 has a better acoustic output effect and the wearing stability and comfort, when the earphone is in the wearing state, the distance between the point I on the sound production component 11 farthest from the ear hook plane 12A and the ear hook plane 12A may be within a range of 11.2 mm-16.8 mm, and the distance between the point H on the sound production component 11 closest to the ear hook plane 12A and the ear hook plane 12A may be within a range of 3 mm-5.5 mm. In some embodiments, the distance between the point I on the sound production component 11 farthest from the ear hook plane 12A and the ear hook plane 12A may be within a range of 12 mm-15.6 mm, and the distance between the point H on the sound production component 11 closest to the ear hook plane 12A and the ear hook plane 12A may be within a range of 3.8 mm-5 mm. In some embodiments, the distance between the point I on the sound production component 11 farthest from the ear hook plane 12A and the ear hook plane 12A may be within a range of 13 mm-15 mm, and the distance between the point H on the sound production component 11 closest to the ear hook plane 12A and the ear hook plane 12A may be within a range of 4 mm-5 mm.

FIG. 18 is a schematic diagram illustrating an exemplary wearing state of an earphone according to some other embodiments of the present disclosure. Referring to FIG. 18, in some embodiments, when the earphone is in the wearing state, at least a portion of the sound production component 11 of the earphone may extend into the concha cavity of the user to ensure the acoustic output effect of the sound production component 11 while improving the wearing stability of the earphone through the force exerted by the concha cavity on the sound production component 11. At this time, the sidewall of the sound production component 11 away from the head of the user or facing the opening of the ear canal of the user may have a certain inclination angle relative to an auricular plane of the user. It should be noted that the sidewall of the sound production component 11 away from the head of the user or facing the opening of the ear canal of the user may be a plane or a curved plane. When the sidewall is the curved plane, the inclination angle of the sidewall of the sound production component 11 away from the head of the user or facing the opening of the ear canal of the user relative to the auricular plane of the user may be represented by an inclination angle of a tangent plane (or a plane roughly coincides with a curve formed by the edge contour of the curved plane) at a center position relative to the auricular plane of the user. It should be noted that in some embodiments of the present disclosure, the auricular plane of the user refers to a plane (e.g., a plane on which points D1, D2, and D3 are located in FIG. 18) on which three points farthest from the sagittal plane of the user in different regions (e.g., the top region of the auricle, the tragus region, and the antihelix) of the auricle of the user are located. As the projection of the sound production component 11 on the sagittal plane is much smaller than the projection of the auricle on the sagittal plane, and the concha cavity is a concave cavity in the structure of the auricle, when the inclination angle of the sound production component 11 relative to the auricular plane is small, e.g., when the sidewall of the sound production component 11 away from the head of the user or facing the opening of the ear canal of the user is approximately parallel to the auricular plane, the sound production component 11 may not extend into the concha cavity, or the size of the gap of the quasi-cavity structure formed between the sound production component 11 and the concha cavity may be very large, and the user may not obtain a good listening effect when wearing the earphone. Meanwhile, the sound production component 11 may not abut against the edge of the concha cavity, and the earphone may be liable to fall off when the user wears the earphone. When the inclination angle of the sound production component 11 relative to the auricular plane is large, the sound production component 11 may excessively extend into the concha cavity and squeeze the ear of the user, and the user may feel a strong sense of discomfort when wearing the earphone for a long time.

Considering from the perspective of microphone collection, the line connecting the first sound hole 1191 and the second sound hole 1192 on the sound production component 11 needs to point to the region between the mouth of the front side of the user and the endpoint of the bottom of the lower mandible as much as possible to ensure the sound collection effect of the microphone. Therefore, the line connecting the first sound hole 1191 and the second sound hole 1192 needs to be at an angle to the outer or inner side of the sound production component 11. Specific descriptions are found in FIG. 17A, or FIG. 17B and the corresponding descriptions thereof.

In conjunction with FIG. 17A, FIG. 17B, and FIG. 18, to ensure that the user may have a better listening effect when wearing the earphone 10 and stability when wearing the earphone 10, and also to make the line connecting the first sound hole 1191 and the second sound hole 1192 have the better directivity so as to ensure that the first sound hole 1191 and the second sound hole 1192 have the better sound collection effect, in some embodiments, when the earphone is in the wearing state, the inclination angle of the sidewall of the sound production component 11 away from the head of the user or facing the opening of the ear canal of the user (the inner side or the outer side) relative to the auricular plane of the user may be within a range of 40°-60°, and the included angle θ5 between the line connecting first sound hole 1191 and the second sound hole 1192 and the outer side of the sound production component 11 may be within a range of 0°-60°. In such cases, a portion of or the whole of the sound production component 11 may extend into the concha cavity of the user, and a contact force between the sound production component 11 and the ear canal of the user may be relatively moderate, thereby achieving more stable wearing relative to the ear of the user, making the user have a more comfortable wearing experience, making the line connecting the first sound hole and the second sound hole have a better directivity, i.e., point to the region between the user's mouth and the bottom point of the mandible. In some embodiments, in order to make a portion of or the whole of the sound production component 11 extend into the concha cavity of the user, and a contact force between the sound production component 11 and the ear canal of the user relatively moderate, thereby achieving more stable wearing relative to the ear of the user, thereby making the user have a more comfortable wearing experience, and to make the line connecting the first sound hole and the second sound hole point to the region between the user's mouth and the bottom point of the mandible, the first sound hole and the second sound hole may be disposed on different sides of the sound production components, and the inclination angle of the sound production component 11 relative to the auricular plane may be controlled to be within a range of 42°-55°, and the included angle θ5 between the line connecting the first sound hole 1191 and the second sound hole 1192 and the outer side of the sound production component 11 may be 10°-50°. In some embodiments, the inclination angle of the sound production component relative to the auricular plane may be controlled to be within a range of 44°-52°, and the included angle θ5 between the line connecting the first sound hole 1191 and the second sound hole 1192 and the outer side of the sound production component 11 may be 25°-38°. It should be noted that, to allow the line connecting the first sound hole 1191 and the second sound hole 1192 to point to the region on the front side of the user, the inclination direction of the sound production component 11 (the outer side) relative to the auricular plane may be different from the line connecting the sound hole 1191 and the second sound hole 1192 relative to the outer side of the sound production component 11, and considering from the perspective of vectors, if the included angle of the sound production component 11 (the outer side of the sound production component 11) relative to the auricular plane is considered to be positive, the included angle of the line connecting the first sound hole 1191 and the second sound hole 1192 relative to the outer side of the sound production component 11 is negative.

It should be noted that, in conjunction with FIG. 18, the auricular plane may be inclined upward relative to the sagittal plane, and the inclination angle between the auricular plane and the sagittal plane may be γ1. To make the end of the sound production component 11 extend into the concha cavity concave relative to the auricle, the outer side or the inner side of the sound production component 11 may be inclined downward relative to the sagittal plane. The inclination angle of the outer side or the inner side of the sound production component 11 relative to the sagittal plane may be γ2. An included angle between the sound production component 11 and the auricular plane may be a sum of the inclination angle γ1 between the auricular plane and the sagittal plane and the inclination angle γ2 between the major axis direction X of the sound production component 11 and the sagittal plane. That is to say, the inclination angle of the outer side or the inner side of the sound production component 11 relative to the auricular plane of the user may be determined by calculating the inclination angle γ1 between the auricular plane and the sagittal plane and the included angle γ1 between the outer side or the inner side of the sound production component 11 and the sagittal plane. The inclination angle between the outer side or the inner side of the sound production component 11 and the sagittal plane may be approximately regarded as the inclination angle between the major axis direction X of the sound production component 11 and the sagittal plane. In some embodiments, the inclination angle may also be calculated by an included angle between a projection of the auricular plane on a plane formed by a T-axis and an R-axis (hereinafter referred to as a T-R plane) and a projection of the outer side or the inner side of the sound production component 11 on the T-R plane. When the outer side or the inner side of the sound production component 11 is a plane, the projection of the outer side or the inner side of the sound production component 11 on the T-R plane may be a straight line. An included angle between the straight line and the projection of the auricular plane on the T-R plane may be the inclination angle of the sound production component 11 relative to the auricular plane. When the outer side or the inner side of the sound production component 11 is a curved surface, the inclination angle of the sound production component 11 relative to the auricular plane may be approximately regarded as the included angle between the major axis direction X of the sound production component 11 and the projection of the auricular plane on the T-R plane.

Figure 19:
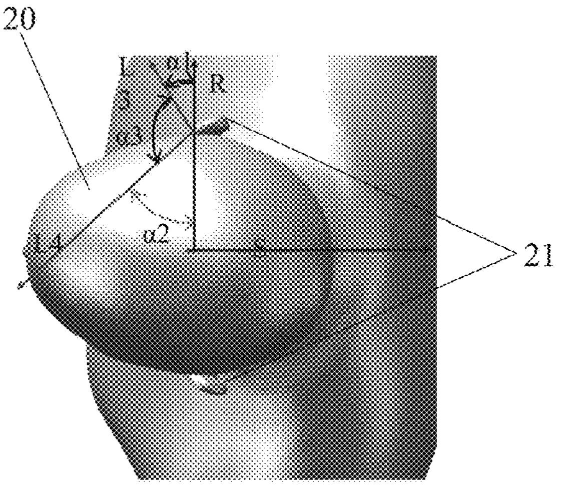
FIG. 19 is a schematic diagram illustrating an exemplary distribution of a line connecting a first sound hole and a second sound hole relative to a coronal axis, according to another embodiment of the present disclosure.

FIG. 19 is a schematic diagram illustrating an exemplary wearing state of an earphone according to some other embodiments of the present disclosure. As shown in FIG. 19, to further illustrate the positions of the first sound hole 1191 and the second sound hole 1192 on the earphone, a coronal axis R of the user is used for description. When the angle between the line connecting the first sound hole 1191 and the second sound hole 1192 and the coronal axis is too small, the line connecting the first sound hole 1191 and the second sound hole 1192 may be approximately regarded as pointing to the left or right of the head of the user. As a result, the sound collection effect of the microphone when collecting the user's speech is not good. When the angle between the line connecting the first sound hole 1191 and the second sound hole 1192 and the coronal axis is too great, the line connecting the first sound hole 1191 and the second sound hole 1192 may point directly to the user's head. As a result, the sound collection effect of the microphone when collecting the user's speech is not good. To ensure that the line connecting the first sound hole 1191 and the second sound hole 1192 points to the front of the human face as much as possible, the angle between the line connecting the first sound hole 1191 and the second sound hole 1192 and the coronal axis of the user (e.g., the R axis in FIG. 18, the R axis is perpendicular to the sagittal plane (i.e., an S-T plane)) may be within a range of −30°-−135°, which may ensure that the line connecting the first sound hole 1191 and the second sound hole 1192 may point to the front side of the human face. More descriptions regarding the angle between the line connecting the first sound hole 1191 and the second sound hole 1192 and the coronal axis of the user may be found in FIG. 19 and the relevant descriptions thereof.

Referring to FIG. 19, FIG. 19 illustrates a relative relationship between the user's head and the coronal axis and the sagittal axis of the user. A reference sign 20 indicates the user's head, and reference sign 21 indicates the user's ear. As shown in FIG. 19, in some embodiments of the present disclosure, a direction of the coronal axis shown in FIG. 19 may be used as a reference, and a radial L3 and a radial L4 may indicate the critical directions of the line connecting the first sound hole 1191 and the second sound hole 1192. That is, when the line connecting the first sound hole 1191 and the second sound hole 1192 is between the radial L3 and the radial L4, the line connecting the first sound hole 1191 and the second sound hole 1192 may point to the front side of the user's face. In some embodiments, an angle $\alpha$1 between the radial L3 and the coronal axis R is about 30°, and an angle $\alpha$2 between the radial L4 and the sagittal axis S is about 45°. Accordingly, an angle $\alpha$3 between the line connecting the first sound hole 1191 and the second sound hole 1192 and the coronal axis R of the user may be within a range of −30°-−135°. In some embodiments, the angle $\alpha$3 may be within a range of −50°-−125°. In such cases, the line connecting the first sound hole 1191 and the second sound hole 1192 may point to the region close to the user's mouth. In some embodiments, the angle $\alpha$3 may be within a range of −90°-−115°. In such cases, the line connecting the first sound hole 1191 and the second sound hole 1192 may point to the region between the user's mouth and the bottom point of the mandible. When the angle $\alpha$3 is −90°, the line connecting the first sound hole 1191 and the second sound hole 1192 may be parallel to the sagittal plane of the user. It should be noted that the angle here is determined with the clockwise direction as a positive direction.

Figure 20:
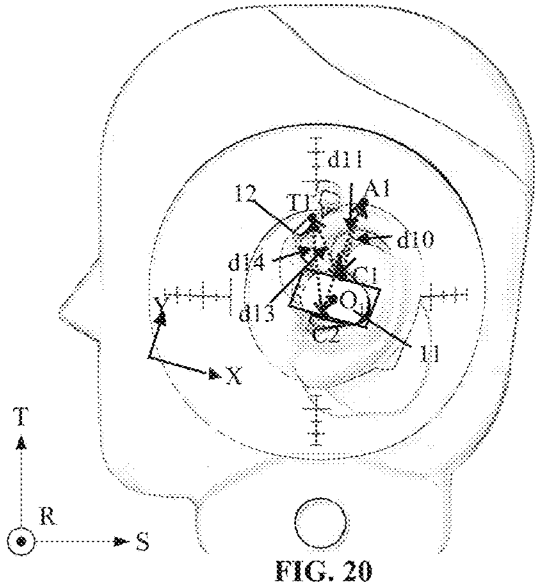
FIG. 20 is a schematic diagram illustrating an exemplary wearing of an earphone according to some embodiments of the present disclosure.

The whole or a portion of the sound production component 11 may extend into the concha cavity to form the quasi-cavity structure as shown in FIG. 4. The listening volume when the user wears the earphone 10 may be related to the size of the gap formed between the sound production component 11 and the edge of the concha cavity. The smaller the size of the gap, the greater the listening volume at the opening of the ear canal of the user. The size of the gap formed between the sound production component 11 and the edge of the concha cavity may not only be related to the inclination angle between the projection of the upper sidewall or the lower sidewall of the sound production component 11 on the sagittal plane and the horizontal plane, but also be related to the size of the sound production component 11. For example, if the size of the sound production component 11 (especially the size along the minor axis direction Y in FIG. 20) is too small, the gap formed between the sound production component 11 and the edge of the concha cavity may be too large, which affects the listening volume at the opening of the ear canal of the user. When the size of the sound production component 11 (especially the size along the minor axis direction Y in FIG. 20) is too large, the sound production component 11 may have few parts extending into the concha cavity, or the sound production component 11 may completely cover the concha cavity. At this time, the opening of the ear canal may be equivalent to being blocked, the communication between the opening of the ear canal and the external environment may not be realized, and the original design intention of the earphone may not be achieved. In addition, the excessively large size of the sound production component 11 may affect the wearing comfort of the user and the convenience of carrying around. As shown in FIG. 20, in some embodiments, the distance between a midpoint of the projection of the upper sidewall and the lower sidewall of the sound production component 11 on the sagittal plane and the highest point of the second projection may reflect the size of the sound production component 11 along the minor axis direction Y and the position of the sound production component 11 relative to the concha cavity. To improve the listening effect of the earphone 10 while ensuring that the earphone 10 does not block the opening of the ear canal of the user, in some embodiments, the distance d10 between midpoint C1 of the projection of the upper sidewall of the sound production component 11 on the sagittal plane and the highest point A1 of the second projection may be within a range of 20 mm-38 mm, and a distance d11 between the midpoint C2 of the projection of the lower sidewall of the sound production component 11 on the sagittal plane and the highest point A1 of the second projection may be within a range of 32 mm-57 mm. In some embodiments, the distance d10 between the midpoint C1 of the projection of the upper sidewall of the sound production component 11 on the sagittal plane and the highest point A1 of the second projection may be within a range of 24 mm-36 mm, and the distance d11 between the midpoint C2 of the projection of the lower sidewall of the sound production component 11 on the sagittal plane and the highest point A1 of the second projection may be within a range of 36 mm-54 mm. In some embodiments, the distance between the midpoint C1 of the projection of the upper sidewall of the sound production component 11 on the sagittal plane and the highest point A1 of the second projection may be within a range of 27 mm-34 mm, and the distance between the midpoint C2 of the projection of the lower sidewall of the sound production component 11 on the sagittal plane and the highest point A1 of the second projection may be within a range of 38 mm-50 mm. It should be noted that, when the projection of the upper sidewall of the sound production component 11 on the sagittal plane is the curved line or the broken line, the midpoint C1 of the projection of the upper sidewall of the sound production component 11 on the sagittal plane may be selected by the following example. A line segment may be drawn by selecting two farthest points on the projection of the upper sidewall on the sagittal plane along the major axis direction, a mid-perpendicular line may be drawn by selecting a midpoint on the line segment, and an interaction point of the mid-perpendicular line and the projection may be the midpoint of the projection of the upper sidewall of the sound production component 11 on the sagittal plane. In some alternative embodiments, a point of the projection of the upper sidewall on the sagittal plane with a smallest distance from the highest point of the second projection may be selected as the midpoint C1 of the projection of the upper sidewall of the sound production component 11 on the sagittal plane. The midpoint of the projection of the lower sidewall of the sound production component 11 on the sagittal plane may be selected in the same manner as above. For example, a point of the projection of the lower sidewall on the sagittal plane with a largest distance from the highest point of the second projection may be selected as the midpoint C2 of the projection of the lower sidewall of the sound production component 11 on the sagittal plane.

In some embodiments, a distance (also referred to as a seventh distance) between the midpoint of the projection of the upper sidewall of the sound production component 11 on the sagittal plane and the projection of the vertex of the ear hook on the sagittal plane and a distance (also referred to as an eighth distance) between the midpoint of the projection of the lower sidewall of the sound production component 11 on the sagittal plane and the projection of the vertex of the ear hook on the sagittal plane may reflect the size of the sound production component 11 along the minor axis direction Y. The upper vertex of the ear hook may be a position on the ear hook that has the largest distance relative to a specific point on the neck of the user in the vertical axis direction when the user wears the earphone. To improve the listening effect of the earphone 10 while ensuring that the earphone 10 does not block the opening of the ear canal of the user, in some embodiments, a distance d13 between the midpoint C1 of the projection of the upper sidewall of the sound production component 11 on the sagittal plane and the projection of the upper vertex T1 of the ear hook on the sagittal plane may be within a range of 17 mm-36 mm, and a distance d14 between the midpoint C2 of the projection of the lower sidewall of the sound production component 11 on the sagittal plane and the projection of the upper vertex T1 of the ear hook on the sagittal plane may be within a range of 28 mm-52 mm. In some embodiments, the distance d13 between the midpoint C1 of the projection of the upper sidewall of the sound production component 11 on the sagittal plane and the projection of the upper vertex T1 of the ear hook on the sagittal plane may be within a range of 21 mm-32 mm, and the distance d14 between the midpoint C2 of the projection of the lower sidewall of the sound production component 11 on the sagittal plane and the projection of the upper vertex T1 of the ear hook on the sagittal plane may be within a range of 32 mm-48 mm. In some embodiments, the distance d13 between the midpoint C1 of the projection of the upper sidewall of the sound production component 11 on the sagittal plane and the projection of the upper vertex T1 of the ear hook on the sagittal plane may be within a range of 24 mm-30 mm, and the distance d14 between the midpoint C2 of the projection of the lower sidewall of the sound production component 11 on the sagittal plane and the projection of the upper vertex T1 of the ear hook on the sagittal plane may be within a range of 35 mm-45 mm.

In some embodiments, the first sound hole 1191 may be disposed near a connection between the second portion 122 of the ear hook and the sound production component 11. For example, the first sound hole 1191 may be disposed on the second portion 122 of the ear hook or on the sound production component 11. In the present disclosure, the first sound hole 1191 being disposed near the connection between the second portion 122 of the ear hook and the sound production component 11 refers to that a minimum distance between the first sound hole 1191 and the connection is not greater than 4 mm. In some embodiments, a position relationship between the first sound hole 1191 and the second portion 122 of the ear hook as well as the sound production component 11 may be represented by a distance between the projection of the first sound hole 1191 on the sagittal plane and a projection of the connection on the sagittal plane. For example, in some embodiments, the minimum distance between the projection of the first sound hole 1191 on the sagittal plane and the projection of the connection on the sagittal plane may be not greater than 4 mm. In some embodiments, the first sound hole 1191 may be disposed at the connection between the sound production component 11 and the second portion 122 of the ear hook. In some embodiments, the sound production component 11 and the second portion 122 of the ear hook may be mutually independent structures, and the sound production component 11 and the second portion 122 of the ear hook may be connected through splicing, embedding, plugging, etc. The connection between the sound production component 11 and the second portion 122 of the ear hook may refer to a connection gap between the sound production component 11 and the second portion 122 of the ear hook. The projection of the connection between the sound production component 11 and the second portion 122 of the ear hook on the sagittal plane refers to the projection of the connection gap on the sagittal plane. In some embodiments, the first sound hole 1191 being disposed near the connection between the sound production component 11 and the second portion 122 of the ear hook (e.g., the first sound hole 1191 may be disposed on the second portion 122 of the ear hook) may ensure that the first sound hole 1191 is close to the user without occupying an inner space of the sound production component 11, which may facilitate an installation of the transducer and a wiring of an internal circuit, thereby effectively improving production efficiency.

It should further be noted that, in some embodiments, when the sizes of the first sound hole 1191 and the second sound hole 1192 are small, the first sound hole 1191 and the second sound hole 1192 may be approximately regarded as two points. In some embodiments, when the sizes of the first sound hole 1191 and the second sound hole 1192 are relatively large, the distance between the first sound hole 1191 and the connection between the sound production component 11 and the second portion 122 of the ear hook may be understood as a minimum distance from a center of the first sound hole 1191 to the connection between the sound production component 11 and the second portion 122 of the ear hook. Correspondingly, when the size of the first sound hole 1191 is small, the projection of the first sound hole 1191 on the sagittal plane may be approximately regarded as a point. The minimum distance from the projection of the first sound hole 1191 on the sagittal plane to the projection of the connection between the sound production component 11 and the second portion 122 of the ear hook on the sagittal plane refers to the minimum distance from a projection point of the first sound hole 1191 on the sagittal plane to the projection of the connection on the sagittal plane. When the size of the first sound hole 1191 is relatively large, the minimum distance from the projection of the first sound hole 1191 on the sagittal plane to the projection of the connection between the sound production component 11 and the second portion 122 of the ear hook on the sagittal plane refers to the minimum distance from a centroid of the projection of the first sound hole 1191 on the sagittal plane to the projection of the connection on the sagittal plane. Similarly, the distance between the sound hole and a certain side (e.g., an inner side, an upper side) of the sound production component 11 described elsewhere in the present disclosure may be understood as the minimum distance from the center of the sound hole to the side of the sound production component 11.

Taking the first sound hole 1191 being located on the second portion 122 of the ear hook as an example, the position of the first sound hole 1191 on the earphone 10 may be reflected by a ratio of the minimum distance between a projection (e.g., the first projection point P) of the first sound hole 1191 on the sagittal plane and a projection of the connection between the sound production component and the second portion of the ear hook on the sagittal plane to the distance between a midpoint of a projection of an upper or lower side of the sound production component on the sagittal plane and the projection of the upper vertex of the ear hook on the sagittal plane. When the ratio of the minimum distance between the projection of the first sound hole 1191 on the sagittal plane and the projection of connection between the sound production component and the second portion of the ear hook on the sagittal plane to the seventh distance or the eighth distance is too large, e.g., when the first sound hole 1191 is located at the upper vertex T1 of the ear hook, the first sound hole 1191 may be far away from the mouth of the user, which affects the sound collection effect of the first microphone. In addition, when the first sound hole 1191 is too close to the upper apex T1 of the ear hook, the line connecting the first sound hole 1191 and the second sound hole 1192 cannot point to the region of the user's mouth, which affects the sound collection effect when the user speaks. Based on the above problem, in some embodiments, the ratio of the minimum distance between the projection of the first sound hole 1191 on the sagittal plane and the projection of the connection between the sound production component 11 and the second portion 122 of the ear hook on the sagittal plane is the same as that of the sound production component and the second portion of the ear hook to the minimum distance between the midpoint C1 of the projection of the upper side of the sound production component on the sagittal plane and the projection of the upper vertex T1 of the ear hook on the sagittal plane is not greater than 0.25. In some embodiments, the ratio of the minimum distance between the projection of the first sound hole 1191 on the sagittal plane and the projection of the connection between the sound production component 11 and the second portion 122 of the ear hook on the sagittal plane to the minimum distance between the projection of the midpoint C2 of the projection of the lower side of the sound production component on the sagittal plane and the projection of the upper vertex T1 of the ear hook on the sagittal plane is not greater than 0.15.

It should be understood that the positions of the first sound hole 1191 and the second sound hole 1192 shown in FIG. 7 are only illustrative. In some embodiments, the first sound hole 1191 and/or the second sound hole 1192 may be disposed at other unobstructed positions. For example, in some embodiments, the first sound hole 1191 and the second sound hole 1192 may be disposed on the outer side of the sound production component 11. As another example, in some embodiments, the first sound hole 1191 may be disposed on the outer side of the sound production component 11, and the second sound hole 1192 may be disposed on the upper side of the sound production component 11. It should be noted that, in the present disclosure, the inner side of the sound production component 11 refers to a side closest to the user's head when the earphone 10 is worn (referring to an inner side IS in FIGS. 30A and 30B), and the upper side of the sound production component 11 refers to a side farthest from the ground when the earphone 10 is worn (referring to the upper side US in FIGS. 30A and 30B). Correspondingly, the side opposite to the inner side may be regarded as the outer side of the sound production component 11 (referring to an outer side OS in FIG. 30A), and the side opposite to the upper side may be regarded as the lower side of the sound production component 11 (referring to the lower side LS in FIG. 30B). In some embodiments, each of the upper side, the lower side, the inner side, and the outer side of the sound production component 11 may be planar and/or non-planar. Specific distribution regarding positions of the first sound hole 1191 and the second sound hole 1192 are described below with reference to FIG. 21 to FIG. 31B.

Figure 21:
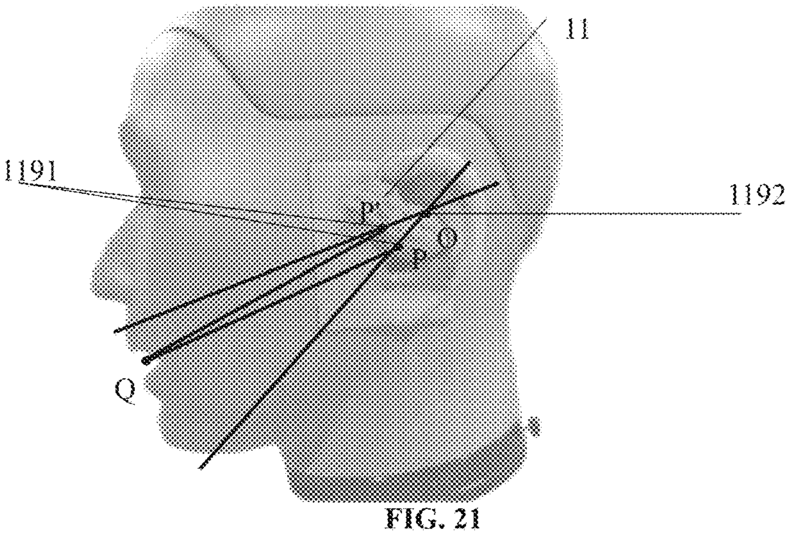
FIG. 21 is a schematic diagram illustrating an exemplary position relationship of a first sound hole, a second sound hole, and a mouth of a user, according to some embodiments of the present disclosure.

FIG. 21 is a schematic diagram illustrating exemplary positional relationships of the first sound hole, the second sound hole, and the mouth of the user according to some embodiments of the present disclosure. As shown in FIG. 21, in some embodiments, the line connecting the first sound hole 1191 and the second sound hole 1192 may point to the user's mouth such that the first sound hole 1191 and the second sound hole 1192 may have a good sound collection effect. As shown in FIG. 21, point O indicates the position of the second sound hole 1192, points P and P' indicate two different positions of the first sound hole 1191, respectively, and point Q indicates the position of the user's mouth. In some embodiments, an included angle between the line connecting the first sound hole 1191 and the second sound hole 1192 and the line connecting the first sound hole 1191 and the user's mouth Q is about 150°, that is, the angle OPQ and/or the angle OP'Q is about 150°. Merely by way of example, in some embodiments, the angle OPQ or the angle OP'Q may be between 140°-180°, that is, the first sound hole 1191, the second sound hole 1192, and the user's mouth may be approximately disposed on a same straight line.

Figure 22:
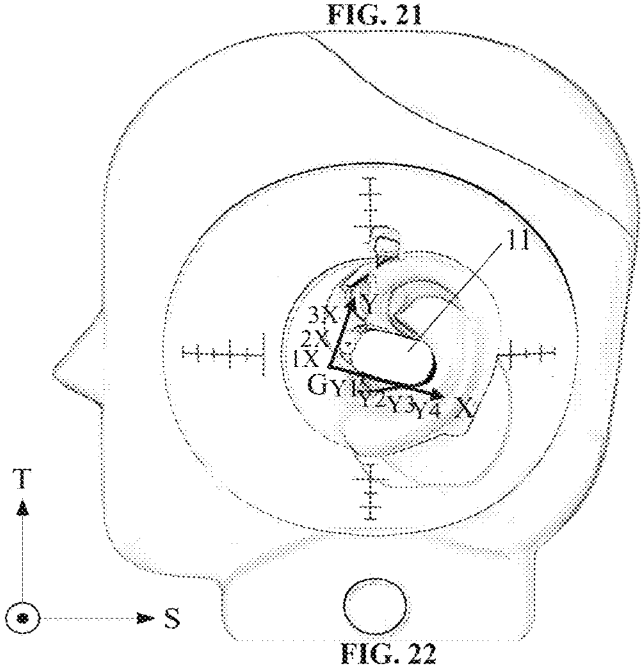
FIG. 22 is a schematic diagram illustrating an exemplary wearing of an earphone according to some other embodiments of the present disclosure.
Figure 23:
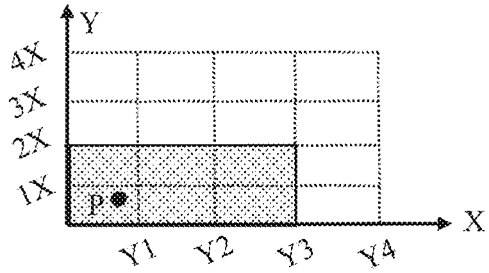
FIG. 23 is a schematic diagram illustrating a coordinate system established along a major axis direction and a minor axis direction of a sound production component according to some embodiments of the present disclosure.

FIG. 22 is a schematic diagram illustrating an exemplary wearing of the earphone according to some other embodiments of the present disclosure, and FIG. 23 is a schematic diagram illustrating an exemplary coordinate system based on a projection of the sound production component on the sagittal plane according to some embodiments of the present disclosure. According to FIG. 22 and FIG. 23, the coordinate system is constructed based on a projection of the sound production component 11 on the sagittal plane. The position of the first sound hole 1191 relative to the sound production component 11 may be represented by coordinates of the coordinate system. A Y axis is parallel to the minor axis direction Y and tangent to the projection of the front side of the sound production component 11 on the sagittal plane. The X axis is parallel to the major axis direction X and tangent to a projection of the lower side of the sound production component 11 on the sagittal plane. In some embodiments, a position of the Y axis may be determined in the following manner: firstly determining the projection of the sound production component 11 on the sagittal plane; determining a tangent line parallel to the minor axis direction Y and tangent to the projection of the rear side of the sound production component 11 on the sagittal plane (also referred to as "tangent line I"); determining a center of a projection of the diaphragm or a magnetic circuit assembly in the sound production component 11 on the sagittal plane; and determining a symmetry line of the tangent I about the center, and determining the symmetry line as a straight line where the Y axis is located.

Referring to FIG. 23, on the Y axis, 1X may indicate a straight line Y=1, 2X may indicate the straight line Y=2, 3X may indicate the straight line Y=3, 4X may indicate the straight line Y=4, etc. Similarly, on the X axis, Y1 may indicate the straight line X=1, Y2 may indicate the straight line X=2, Y3 may indicate the straight line X=3, etc. In some embodiments, the coordinates of points in the coordinate system may be indicated as YX. For example, on the line Y=2, the line Y=2 is parallel to the X axis. As the value of Y=2 remains unchanged, the coordinates of points on the straight line may be uniformly indicated as 2X. When X has different values, different positions may be obtained, such as position 21, position 22, position 23, etc. As shown in FIG. 22 and FIG. 23, in some embodiments, the sound production component 11 may be divided into 4 portions in the major axis direction X, and the sound production component 11 may be divided into 4 portions in the minor axis direction Y. In some embodiments, the sound production component 11 may further be divided into other counts of equal portions in the major axis direction X and the minor axis direction Y. Taking the coordinate system as a reference, a sound collection effect of the first sound hole 1191 at different positions are described below.

Figure 24:
FIG. 24 is a schematic diagram illustrating sound collection curves of a sound hole at different positions according to some embodiments of the present disclosure.
Figure 25:
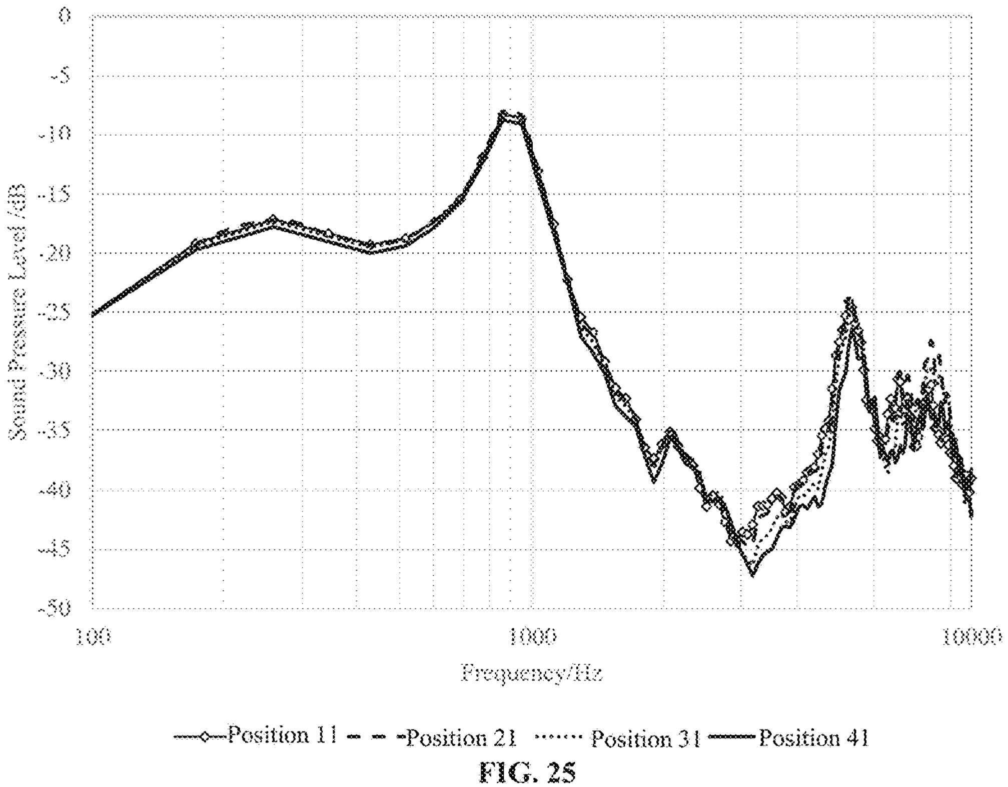
FIG. 25 is a schematic diagram illustrating sound collection curves of a sound hole at different positions according to some other embodiments shown herein.

FIG. 24 is a schematic diagram illustrating sound collection curves of a sound hole at different positions according to some embodiments of the present disclosure. As shown in FIG. 24, when Y=1, the coordinates along the X-axis direction on the straight line Y=1 may be uniformly denoted as 1X, and when X takes on a different value, the corresponding position may be determined, such as position 11, position 12, position 13, position 14, etc. The sound collection at position 11, position 12, position 13, position 14 are respectively shown in FIG. 24. From FIG. 24, it may be seen that at first three points (i.e., position 11, position 12, and position 13) on 1X, sound intensities picked up by the first microphone are close to each other and greater than the sound intensity at position 14, which achieves a good sound collection effect.

Therefore, in some embodiments, to enable the first microphone to have a better sound collection effect while ensuring the second sound hole has a specific distance from the first sound hole, and that the second sound hole may be as far away from the antihelix as possible, a ratio of a distance between the first projection point P of the first sound hole 1191 on the sagittal plane and the projection of the front side of the sound production component 11 on the sagittal plane along the major axis direction X (also referred to as ninth distance) to the size of the projection of the sound production component 11 on the sagittal plane along the major axis direction X may be not greater than 0.75. That is, when the sound production component 11 is divided into 4 equal portions along the major axis direction X, the first projection point P is disposed in a region where X≤3. The closer the first sound hole 1191 to the user's mouth, the better the sound collection effect of the first microphone when the user speaks. To make the first sound hole 1191 close to the user's mouth so as to improve the sound collection effect of the first microphone, in some embodiments, the ratio of the distance between the first projection point P of the first sound hole 1191 on the sagittal plane and the projection of the front side of the sound production component 11 on the sagittal plane along the major axis direction X to the size of the projection of the sound production component 11 on the sagittal plane along the major axis direction X may be not greater than 0.5. In some embodiments, to make the first sound hole 1191 closer to the user's mouth so as to further improve the sound collection effect of the first microphone, the ratio of the distance between the first projection point P of the first sound hole 1191 on the sagittal plane and the projection of the front side of the sound production component 11 on the sagittal plane along the major axis direction X to the size of the projection of the sound production component 11 on the sagittal plane along the major axis direction X may be not greater than 0.3. In some embodiments, to make the first sound hole 1191 closer to the user's mouth so as to further improve the sound collection effect of the first microphone, the ratio of the distance between the first projection point P of the first sound hole 1191 on the sagittal plane and the projection of the front side of the sound production component 11 on the sagittal plane along the major axis direction X to the size of the projection of the sound production component 11 on the sagittal plane along the major axis direction X may be not greater than 0.2. The first sound hole 1191 may be disposed near the front side of the sound production component such that the position of the second acoustic hole 1192 may have more choices, which may ensure that the second sound hole may have a specific distance from the first sound hole and that the second sound hole may be as far away from the antihelix as possible. Accordingly, in some embodiments, the ratio of the distance between the first projection point P of the first sound hole 1191 on the sagittal plane and the projection of the front side of the sound production component 11 on the sagittal plane along the major axis direction X to the size of the projection of the sound production component 11 on the sagittal plane along the major axis direction X may be not greater than 0.1. In some embodiments, the first sound hole 1191 may be disposed on the front side of the sound production component 11. In such cases, in the wearing state, the first sound hole 1191 may be closer to the user's mouth, and the sound collection effect of the first microphone may be better. It should be noted that, for the convenience of understanding, the distance between the first projection point P of the first sound hole 1191 on the sagittal plane and the projection of the front side of the sound production component 11 on the sagittal plane along the major axis direction X refers to a distance between the projection point P and the Y axis, that is, the distance between the first projection point P and the tangent line along the minor axis direction Y and tangent to the projection of the front side of the sound production component 11 on the sagittal plane.

FIG. 24 is a schematic diagram illustrating sound collection curves when the first sound collection hole is located at different positions according to some other embodiments of the present disclosure. As shown in FIG. 24, when X=1, coordinates along the Y axis on the straight line X=1 may be uniformly expressed as Y1, and when Y takes different values, the corresponding positions may be determined, such as position 11, position 21, position 31, position 41, etc. FIG. 24 shows sound collection situations of the first microphone disposed at position 11, position 21, position 31, and position 41, respectively. According to FIG. 24, on Y1, the smaller the Y axis coordinate is, the closer the microphone is to the user's mouth, and the better the sound collection effect of the microphone.

Therefore, in some embodiments, to make the first microphone have a better sound collection effect, a ratio of a distance between the first projection point P of the first sound hole 1191 on the sagittal plane and the projection of the lower side of the sound production component 11 on the sagittal plane along the minor axis direction Y to a size of the projection of the sound production component 11 on the sagittal plane along the minor axis direction Y may be not greater than 1. Considering that when the first sound hole 1191 and the second sound hole 1192 are disposed on the sound production component 11 at the same time, if the first sound hole 1191 is disposed on the upper side or the front side of the sound production component at a position with the maximum distance relative to the major axis direction X, the line connecting the sound hole 1191 and the second sound hole 1192 cannot point to the user's mouth, which may affect the sound collection effect, in some embodiments, the ratio of the distance between the first projection point P of the first sound hole 1191 on the sagittal plane and the projection of the lower side of the sound production component 11 on the sagittal plane along the minor axis direction Y to a size of the projection of the sound production component 11 on the sagittal plane along the minor axis direction Y may be not greater than 0.5. That is, when the sound production component is divided into 4 equal portions along the minor axis direction Y, the first projection point P is disposed in a region where Y≤2. In some embodiments, to make the first sound hole 1191 closer to the user's mouth and the line connecting the sound hole 1191 and the second sound hole 1192 point to the user's mouth, the ratio of the distance between the first projection point P of the first sound hole 1191 on the sagittal plane and the projection of the lower side of the sound production component 11 on the sagittal plane along the minor axis direction Y to a size of the projection of the sound production component 11 on the sagittal plane along the minor axis direction Y may be not greater than 0.4. In some embodiments, the ratio of the distance between the first projection point P of the first sound hole 1191 on the sagittal plane and the projection of the lower side of the sound production component 11 on the sagittal plane along the minor axis direction Y to a size of the projection of the sound production component 11 on the sagittal plane along the minor axis direction Y may be not greater than 0.3. When the first sound hole 1191 is disposed near the lower side of the sound production component, the position of the second sound hole 1192 may have more choices, which may ensure that the second sound hole 1192 may have a specific distance from the first sound hole, and the line connecting the first sound hole and the second sound hole may more accurately point to the user's mouth. In some embodiments, the ratio of the distance between the first projection point P of the first sound hole 1191 on the sagittal plane and the projection of the lower side of the sound production component 11 on the sagittal plane along the minor axis direction Y to a size of the projection of the sound production component 11 on the sagittal plane along the minor axis direction Y may be not greater than 0.1. In some embodiments, the first sound hole 1911 may be disposed on the lower side of the sound production component 11. When the first sound hole 1191 is disposed closer to the lower sidewall or on the lower sidewall, the first sound 1191 may be closer to the user's mouth, and the position of the second sound hole 1192 may have more options, such that the line connecting the first sound hole 1191 and the second sound hole 1192 points to the user's mouth and there is a relative large distance between the first sound hole 1191 and the second sound hole 1192. It should be noted that, for the convenience of understanding, the distance between the first projection point P of the first sound hole 1191 on the sagittal plane and the projection of the lower side of the sound production component 11 on the sagittal plane along the minor axis direction Y refers to a distance between the projection point P and the X axis, that is, a distance between the first projection point P and a tangent along the major axis direction X and tangent to the projection of the lower side of the sound production component 11 on the sagittal plane.

Figure 26:
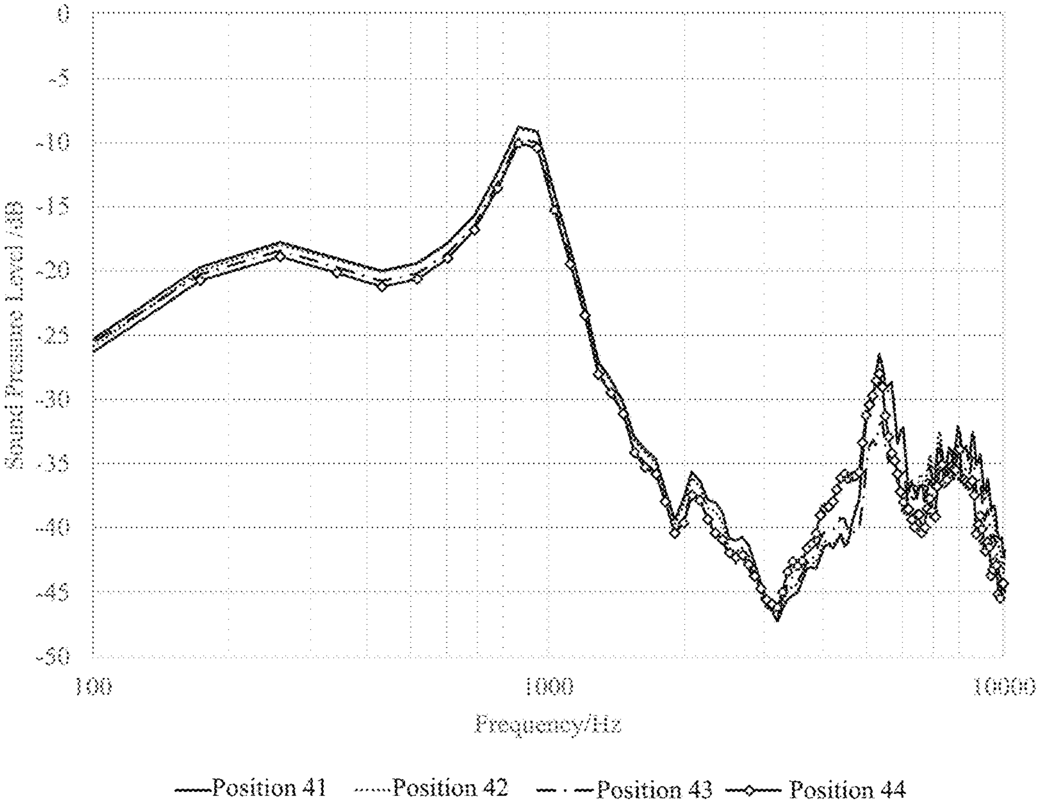
FIG. 26 is a schematic diagram illustrating sound collection curves of a sound hole at different positions according to some other embodiments of the present disclosure.

FIG. 26 is a schematic diagram illustrating sound collection curves when the second sound collection hole is located at different positions according to some other embodiments of the present disclosure. As shown in FIG. 26, when Y=4, coordinates along the X-axis on the straight line Y=4 may be uniformly expressed as 4X, and when X takes different values, the corresponding positions may be determined, such as position 41, position 42, position 43, position 44, etc. FIG. 11 shows sound collection effects at positions 41, 42, 43, and 44, respectively. According to FIG. 26, on 4X, as X increases, a distance from the second sound hole to the user's antihelix becomes smaller, and the influence of a reflection of the antihelix becomes greater. For example, when X is large, a sound collection of the second microphone in a frequency band after 3 kHz significantly increases, which results in different laws of changes of the sound collection curve of the second microphone before and after 3 kHz. That is, if the second sound hole 1192 is disposed at a position close to the antihelix, the sound collection effect of the second sound hole 1192 after 3 kHz may be stronger than the sound collection effect of the first sound hole 1191, which results in poorer sound collection effects of the first microphone and the second microphone to the user's mouth.

Figure 27:
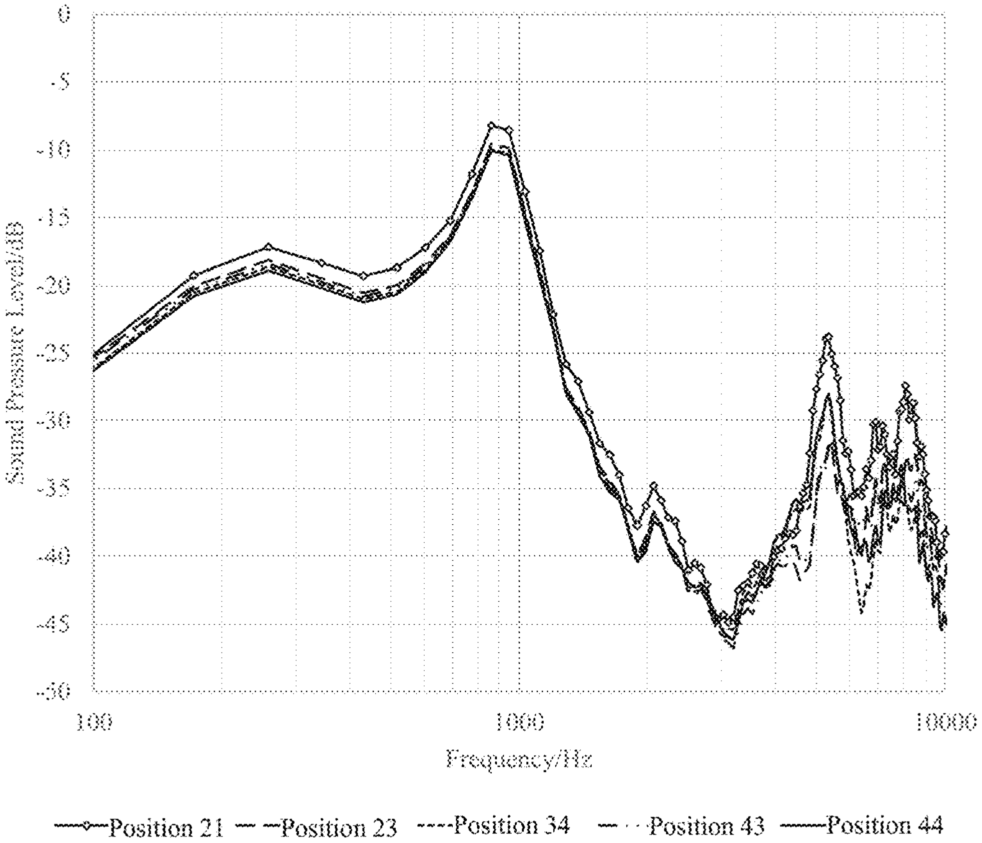
FIG. 27 is a schematic diagram illustrating sound collection curves of receiving holes located at different positions according to some other embodiments of the present disclosure.

FIG. 27 is a schematic diagram illustrating sound collection curves of a sound hole at different positions according to some other embodiments of the present disclosure. As shown in FIG. 27, the sound collection of the microphone corresponding to position 21 is better than the sound collection of the microphone corresponding to position 33, position 34, position 43, and position 44. In some embodiments, the first sound hole 1191 may be disposed at position 21, and the second sound hole 1192 may be disposed at position 33, position 34, position 43, or position 44. In such cases, the first sound hole 1191 may have a better sound collection effect than the second sound hole 1192 in the whole frequency band. When the second sound hole 1192 is disposed at the position 33 or the position 34, the sound collection effect of the second sound hole 1192 is better, and the sound collection curve of the second sound hole 1192 may be consistent with the sound collection curve of the first sound hole 1191. After signals of the first microphone and the second microphone are processed, the sound from the user's mouth may be obtained in a wider frequency band. When the second sound hole 1192 is disposed at position 43 or position 44, a distance between the second sound hole 1192 and the first sound hole 1191 is greater, which may facilitate a noise reduction. After the signals of the first microphone and the second microphone are processed, a clearer voice from the user's mouth may be obtained in a low-frequency range.

Figure 28:
FIG. 28 is a schematic diagram illustrating sound collection curves of a sound hole at different positions according to some other embodiments of the present disclosure.

FIG. 28 is a schematic diagram illustrating sound collection curves of a sound hole at different positions according to some other embodiments of the present disclosure. As shown in FIG. 28, the sound collection effects of the microphone corresponding to positions 11 and 14 are illustrated. The sound collection effect of the microphone corresponding to position 11 is better than the sound collection effect of the microphone corresponding to position 14 in the entire frequency range. In some embodiments, the first sound hole 1191 may be disposed at position 11, and the second sound hole 1192 may be disposed at position 14. In such cases, both the first sound hole 1191 and the second sound hole 1192 have good sound collection effects. After the signals of the first microphone and the second microphone are processed, the sound from the user's mouth may be obtained in a wider frequency band.

Figure 29:
FIG. 29 is a schematic diagram illustrating sound collection curves of a sound hole at different positions according to some other embodiments of the present disclosure.
Figure 30A:
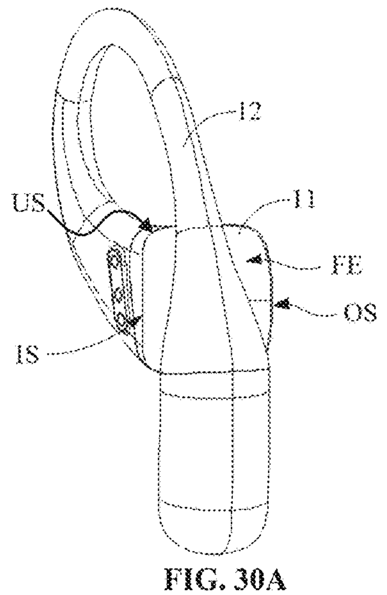
FIG. 30A is a schematic diagram illustrating a structure of an earphone according to some embodiments of the present disclosure.
Figure 30B:
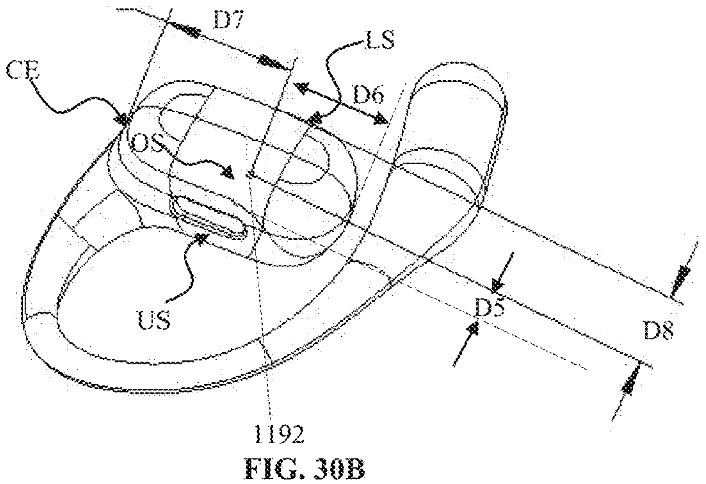
FIG. 30B is a schematic diagram illustrating a structure of an earphone according to some embodiments of the present disclosure.

FIG. 29 is a schematic diagram illustrating sound collection curves of a sound hole at different positions according to some other embodiments of the present disclosure. As shown in FIG. 29, the sound collection effects of the microphone corresponding to positions 31 and 43 are illustrated. The sound collection effect of the microphone corresponding to position 31 is better than the sound collection effect of the microphone corresponding to position 43 in the entire frequency range. In some embodiments, the first sound hole 1191 may be disposed at position 31, and the second sound hole 1192 may be disposed at position 43. In such cases, both the first sound hole 1191 and the second sound hole 1192 may have good sound collection effects. After the signals of the first microphone and the second microphone are processed, the sound from the user's mouth may be obtained in a wider frequency band.

In some embodiments, the projection of the sound production component 11 on the sagittal plane may be in a racetrack shape, and extension lines of two sides of the racetrack-shaped projection that are close to the mouth (that is, the projection of the lower side and the projection of the front side of the sound production component 11) have an intersection point. The intersection point may be defined as a fourth projection point (e.g., the intersection point G of the X axis and the Y axis shown in FIG. 22, or an origin of the X-Y coordinate system shown in FIG. 23). To make the first sound hole 1191 as close as possible to the user's mouth, a distance between the first projection point P and the fourth projection point of the first sound hole 1191 on the sagittal plane needs to satisfy a preset condition. The greater the distance, the farther the distance from the first projection point P to the intersection point G shown in FIG. 22 or the origin of the X-Y coordinate system shown in FIG. 8, correspondingly, the farther the distance between the first sound hole 1191 and the user's mouth, and the poorer the sound collection effect of the first microphone. In some embodiments, to ensure the sound collection effect of the first microphone, the distance between the first projection point and the fourth projection point may be not greater than 5 mm. To improve the sound collection effect of the first microphone, the first sound hole 1191 may be disposed on the sound production component 11 at a position closer to the user's mouth, in some embodiments, the distance between the first projection point P and the fourth projection point may be not greater than 3 mm. In some embodiments, the distance between the first projection point P and the fourth projection point may be not greater than 1 mm such that the first sound hole 1191 may be closer to the position of the user's mouth, so as to further improve the sound collection effect of the first microphone. It should be noted that the projection of the sound production component 11 on the sagittal plane is not limited to the above-mentioned racetrack shape, but may further be other regular (e.g., rectangular, elliptical, circular, etc.) or irregular shapes, as long as the first sound hole 1191 may be disposed close to the user's mouth or close to the origin of the X-Y coordinate system.

Figure 31A:
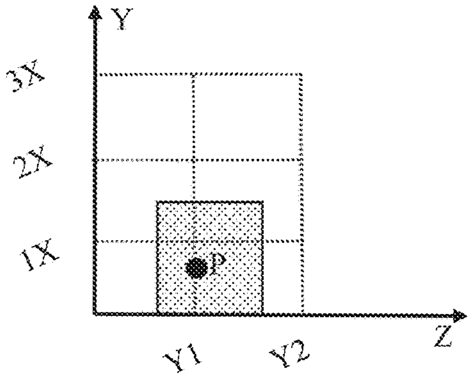
FIG. 31A is a schematic diagram illustrating an exemplary coordinate system based on a sound production component according to some embodiments of the present disclosure.
Figure 31B:
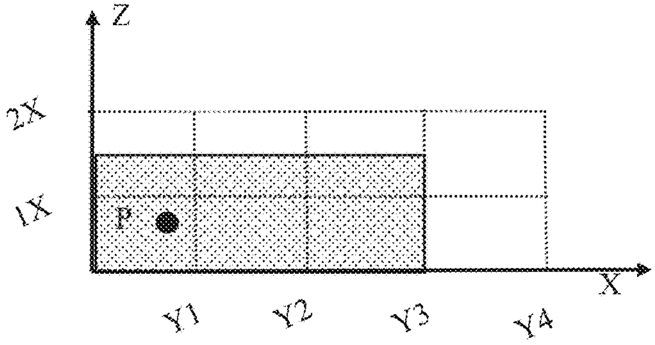
FIG. 31B is a schematic diagram illustrating an exemplary coordinate system based on a sound production component according to some embodiments of the present disclosure.

FIGS. 31A and 31B are schematic diagrams illustrating exemplary structures of an earphone according to some other embodiments of the present disclosure.

Referring to FIG. 31A and FIG. 31B, in some embodiments, in some embodiments, the first sound hole 1191 may be disposed on a lower side LS or a front side CE of the sound production component 11. FIG. 31A and FIG. 31B are schematic diagrams illustrating exemplary coordinate systems established according to a sound production component according to some other embodiments of the present disclosure. Specifically, as shown in FIG. 31A, when the first sound hole 1191 is disposed on the front side CE of the sound production component 11, the coordinate of the first sound hole 1191 in the major axis direction X of the sound production component 11 is 0, and a relative position relationship between the first sound hole 1191 and the sound production component 11 may be represented by a Y-Z coordinate system. The Z axis is a thickness direction of the sound production component 11, which is perpendicular to the major axis direction X and the minor axis direction Y of the sound production component 11. Similarly, as shown in FIG. 31B, when the first sound hole 1191 is disposed on the lower side LS of the sound production component 11, the coordinate of the first sound hole 1191 in the minor axis direction Y of the sound production component 11 is 0, and the relative position relationship between the first sound hole 1191 and the sound production component 11 may be represented by an X-Z coordinate system. The greater the Z value, the farther the distance between the first sound hole 1191 and the inner side of the sound production component 11. The greater the X value, the farther the distance between the first sound hole 1191 and the front side of the sound production component 11. The greater the Y value, the farther the distance between the first sound hole 1191 and the in lower side of the sound production component 11.

Considering that when the first sound hole 1191 is too close to the inner side of the sound production component 11 (e.g., less than 2 mm), the first sound hole 1191 may be blocked by the user's ear in the wearing state, and the first microphone may also collect noise generated by a friction between the user's ear and the sound production component 11. In such cases, regardless of whether the first sound hole 1191 is located on the lower side or the front side of the sound production component, the distance between the first sound hole 1191 and the inner side of the sound production component 11 may not be too small. In addition, the two ears and the mouth of the human body are regarded as three points in space, and the three points construct an approximately isosceles triangle region. When the earphone is in the wearing state, the sound production component 11 needs to be disposed inclined to extend into the concave concha cavity. That is, a line connecting any two points on the outer side of the sound production component 11 may not point to the triangular region. If the first sound hole 1191 is too close to the outer side of the sound production component 11 (e.g., the distance between the first sound hole 1191 and the outer side is less than 2 mm), even if the second sound hole 1192 is disposed on the outer side of the sound production component 11, it cannot ensure that the line connecting the first sound hole 1191 and the second sound hole 1192 points to the user's mouth. In some embodiments, when the first sound hole 1191 is disposed on the lower side or the front side of the sound production component 11, to ensure the sound collection effect of the first sound hole 1191 and that the line connecting the first sound hole 1191 and the second sound hole 1192 points to a region on the front side of the user, a ratio of a distance between the first sound hole 1191 and the inner side of the sound production component 11 in the thickness direction Z of the sound production component to a size of the sound production component 11 along the thickness direction Z may be within a range of 0.25-0.7. In some embodiments, the ratio of the distance between the first sound hole 1191 and the inner side of the sound production component 11 in the thickness direction Z of the sound production component to the size of the sound production component 11 along the thickness direction Z may be within a range of 0.25-0.65. The first sound hole 1191 may be disposed at a relatively far distance from the inner side of the sound production component 11, so as to reduce the influence of noise generated by the friction between the sound production component 11 and the ear. Meanwhile, the distance between the first sound hole 1191 and the outer side of the sound production component 11 may be reduced such that the line connecting the first sound hole 1191 and the second sound hole 1192 may point to the user's mouth. In some embodiments, the ratio of the distance between the first sound hole 1191 and the inner side of the sound production component 11 in the thickness direction Z of the sound production component to the size of the sound production component 11 along the thickness direction Z may be within a range of 0.3-0.6. In some embodiments, the ratio of the distance between the first sound hole 1191 and the inner side of the sound production component 11 in the thickness direction Z of the sound production component to the size of the sound production component 11 along the thickness direction Z may be within a range of 0.3-0.4. The distance between the first sound hole 1191 and the outer side of the sound production component 11 may be further reduced such that the line connecting the first sound hole 1191 and the second sound hole 1192 may point to the user's mouth more accurately. In some embodiments, the inner side of the sound production component 11 may be a curved plane. The distance between the first sound hole 1191 and the inner side of the sound production component 11 in the thickness direction Z of the sound production component may be equivalent to a distance between the center of the first sound hole 1191 and a tangent plane to the inner side of the sound production component 11. The tangent plane of the inner side of the sound production component 11 is a plane parallel to the major axis direction X and the minor axis direction Y and tangent to the inner side.

In some embodiments, the first sound hole 1191 may be disposed on the ear hook (e.g., a position on the ear hook closest to the user's mouth). Correspondingly, to ensure the directivity of the line connecting the second sound hole 1192 and the first sound hole 1191, when the first sound hole 1191 is disposed on the ear hook, the second sound hole 1192 may be disposed near a connection between the upper side and the front side of the sound production component 11. In some embodiments, the structure or shape of the ear hook of the earphone 10 may be configured to satisfy a position requirement of the second sound hole 1192. In such cases, the line connecting the second sound hole 1192 and the first sound hole 1191 may be approximately pointed to the user's mouth, and the distance between the second sound hole 1192 and the first sound hole 1191 may be greater than a preset condition.

In some embodiments, the second sound hole 1192 may be disposed on a side of the sound production component 11 that does not form an auxiliary cavity (i.e., the quasi-cavity structure) with the concha cavity. In some embodiments, the second sound hole 1192 may be disposed on at least one of the upper side US, the lower side LS, and the outer side OS of the sound production component 11, and the first sound hole 1191 and the second sound hole 1192 are both disposed to avoid components (e.g., the speaker, a main control circuit board, etc.) inside the housing of the sound production component 11. For example, the second sound hole 1192 may be disposed on any one of the upper side US, the lower side LS, and the outer side OS of the sound production component 11. As another example, the second sound hole 1192 may be disposed at a connection of any two sides of the upper side US, the lower side LS, and the outer side OS of the sound production component 11. In some embodiments, to make the first sound hole 1191 have a large distance from the second sound hole 1192, while considering the directivity of the line connecting the first sound hole 1191 and the second sound hole 1192, the first sound hole 1191 and the second sound hole 1192 may be disposed diagonally. For example, the first sound hole 1191 is disposed at a lower left corner as shown in FIG. 9, and the second sound hole 1192 is disposed at an upper right corner as shown in FIG. 9. To illustrate a position of the second sound hole 1192 more clearly, the upper side US, the lower side LS, and the rear side FE of the sound production component 11 are used as references for description. In some embodiments, the second sound hole 1192 may be disposed on the outer side OS of the sound production component 11. In some embodiments, to avoid that the distance between the second sound hole 1192 and the antihelix of the user is too small to affect the quality of the collected sound, a distance d5 between the second sound hole 1192 and the upper side US of the sound production component 11 may be 1 mm-3 mm, and a distance d6 between the second sound hole 1192 and the rear side FE may be 8 mm-12 mm. In some embodiments, to further avoid that the distance between the second sound hole 1192 and the antihelix of the user is too small to affect the quality of the collected sound, a distance d5 between the second sound hole 1192 and the upper side US of the sound production component 11 may be 2 mm-2.5 mm, the distance d6 between the second sound hole 1192 and the rear side FE may be 9 mm-10 mm. To prevent the distance between the second sound hole 1192 and the first sound hole 1191 from being too small, in some embodiments, a distance d7 between the second sound hole 1192 and the front side CE may be 8 mm-12 mm. In some embodiments, the distance d7 between the second sound hole 1192 and the front side CE may be 8.5 mm-12 mm. In some embodiments, a distance d8 between the second sound hole 1192 and the lower side LS may be 4 mm-8 mm. In some embodiments, the distance d8 between the second sound hole 1192 and the lower side LS may be 6 mm-8 mm. It should be noted that, in the present disclosure, the distances from the second sound hole 1192 to one of the upper side, the front side, the rear side, or the lower side of the sound production component 11 refer to a distance from the center of the opening of the second sound hole 1192 on the outer surface of the housing of the sound production component 11 to one of the upper side, the front side, the rear side, or the lower side of the sound production component 11. When the side (such as the upper side, the front side, the rear side, and the lower side) of the sound production component 11 is a plane, the distance from the second sound hole 1192 to the side is a distance from the center of the opening of the second sound hole 1192 on the outer surface of the housing of the sound production component 11 to the plane. When the side of the sound production component 11 is a curved plane, the distance is a distance from the center of the opening of the second sound hole 1192 on the outer surface of the housing of the sound production component 11 to a tangent plane of the curved plane. In the present disclosure, the tangent plane corresponding to the upper side of the sound production component 11 refers to a plane parallel to the X-Z plane (or coordinate system) and tangent to the upper side of the sound production component 11 shown in FIG. 31B. Similarly, the tangent plane corresponding to the lower side of the sound production component 11 refers to the plane parallel to the X-Z plane (or coordinate system) and tangent to the lower side of the sound production component 11 shown in FIG. 31B. The tangent plane corresponding to the front side of the sound production component 11 refers to the plane parallel to the Y-Z plane (or coordinate system) and tangent to the front side of the sound production component 11 shown in FIG. 31A. The tangent plane corresponding to the rear side of the sound production component 11 refers to the plane parallel to the X-Z plane (or coordinate system) and tangent to the rear side of the sound production component 11 shown in FIG. 31A.

In some embodiments, to improve the sound collection effects of the first sound hole 1191 and the second sound hole 1192, the first sound hole 1191 and the second sound hole 1192 may have relatively large areas. In some embodiments, diameters of the first sound hole and the second sound hole may be greater than 0.8 mm. In some embodiments, the diameters of the first sound hole and the second sound hole may be greater than 0.85 mm, so as to further improve the sound collection effects of the first sound hole 1191 and the second sound hole 1192. In some embodiments, the diameters of the first sound hole and the second sound hole may be 0.9 mm.

In some embodiments, to improve dustproof and/or waterproof effects of the first sound hole 1191 and the second sound hole 1192, the areas of the first sound hole 1191 and the second sound hole 1192 may be not too large. Accordingly, in some embodiments, to improve the sound collection effect and dustproof and waterproof effects of the first sound hole 1191 and the second sound hole 1192, the diameters of the first sound hole 1191 and the second sound hole 1192 may be within a range of 0.8 mm-3 mm. For example, in some embodiments, the diameters of the first sound hole 1191 and the second sound hole 1192 may be 0.8 mm-2.5 mm, so as to further improve the dustproof and waterproof effects of the first sound hole 1191 and the second sound hole 1192. In some embodiments, the diameters of the first sound hole 1191 and the second sound hole 1192 may be 0.85 mm-1.5 mm, so as to further improve the sound collection effect and dustproof and waterproof effects of the first sound hole 1191 and the second sound hole 1192. It should be noted that, in the present disclosure, the first sound hole 1191 and the second sound hole 1192 may have the same or different diameters. When the shape of the first sound hole 1191 and/or the second sound hole 1192 is irregular, the diameter may be understood as a maximum inner diameter or an average inner diameter.

In some embodiments, considering that if a depth of the first sound hole 1191 and/or the second sound hole 1192 is too large (e.g., greater than 8 mm), a sound loss may be generated when the sounds are transmitted to the first microphone and the second microphone, and sounds in the mid-high frequency may be sharper. Therefore, to improve the sound collection effects of the first sound hole 1191 and the second sound hole 1192, the depth of the first sound hole 1191 and/or the second sound hole 1192 may be less than 4 mm. In some embodiments, the depth of the first sound hole 1191 or the second sound hole 1192 refers to a distance from the opening of the first sound hole 1191 or the second sound hole 1192 to the corresponding microphone. In some embodiments, when the first microphone and the second microphone are disposed close to the housing, the depths of the first sound hole 1191 and the second sound hole 1192 may be equal to a thickness of the housing. For example, in some embodiments, the depths of the first sound hole 1191 and the second sound hole 1192 may be less than 2.5 mm, so as to further reduce the sound loss when the sounds are transmitted to the first microphone and the second microphone, and improve the sound collection effect for the sounds at the mid-high frequency.

In some embodiments, to improve the sound collection effects of the first sound hole 1191 and the second sound hole 1192, the depths of the first sound hole 1191 and the second sound hole 1192 may be consistent. If the depth of the first sound hole 1191 is inconsistent with the depth of the second sound hole 1192, a portion of the sounds may travel an extra distance, which may cause different responses of the first sound hole 1191 and the second sound hole 1192 to the noise, thereby affecting a noise reduction effect and the sound quality of the earphone 10.

In some embodiments, the first sound hole 1191 and the second sound hole 1192 may include a dustproof and waterproof net. The first sound hole 1191 and the second sound hole 1192 may be sealed, for example, by a silicone sleeve, a double-sided tape, etc.

In some embodiments, an adjustment algorithm may be used in the earphone 10 such that a low-frequency response of the earphone 10 may be improved when the volume is low, and at the same time there is no change when the volume is high, so as to avoid damage to the speaker due to a broken sound. According to the adjustment algorithm, the user may independently adjust the sound collection effect of the earphone.

Figure 32:
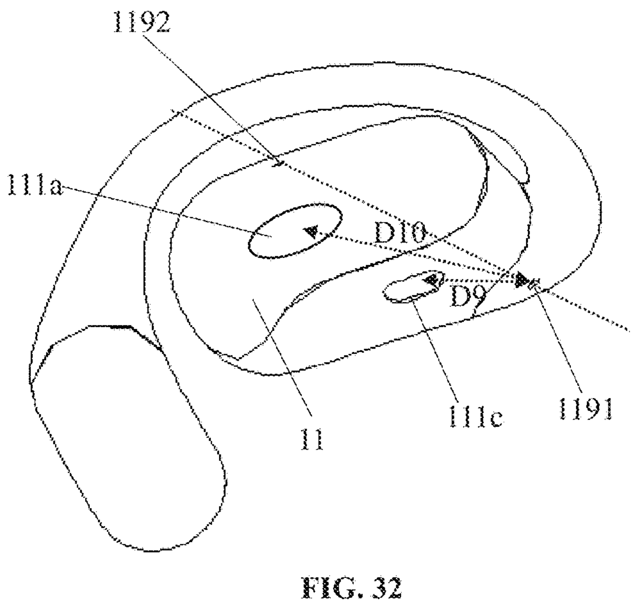
FIG. 32 is a schematic diagram illustrating an exemplary structure of an earphone according to some other embodiments of the present disclosure.

FIG. 32 is a schematic diagram illustrating an exemplary structure of an earphone according to some other embodiments of the present disclosure. Referring to FIG. 32, the sound production component 11 may further include at least one sound guiding hole (such as a sound guiding hole 111*a*) and at least one pressure relief hole (such as a pressure relief hole 111*c*). The sound guiding hole 111*a* is disposed on the inner side of the sound production component 11, i.e., when the user wears the earphone 10, the at least one sound guiding hole 111*a* is disposed on a side of the sound production component facing the anterolateral side the user's ear. In such cases, the sound guiding hole 111*a* is close to the opening of the user's ear canal and is located in the quasi-cavity structure formed by the sound production component and the concha cavity, thereby ensuring the hearing effect at the opening of the user's ear canal. In some embodiments, the pressure relief hole 111*c* may further be disposed on any one of the upper side, the front side, the rear side, and the outer side of the sound production component. In some embodiments, the sound guiding hole 111*a* is acoustically connected to the front cavity of the sound production component, the pressure relief hole 111*c* is acoustically connected to the rear cavity of the sound production component, and the sound output from the sound guiding hole 111*a* and the pressure relief hole 111*c* may be approximately regarded as a set of phase-opposed sounds, and in the far field (e.g., a position away from the opening of the user's ear canal), the sound emitted from the pressure relief hole 111*c* may be canceled with the sound emitted from the sound guiding hole 111*a*, so as to reduce the volume of sound leakage of the earphones in the far field. In some embodiments, the at least one pressure relief hole 111*c* may include a first pressure relief hole and a second pressure relief hole, and the second pressure relief hole may be located closer to the sound guiding hole 111*a* relative to the first pressure relief hole. Merely by way of example, in some embodiments, the first pressure relief hole 1131 and the second pressure relief hole 1132 may be provided on the same side of the sound production component, e.g., the first pressure relief hole and the second pressure relief hole may be provided on the outer side OS, the upper side US, or the lower side LS. In some embodiments, the first pressure relief hole and the second pressure relief hole may be provided on two different sides of the sound production component 11, e.g., the first pressure relief hole may be provided on the outer side OS and the second pressure relief hole may be provided on the upper side US, or the first pressure relief hole may be provided on the outer side OS and the second pressure relief hole may be provided on the lower side LS. In some embodiments, to maximize a destruction of a standing wave in the rear cavity, the two pressure relief holes may be disposed on opposite sides of the sound production component, for example, the first pressure relief hole may be disposed on the upper side US and the second pressure relief hole may be disposed on the lower side LS.

In some embodiments, the distance between the first sound hole 1191 and the pressure relief hole 111*c*, as well as a distance between the first sound hole 1191 and the sound guiding hole 111*a* may satisfy a certain relationship, so as to prevent an echo of the sounds from the sound guiding hole 111*a* and the pressure relief hole 111*c* generated at the first sound hole 1191 and the second sound hole 1192.

Referring to FIG. 22, in some embodiments, the distance between the first sound hole 1191 and the pressure relief hole 111*c* may be indicated as D9, and the distance between the first sound hole 1191 and the sound guiding hole 111*a* may be indicated as D10. In some embodiments, as a hole mainly used for the sound collection, the first sound hole 1191 may be disposed near an acoustic zero point (e.g., a region where the sound leakages of the sound guiding hole 111*a* and the pressure relief hole 111*c* cancel each other), so as to reduce interference of the speaker to the first microphone. Specifically, in some embodiments, to dispose the first sound hole 1191 near the acoustic zero point, a difference between D9 and D10 may be less than 10 mm. The smaller the difference between d1 and d2, the more effectively the sound leakages of the sound hole 111*a* and the pressure relief hole 111*c* cancel each other. In some embodiments, the difference between D9 and D10 may be less than 6 mm. In some embodiments, the difference between D9 and D10 may be less than 4 mm, so as to further reduce the interference of the speaker to the first microphone.

Figure 33:
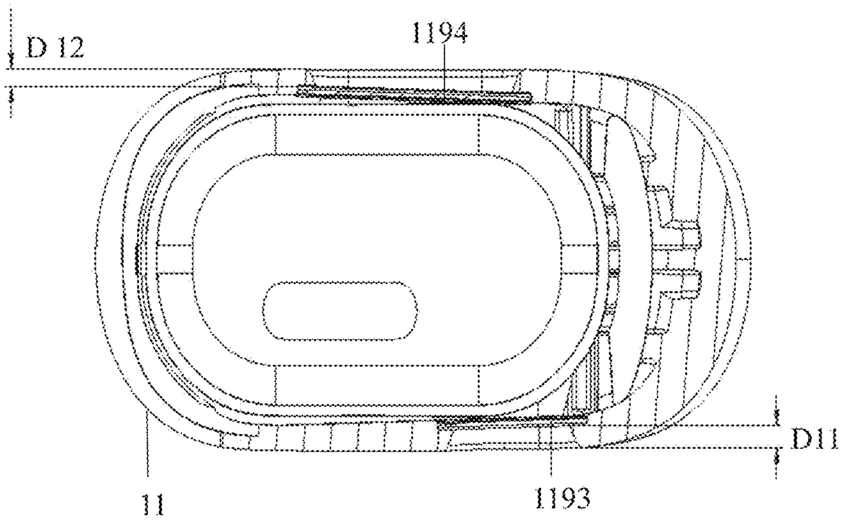
FIG. 33 is a schematic diagram illustrating an exemplary cross-sectional structure of a sound production component of an earphone according to some other embodiments of the present disclosure.

FIG. 33 is a schematic diagram illustrating an exemplary cross-sectional structure of a sound production component of an earphone according to some other embodiments of the present disclosure. Referring to FIG. 33, in some embodiments, a first acoustic resistance net 1193 may be disposed in the first sound hole 1191, and a second acoustic resistance net 1192 may be disposed in the second sound hole 1192. The first acoustic resistance net 1193 and the second acoustic resistance net 1194 may refer to structures with a certain acoustic resistance effect but do not completely block a sound transmission. In some embodiments, the first acoustic resistance net 1193 and/or the second acoustic resistance net 1193 may include a gauze and/or a steel net. In some embodiments, the first acoustic resistance net 1193 and the second acoustic resistance net 1194 may be respectively disposed in the first sound hole 1191 and the second sound hole 1192 by double-sided tape or glue. In some embodiments, the waterproof and dustproof effects of the first sound hole 1191 and the second sound hole 1192 may be improved through the first acoustic resistance net 1193 and the second acoustic resistance net 1194.

Referring to FIG. 33, in some embodiments, in some embodiments, the distance between the first acoustic resistance net 1193 and the outer surface of the housing of the sound production component 11 where the first acoustic resistance net 1193 is disposed may be indicated as D11, and a distance between the second acoustic resistance net 1194 and the outer surface of the housing of the sound production component 11 where the second acoustic resistance net 1194 is disposed may be indicated as D12. It should be noted that, in the present disclosure, D11 and D12 may be the same or different. For example, when the distances D11 and D12 are the same, transmission efficiencies of the sounds passing through the first sound hole 1191 and the second sound hole 1192 may be approximately the same, which may improve the sound collection effects of the first microphone and the second microphone. For example, in some embodiments, the distance D11 may be within a range of 0.5 mm-2 mm, and the distance D12 may further be between 0.5 mm-2 mm. In some embodiments, the distance D11 may be within a range of 0.5 mm-1.5 mm, and the distance D12 may be within a range of 0.6 mm-1.2 mm.

In some embodiments, to make frequency responses of the sounds received by the first microphone and the second microphone relatively flat, and improve signal-to-noise ratios of the sounds received by the first microphone and the second microphone, each of the first acoustic resistance net 1193 and the second acoustic resistance net 1194 may have a certain acoustic resistance, for example, greater than 45 Mrayls. For example, as acoustic impedances of the first acoustic resistance net 1193 and the second acoustic resistance net 1194 increase, corresponding resonant frequencies of the first microphone and the second microphone move to a low frequency, and peak values of resonance peaks become smooth gradually. Moreover, to improve transmission efficiencies of the sounds at the first sound hole 1191 and the second sound hole 1192, thereby improving the sound collection effects of the first microphone and the second microphone, acoustic resistances of the first acoustic resistance net 1193 and the second acoustic resistance net 1194 may be not too great. Accordingly, in some embodiments, to improve the sound collection effects of the first sound hole 1191 and the second sound hole 1192, the acoustic resistances of the first acoustic resistance net 1193 and the second acoustic resistance net 1194 may be between 45 Mrayls-320 Mrayls. In some embodiments, the acoustic resistances of the first acoustic resistance net 1193 and the second acoustic resistance net 1194 may be 80 Mrayls-260 Mrayls. In such cases, the frequency response of the sound received at the first microphone or the second microphone is relatively flat, and the quality of the sound collected by the first microphone or the second microphone may be relatively high, which may further ensure that the first microphone or the second microphone has a high sensitivity to the sound. In some embodiments, the acoustic resistances of the first acoustic resistance network 1193 and the second acoustic resistance network 1194 may be 120 Mrayls-200 Mrayls. In such cases, the first microphone or the second microphone may have a higher sensitivity to the sound, and the frequency response of the sound received by the first microphone or the second microphone may be flatter, which may improve the quality of the sound collected by the first microphone or the second microphone. It should be noted that a measurement of the acoustic resistance of the first acoustic resistance net 1193 and the second acoustic resistance net 1194 may be performed by ultrasonic echo measurement, or the acoustic resistance may be determined as a product of a density of the acoustic resistance net and a sound speed.

The denser the net of the acoustic resistance net, the greater the corresponding acoustic resistance of the acoustic resistance net, the more obvious a suppression effect of the acoustic resistance net on the user's voice from the user's mouth, and the smaller the intensity of the sound received by the microphone. Accordingly, parameters (e.g., a net density, a net size, a thickness, etc.) of the first acoustic resistance net 1193 and the second acoustic resistance net 1194 may be configured such that the acoustic resistances of the first acoustic resistance net 1193 and the second acoustic resistance net 1194 may be in a preset acoustic resistance range.

For example, in some embodiments, the first acoustic resistance net 1193 and/or the second acoustic resistance net 1194 may include a plurality of holes. An aperture of each hole may be in a range of 15 μm-51 μm. In some embodiments, to improve the waterproof and dustproof effects of the first sound hole 1191 and the second sound hole 1192 while considering the transmission efficiency of the sound, the aperture of each hole of the first acoustic resistance net 1193 and the second acoustic resistance net 1194 may be between 18 μm-44 μm.

In some embodiments, a porosity of the first acoustic resistance net 1193 and/or the second acoustic resistance net 1194 may be in a range of 11%-18%. The term "porosity" may be understood as a ratio of an area of the plurality of holes of the acoustic resistance net to a total area of the acoustic resistance net. The greater the porosity, the more a count of holes per unit area when a size of a single hole is constant, and the smaller the acoustic resistance of the acoustic resistance net. In some embodiments, to make the acoustic resistance of the first acoustic resistance net 1193 and/or the second acoustic resistance net 1194 between 45 Mrayls-320 Mrayls, the porosity of the first acoustic resistance network 1193 and/or the second acoustic resistance network 1194 may be 11%-18%. Similarly, in some embodiments, to make the acoustic resistance of the first acoustic resistance net 1193 and/or the second acoustic resistance net 1194 between 45 Mrayls-320 Mrayls, the thickness of the first acoustic resistance network 1193 and/or the second acoustic resistance net 1194 may be in a range of 55 μm-108 μm.

Figure 34A:
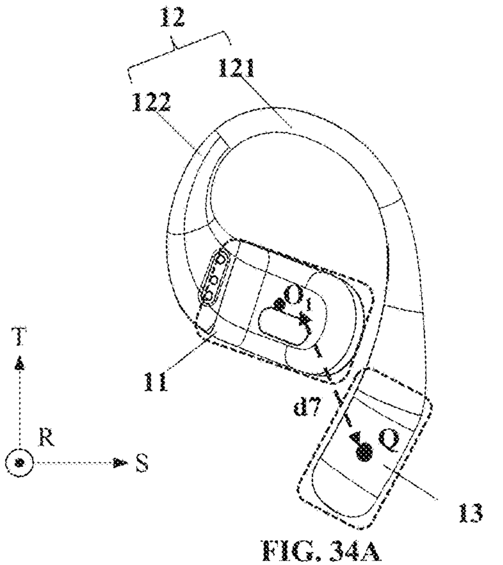
FIG. 34A is a schematic diagram illustrating an exemplary structure of an earphone according to some embodiments of the present disclosure.
Figure 34B:
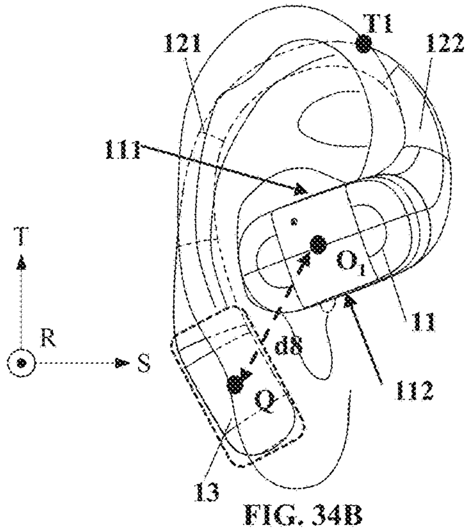
FIG. 34B is a schematic diagram illustrating an exemplary structure of an earphone according to some other embodiments of the present disclosure.

FIG. 34A is a schematic diagram illustrating an exemplary structure of an earphone according to some embodiments of the present disclosure, and FIG. 34B is a schematic diagram illustrating an exemplary structure of an earphone according to some other embodiments of the present disclosure. As shown in FIG. 34A and FIG. 34B, the earphone 10 may include a suspension structure 12, a sound production component 11, and a battery compartment 13, wherein the sound production component 11 and the battery compartment 13 may be respectively located at two ends of the suspension structure 12. In some embodiments, the suspension structure 12 may be the ear hook in FIG. 34B or FIG. 34B. The ear hook may include a first portion 121 and a second portion 122 connected in sequence. The first portion 121 may be hung between a rear inner side of the auricle of the user and the head of the user, and extends toward the neck along the rear inner side of the auricle. The second portion 122 may extend to the anterolateral side of the auricle and connect the sound production component 11, and the sound production component 11 may be located close to the ear canal but not block the opening of the ear canal. An end of the first portion 121 away from the sound production component 11 may be connected to the battery compartment 13, and a battery electrically connected to the sound production component 11 may be arranged in the battery compartment 13. In some embodiments, the ear hook may be an arc structure adapted to a connection part between the auricle and the head. When the user wears the earphone 10, the sound production component 11 and the battery compartment 13 may be respectively located on the anterolateral side and the rear inner side of the auricle. The sound production component 11 may extend toward the first portion 121 of the ear hook, and the whole or a portion of the sound production component 11 may extend into the concha cavity and cooperate with the concha cavity to form a quasi-cavity structure. When a size (length) of the first portion 121 in an extension direction of the first portion 121 is too small, the battery compartment 13 may be near the top of the auricle of the user, then the first portion 121 and the second portion 122 may not provide sufficient contact area to the ear or the head for the earphone 10, causing the earphone 10 to fall off easily from the ear. Therefore, a length of the first portion 121 of the ear hook may be long enough to ensure that the ear hook may provide sufficient contact area to the ear or the head, thereby increasing the resistance preventing the earphone from falling off from the ear or the head. In addition, when the distance between the end of the sound production component 11 and the first portion 121 of the ear hook is too large, the battery compartment 13 may be away from the auricle in the wearing state, which may not provide sufficient clamping force for the earphone, and the earphone may be liable to fall off. When the distance between the end of the sound production component 11 and the first portion 121 of the ear hook is too small, the battery compartment 13 or the sound production component 11 may squeeze the auricle, which may affect the wearing comfort when user wears the earphone for a long time. Taking the user wearing the earphone as an example, the length of the first portion 121 of the ear hook in the extension direction and a distance between the end of the sound production component 11 and the first portion 121 may be represented by a distance between the centroid $O_1$ of the projection (i.e., the first projection) of the sound production component 11 on the sagittal plane and a centroid Q of a projection of the battery compartment 13 on the sagittal plane. To ensure that the ear hook may provide a large enough contact area to the ear or the head, the distance of the centroid Q of the projection of the battery compartment 13 on the sagittal plane relative to the horizontal plane (e.g., the ground plane) may be smaller than a distance of the centroid $O_1$ of the projection of the sound production component 11 on the sagittal plane relative to the horizontal plane, i.e., in the wearing state, the centroid Q of the projection of the battery compartment 13 on the sagittal plane may be located below the centroid $O_1$ of the projection of the sound production component 11 on the sagittal plane. In the wearing state, a portion or the whole of the sound production component 11 may extend into the concha cavity, and the position of the sound production component 11 may be relatively fixed. If the distance between the centroid $O_1$ of the projection of the sound production component 11 on the sagittal plane and the centroid Q of the projection of the battery compartment 13 on the sagittal plane is too small, the battery compartment 13 may be tightly attached to or even press against the rear inner side of the auricle, which may affect the wearing comfort of the user. If the distance between the centroid $O_1$ of the projection of the sound production component 11 on the sagittal plane and the centroid Q of the projection of the battery compartment 13 on the sagittal plane is too large, the length of the first portion 121 of the ear hook may also be relatively long, causing the user to clearly feel that the a portion of the earphone located on the rear inner side of the auricle is heavy or the position of the battery compartment 13 relative to the auricle is far away when wearing the earphone, the earphone being prone to fall off during exercise of the user, thereby affecting the wearing comfort of the user and the wearing stability of the earphone. To make the user have better stability and comfort when wearing the earphone 10, in the wearing state, a distance d8 between the centroid $O_1$ of the projection of the sound production component 11 on the sagittal plane and the centroid Q of the projection of the battery compartment 13 on the sagittal plane may be within a range of 20 mm-30 mm. In some embodiments, the distance d8 between the centroid $O_1$ of the projection of the sound production component 11 on the sagittal plane and the centroid Q of the projection of the battery compartment 13 on the sagittal plane may be within a range of 22 mm-28 mm. In some embodiments, the distance d8 between the centroid $O_1$ of the projection of the sound production component 11 on the sagittal plane and the centroid Q of the projection of the battery compartment 13 on the sagittal plane may be within a range of 23 mm-26 mm. Due to the elasticity of the ear hook, the distance between the centroid $O_1$ of the projection of the sound production component 11 on the sagittal plane and the centroid Q of the projection of the battery compartment 13 on the sagittal plane may vary in the wearing state and the non-wearing state of the earphone. In some embodiments, in the non-wearing state, a distance d7 between the centroid of the projection of the sound production component 11 on a specific reference plane and the centroid of the projection of the battery compartment 13 on the specific reference plane may be within a range of 16.7 mm-25 mm. In some embodiments, in the non-wearing state, the distance d7 between the centroid of the projection of the sound production component 11 on the specific reference plane and the centroid of the projection of the battery compartment 13 on the specific reference plane may be within a range of 18 mm-23 mm. In some embodiments, in the non-wearing state, the distance d7 between the centroid of the projection of the sound production component 11 on the specific reference plane and the centroid of the projection of the battery compartment 13 on the specific reference plane may be within a range of 19.6 mm-21.8 mm. In some embodiments, the specific reference plane may be the sagittal plane of the user or the ear hook plane. In some embodiments, the specific reference plane may be the sagittal plane. At this time, in the non-wearing state, the centroid of the projection of the sound production component on the sagittal plane may be compared to the centroid of the projection of the sound production component on the specific reference plane, and the centroid of the projection of the battery compartment on the sagittal plane may be compared to the centroid of the projection of the battery compartment on the specific reference plane. For example, the non-wearing state may be represented by removing the auricle structure from the human head model, and fixing the sound production component on the human head model in the same posture as the wearing state using a fixing component or adhesive. In some embodiments, the specific reference plane may be the ear hook plane. The ear hook structure may be an arc structure. The ear hook plane may be a plane formed by three most protruding points on the ear hook, i.e., the plane that supports the ear hook when the ear hook is placed freely. For example, when the ear hook is placed on a horizontal plane, the horizontal plane may support the ear hook, and the horizontal plane may be regarded as the ear hook plane. In other embodiments, the ear hook plane also refers to a plane formed by a bisector that bisects or roughly bisects the ear hook along a length extension direction of the ear hook. In the wearing state, although the ear hook plane has a certain angle relative to the sagittal plane, the ear hook may be approximately regarded as fitting the head at this time, and thus the angle may be very small. For the convenience of calculation and description, it may also be possible to use the ear hook plane as the specific reference plane instead of the sagittal plane.

Taking the specific reference plane as the sagittal plane as an example, the distance between the centroid $O_1$ of the projection of the sound production component 11 on the sagittal plane and the centroid Q of the projection of the battery compartment 13 on the sagittal plane may vary in the wearing state and the non-wearing state of the earphone 10. A variation value may reflect a softness of the ear hook. When the softness of the ear hook is too large, the overall structure and shape of the earphone 10 may be unstable, and may not provide strong support for the sound production component 11 and the battery compartment 13, the wearing stability may also poor, and the earphone may be liable to fall off. Considering that the ear hook may be hung at the connection part between the auricle and the head, when the softness of the ear hook is too small, the earphone 10 may not be liable to deform. When the user wears the earphone, the ear hook may closely fit or even pressure against a region between the ears or the head, affecting wearing comfort. To make the user have better stability and comfort when wearing the earphone 10, in some embodiments, a ratio of a variation value of the distances between the centroid $O_1$ of the projection of the sound production component 11 on the sagittal plane and the centroid Q of the projection of the battery compartment 13 on the sagittal plane in the wearing state and the non-wearing state of the earphone 10 to the distance between the centroid $O_1$ of the projection of the sound production component 11 on the sagittal plane and the centroid Q of the projection of the battery compartment 13 on the sagittal plane in the non-wearing state of the earphone may be within a range of 0.3-0.8. In some embodiments, the ratio of the variation value of the distances between the centroid $O_1$ of the projection of the sound production component 11 on the sagittal plane and the centroid Q of the projection of the battery compartment 13 on the sagittal plane in the wearing state and the non-wearing state of the earphone 10 to the distance between the centroid $O_1$ of the projection of the sound production component 11 on the sagittal plane and the centroid Q of the projection of the battery compartment 13 on the sagittal plane in the non-wearing state of the earphone may be within a range of 0.45-0.68.

It should be noted that, the shape and the centroid Q of the projection of the battery compartment 13 on the sagittal plane may be found in the relevant descriptions on the shape and the centroid $O_1$ of the projection of the sound production component 11 on the sagittal plane in the present disclosure. In addition, the battery compartment 13 and the first portion 121 of the ear hook may be mutually independent structures.

The battery compartment 13 and the first portion 121 of the ear hook may be connected in an inserting mode, a clamping mode, etc. The projection of the battery compartment 13 on the sagittal plane may be obtained more accurately by using a splicing point or a splicing line between the battery compartment 13 and the first portion 121 when the projection of the battery compartment 13 is determined.

Figure 35:
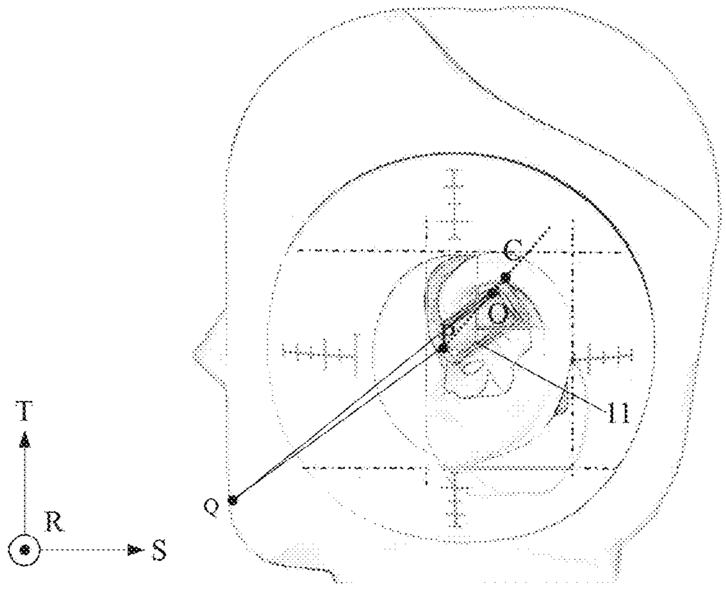
FIG. 35 is a schematic diagram illustrating an exemplary wearing of an earphone according to some embodiments of the present disclosure.

FIG. 35 is a schematic diagram illustrating an exemplary wearing of an earphone according to some embodiments of the present disclosure. Referring to FIG. 35, in some embodiments, when the earphone is in the wearing state, at least a portion of the sound production component 11 may cover the antihelix region of the user, wherein the antihelix region may include any one or more of the antihelix 105, the upper antihelix crus 1011, and the lower antihelix crus 1012 in FIG. 1. At this time, the sound production component 11 may be located above the concha cavity 102 and the opening of the ear canal, and the opening of the ear canal of the user may be in an open state. In some embodiments, the housing of the sound production component 11 may include at least one sound guiding hole and at least one pressure relief hole. The sound guiding hole may be acoustically coupled with a front cavity of the earphone 10, and the pressure relief hole may be acoustically coupled with a rear cavity of the earphone 10. The sound output from the sound guiding hole and the sound output from the pressure relief hole may be approximately regarded as two sound sources. The sounds of the two sound sources may have anti-phases to form a dipole. When the user wears the earphone, the sound guiding hole may be located on a sidewall of the sound production component 11 facing or close to the opening of the ear canal of the user, and the pressure relief hole may be located on a sidewall of the sound production component 11 away from the opening of the ear canal of the user. The housing of the sound production component 11 may act as a baffle to increase a sound path difference from the sound guiding hole and the pressure relief hole to the external ear canal 101, thereby increasing a sound intensity at the external ear canal 101. Furthermore, in the wearing state, the inner side of the sound production component 11 may be in contact with the antihelix region, and a concave-convex structure of the antihelix region may also act as a baffle, which may increase a sound path of the sound emitted from the pressure relief hole to the external ear canal 101, thereby increasing the sound path difference from the sound guiding hole and the pressure relief hole to the external ear canal 101.

Figure 36:
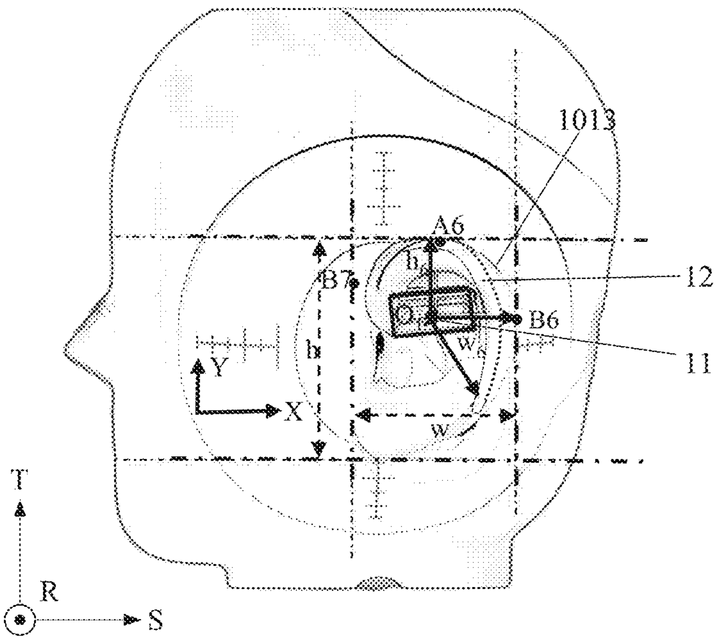
FIG. 36 is a schematic diagram illustrating an exemplary wearing of an earphone according to some embodiments of the present disclosure.
Figure 37:
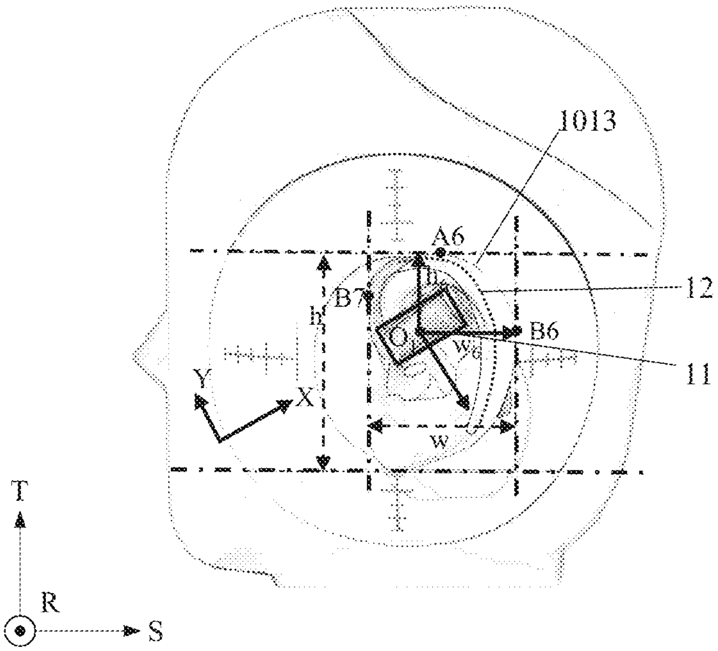
FIG. 37 is a schematic diagram illustrating an exemplary wearing of an earphone according to some embodiments of the present disclosure.

FIG. 36 and FIG. 37 are schematic diagrams illustrating exemplary wearing of an earphone according to some embodiments of the present disclosure. As shown in FIG. 36 and FIG. 37, in some embodiments, when the earphone 10 is in the wearing state, the sound production component may be approximately parallel with or inclined at a certain angle relative to the horizontal direction. In some embodiments, when the earphone 10 is in the wearing state, the sound production component 11 has a first projection (a rectangular region defined by a solid line box in FIG. 36 and FIG. 37 may be approximately equivalent to the first projection) on the sagittal plane (e.g., an S-T plane in FIG. 36 or FIG. 37) of the head of the user, and the auricle of the user has a second projection on the sagittal plane. To make the whole or a portion of the sound production component 11 cover the antihelix region of the user (e.g., the positions of the antihelix, the triangular fossa, the upper antihelix crus, or the lower antihelix crus), a ratio of a distance $h_6$ between the centroid $O_1$ of the first projection and a highest point A6 of the second projection in the vertical axis direction (e.g., a T-axis direction in FIG. 36 and FIG. 37) to a height h of the second projection in the vertical axis direction may be within a range of 0.25-0.4. A ratio of a distance $w_6$ between the centroid $O_1$ of the first projection U and an end point B6 of the second projection in the sagittal axis direction (e.g., an S-axis direction in FIG. 36 and FIG. 37) to a width w of the second projection in the sagittal axis direction may be within a range of 0.4-0.6.

Considering that the sidewall of the sound production component 11 may abut against the antihelix region, to make the sound production component 11 abut against a larger region of the antihelix region such that the concave-convex structure of the region may also act as a baffle to increase the sound path of the sound emitted from the pressure relief hole to the external ear canal 101, thereby increasing the sound path difference between the sound guiding hole and the pressure relief hole to the external ear canal 101, increasing the sound intensity at the external ear canal 101, and reducing the volume of the far-field leakage sound, accordingly, to balance the listening volume and the sound leakage volume of the sound production component 11 to ensure the acoustic output quality of the sound production component 11, the sound production component 11 may be fit as closely as possible to the antihelix region of the user. Correspondingly, the ratio of the distance $h_6$ between the centroid $O_1$ of the first projection of the sound production component on the sagittal plane of the head of the user and the highest point A6 of the second projection of the auricle of the user on the sagittal plane in the vertical axis direction to the height h of the second projection in the vertical axis direction may be controlled to be within a range of 0.25-0.4. Meanwhile, the ratio of the distance $w_6$ between the centroid $O_1$ of the first projection of the sound production component 11 on the sagittal plane and the end point B6 of the second projection of the auricle of the user on the sagittal plane to the width w of the second projection in the sagittal axis direction may be controlled to be within a range of 0.4-0.6. In some embodiments, to improve the wearing comfort of the earphone while ensuring the acoustic output quality of the sound production component 11, the ratio of the distance $h_6$ between the centroid $O_1$ of the first projection and the highest point A6 of the second projection in the vertical axis direction to the height h of the second projection in the vertical axis direction may be within a range of 0.25-0.35, and the ratio of the distance $w_6$ between the centroid $O_1$ of the first projection and the end point B6 of the second projection in the sagittal axis direction to the width w of the second projection in the sagittal axis direction may be within a range of 0.42-0.6. In some embodiments, the ratio of the distance $h_6$ between the centroid $O_1$ of the first projection and the highest point A6 of the second projection in the vertical axis direction to the height h of the second projection in the vertical axis direction may be within a range of 0.25-0.34, and the ratio of the distance $w_6$ between the centroid $O_1$ of the first projection and the end point B6 of the second projection in the sagittal axis direction to the width w of the second projection in the sagittal axis direction may be within a range of 0.42-0.55.

Similarly, when the shapes and the sizes of the ears of users are different, the ratios may fluctuate within a certain range. For example, when the earlobe of the user is long, the height h of the second projection in the vertical axis direction be larger than that of the general situation. At this time, when the user wears the earphone 100, the ratio of the distance h6 between the centroid $O_1$ of the first projection and the highest point A6 of the second projection in the vertical axis direction to the height h of the second projection in the vertical axis direction may be smaller, e.g., which may be within a range of 0.2-0.35. Similarly, in some embodiments, when the helix of the user is bent forward, the width w of the second projection in the sagittal axis direction may be smaller than that of the general situation, and the distance w6 between the centroid $O_1$ of the first projection and the end point B6 of the second projection in the sagittal axis direction may also be smaller. At this time, the ratio of the distance $w_6$ between the centroid $O_1$ of the first projection and the end point B6 of the second projection in the sagittal axis direction to the width w of the second projection in the sagittal axis direction may be larger, e.g., which may be within a range of 0.4-0.7.

In some embodiments, similarly, to ensure that the first microphone and the second microphone have the good sound collection effect, the line connecting the first sound hole 1191 and the second sound hole 1192 may point to the user's mouth in the wearing state.

In some embodiments, in the wearing state in which at least a portion of the sound production component 11 covers the antihelix region of the user (hereinafter referred to as a second wearing state), the first sound hole 1191 may be disposed at a position on the earphone 10 close to the mouth, so as to improve the sound collection effect when the first microphone collects the sound from the user's mouth. Similar to the wearing state where at least a portion of the sound production component 11 extends into the user's concha cavity, when the earphone 10 is worn by the user with at least a portion of the sound production component 11 covers the antihelix region of the user, the first sound hole 1191 and the second sound hole 1192 may need to keep a certain distance between each other for subsequent signal processing. Moreover, as the earphone 10 is in the wearing state in which the at least portion of the sound production component 11 covers the antihelix region of the user, at least portion of the sound production component 11 may abut against the inner wall of the user's auricle (e.g., the inner contour 1014). On the premise that the sound hole 1191 is disposed close to the user's mouth and that there is a certain distance between the first sound hole 1191 and the second sound hole 1192, the second sound hole 1192 may be close to the inner contour 1014, which may result in that when the sound wave generated by the user's speech or the external sound wave is transmitted to the inner contour 1014, the inner contour 1014 may have a reflection effect on the sound wave, especially in the frequency range of 3 kHz-8 kHz, thereby resulting in that the sound received by the second microphone is greater than the sound received by the first microphone, which may affect the subsequent noise reduction effect and the sound collection effect. Accordingly, in some embodiments, the distance between the first sound hole 1191 and the second sound hole 1192 and a distance between the second sound hole 1192 and the inner contour 1014 of the user's auricle may be adjusted to improve the noise reduction effect and the sound collection effect of the earphone. As shown in FIG. 35, when the earphone 10 is in the second wearing state, the first sound hole 1191 may have a first projection point P on the user's sagittal plane, and the second sound hole 1192 may have a second projection point O on the sagittal plane of the user. In some embodiments, to more clearly describe the position relationship between the first sound hole 1191, the second sound hole 1192, and the inner contour 1014 of the user's auricle, the distance between the first sound hole 1191 and the second sound hole 1192 may be represented by a first distance OP between the first projection point P of the first sound hole 1191 on the sagittal plane and the second projection point O of the second sound hole on the sagittal plane. More descriptions regarding the first distance OP may be found in the above descriptions of when the earphone extends to the concha cavity, which is not repeated herein. In some embodiments, an extension line of a line connecting point P and point O and the projection of the inner contour 1014 of the user's auricle on the sagittal plane may have an intersection point A. The distance between the second sound hole 1192 and the inner contour 1014 may be represented by a fourth distance OA between the second projection point O of the second sound hole on the sagittal plane and the intersection point A.

Considering that the distance between the first sound hole 1191 and the second sound hole 1192 is limited by the dimensions of the sound production component 11. In some embodiments, the distribution of the sound hole 1191 and the second sound hole 1192 on the sound production component 11 may be represented by a ratio of the distance between the first projection point P and the second projection point O to a size of the first projection in the major axis direction. Taking the first sound hole 1191 and the second sound hole 1192 being disposed on the sound production component 11 as an example, the first projection point P of the first sound hole 1191 on the sagittal plane and the second projection point O of the second sound hole 1192 on the sagittal plane are respectively disposed in diagonal corners of the first projection, e.g., a lower-left corner and an upper-right corner, such that the first projection point P may have a relatively large distance from the second projection point O. The first projection point P of the first sound hole 1191 on the sagittal plane and the second projection point O of the second sound hole 1192 on the sagittal plane are not limited to be located in the diagonal corners of the first projection, as long as the first projection point P and the second projection point O are sufficiently separated from each other within a specific distance range. In conjunction with the descriptions above, the size of the sound production component 11 should not be too large, and on the premise that the size of the sound production component 11 is limited, the distance between the first projection point P and the second projection point O is made as large as possible, and on the basis of this, to make the first sound hole 1191 have a relatively large distance from the second sound hole 1192, the first projection point P and the second projection point O may be distributed as far as possible along any diagonal line of the first projection and a vicinity thereof. In some embodiments, a ratio of the distance between the first projection point P of the first sound hole 1191 on the sagittal plane and the second projection point O of the second sound hole 1192 on the sagittal plane to the size of the first projection along the major axis direction X may be within a range of 0.7-1.2. Further, considering that when a user wears the earphones, the first projection point P of the first sound hole 1191 on the sagittal plane and the second projection point O of the second sound hole 1192 on the sagittal plane are located at the diagonal corners of the first projection, the second sound hole 1192 may be very close to the inner contour of the auricle of the user, which may cause the inner contour of the auricle to generate a reflection effect on the sound wave generated by the voice of the user or an external sound wave when the sound wave is transmitted to the inner contour of the auricle, especially in a frequency range of 3 kHz-8 kHz, thereby resulting in that the sound received by the second microphone is larger than the sound received by the first microphone, and affecting a subsequent noise cancellation and a sound reception effect. Based on this, in some embodiments, to minimize an influence of the inner contour of the auricle of the user on the second microphone, and to ensure the sound collection effect of the first microphone and the second microphone, the position of the second microphone should be provided at intervals from the inner contour of the auricle of the user by a certain distance, for example, the second projection point O of the second sound hole 1192 on the sagittal plane in FIG. 35 should be appropriately far away from a upper-right boundary of the sound production component in contact with the inner contour of the auricle. In some embodiments, the ratio of the distance between the first projection point P and the second projection point O to the size of the first projection along the major axis direction X may be within a range of 0.7-1.2. In some embodiments, to further minimize the influence of the inner contour of the auricle of the user on the second microphone, ensure the sound collection effect of the first microphone and the second microphone, and that the first microphone and the second microphone have a large distance, the ratio of the distance between the first projection point P and the second projection point O to the size of the first projection along the major axis direction X may be within a range of 0.75-1. In some embodiments, the ratio of the distance between the first projection point P and the second projection point O to the size of the first projection along the major axis direction X may be within a range of 0.8-1.

In some embodiments, considering that when the second sound hole 1192 is closer to the inner contour 1014 of the auricle, and when the sound waves generated by the user's speech or external sound waves are transmitted to the inner contour 1014 of the auricle, the inner contour 1014 may have a reflection effect on the sound waves, especially in the frequency range of 3 kHz-8 kHz, which may result in that the sound received by the second microphone is louder than the sound received by the first microphone, thereby affecting the subsequent noise reduction effect and sound collection effect. In addition, due to a limited size of the sound production component 11, it is necessary to ensure a relatively great distance between the first sound hole 1191 and the second sound hole 1192. While when the second sound hole 1192 is far from the inner contour 1014 of the auricle, the distance between the first sound hole 1191 and the second sound hole 1192 becomes smaller, which may affect the subsequent signal processing.

FIG. 38A—FIG. 38D are schematic diagrams illustrating frequency response curves corresponding to different distances between a second projection point O and an intersection point A according to some embodiments of the present disclosure.

Figure 38A:
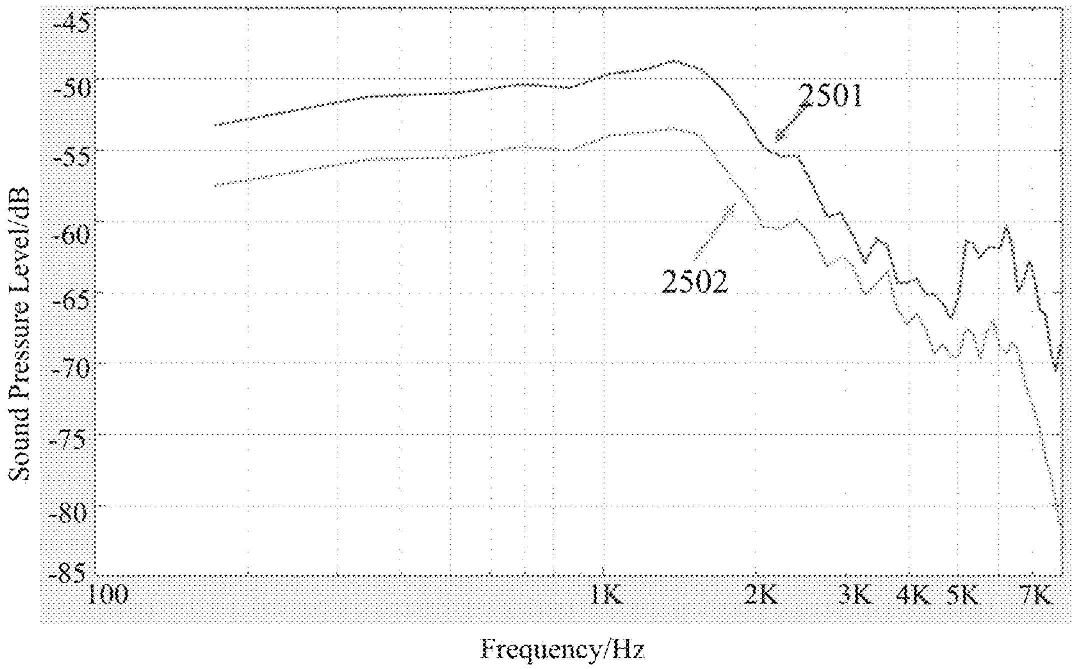
FIG. 38A is a schematic diagram illustrating a frequency response curve corresponding to a distance of 8 mm between a second projection point and an intersection point according to some embodiments of the present disclosure.

Referring to FIG. 38A, curves 2501 and 2502 are frequency response curves of the first microphone and the second microphone when the first distance OP between the first projection point P and the second projection point O is 25 mm and the fourth distance OA between the second projection point O and the intersection point A is 8 mm. The second sound hole 1192 is disposed on the upper side of the sound production component 11. According to FIG. 38A, when the second sound hole 1192 is disposed on the upper side of the sound production component 11 and the fourth distance OA is 8 mm, the sound collection effect of the first microphone is better than the second microphone in all frequency bands, the responses of the first microphone and the second microphone to the sound are relatively consistent, and an overall sound collection effect is relatively good.

Figure 38B:
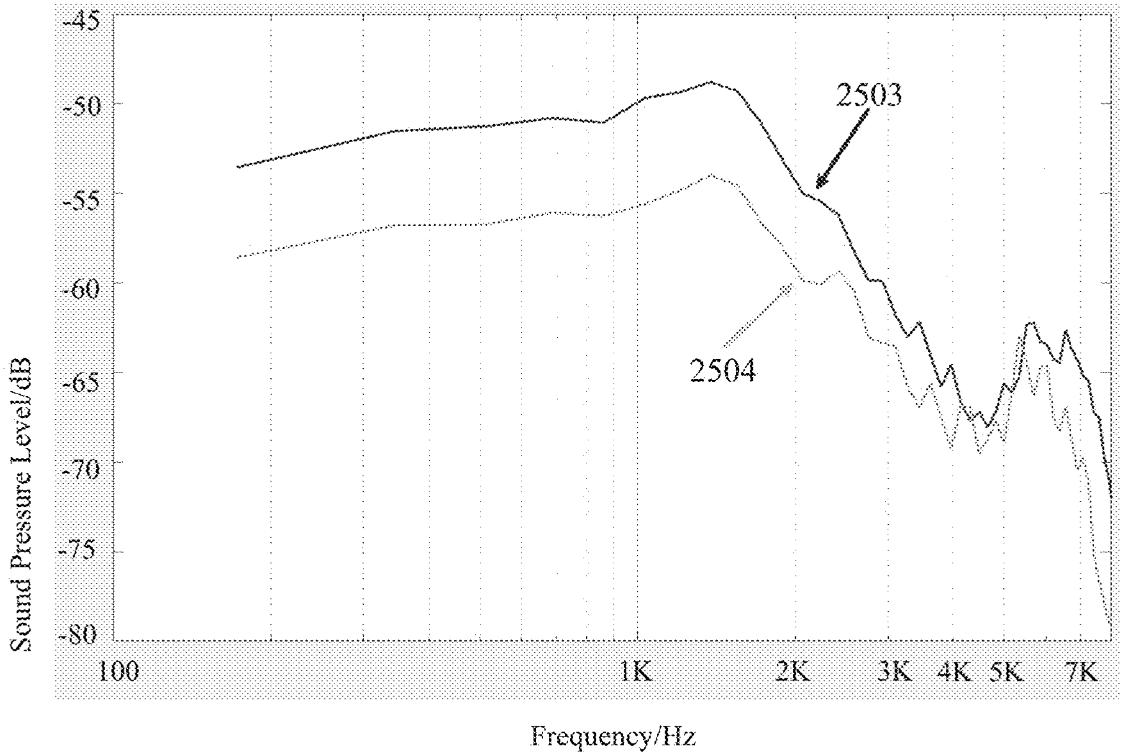
FIG. 38B is a schematic diagram illustrating a frequency response curve corresponding to a distance of 6 mm between a second projection point and an intersection point according to some embodiments of the present disclosure.

Referring to FIG. 38B, the curve 2503 and the curve 2504 are frequency response curves of the first microphone and the second microphone when the first distance OP between the first projection point P and the second projection point O is 25 mm and the fourth distance OA between the second projection point O and the intersection point A is 6 mm. The second sound hole 1192 is disposed on the upper side of the sound production component 11, which is the same as the situation shown in FIG. 38A. According to FIG. 38B, when the second sound hole 1192 is disposed on the upper side of the sound production component 11 and the fourth distance OA is 6 mm, a difference between amplitudes of sounds collected by the first microphone and the second microphone in a frequency band above 4 kHz is very small. In such cases, the sound collection effect of the entire microphone assembly on the voice of the user's mouth may be affected, and there may be a loss in a high frequency.

Figure 38C:
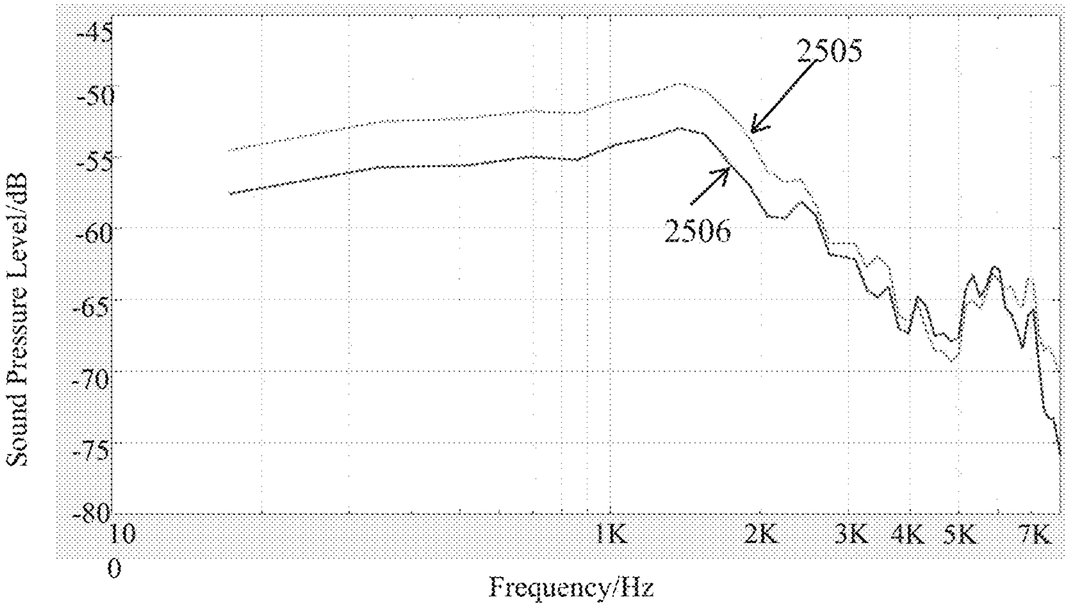
FIG. 38C is a schematic diagram illustrating a frequency response curve corresponding to a distance of 4 mm between the second projection point and the intersection point according to some embodiments of the present disclosure.

Referring to FIG. 38C, the curves 2505 and 2506 are frequency response curves of the first microphone and the second microphone when the first distance OP between the first projection point P and the second projection point O is 25 mm and the fourth distance OA between the second projection point O and the intersection point A is 4 mm. The second sound hole 1192 is disposed on the upper side of the sound production component 11, which is the same as the situation shown in FIGS. 38A and 38B. According to FIG. 38C, when the second sound hole 1192 is disposed on the upper side of the sound production component 11 and the fourth distance OA is 4 mm, a difference between amplitudes of sounds collected by the first microphone and the second microphone in a frequency band between 2.2 kHz-4 kHz is also significantly reduced, and the frequency band with the good sound collection effect is further narrowed.

Figure 38D:
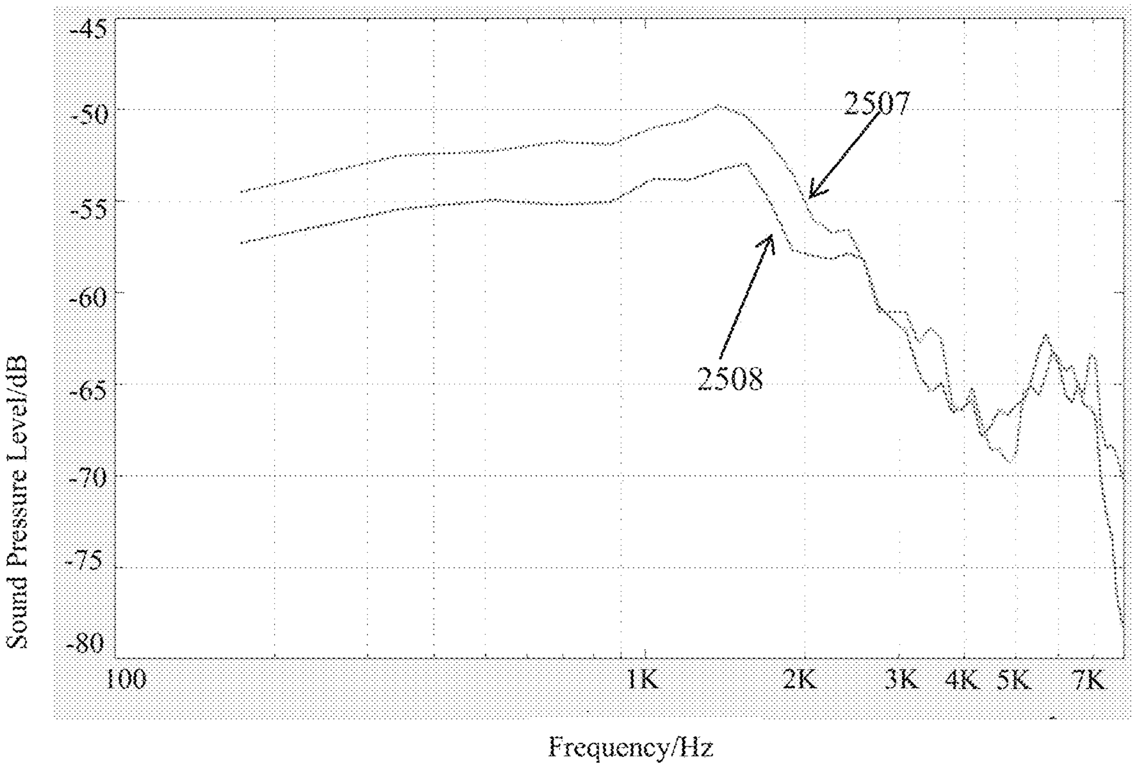
FIG. 38D is a schematic diagram illustrating a frequency response curve corresponding to a distance of 2 mm between a second projection point and an intersection point according to some embodiments of the present disclosure.

Referring to FIG. 38D, the curve 2507 and the curve 2508 are frequency response curves of the first microphone and the second microphone when the first distance OP between the first projection point P and the second projection point O is 25 mm and the fourth distance OA between the second projection point O and the intersection point A is 2 mm. The second sound hole 1192 is disposed on the upper side of the sound production component 11, which is the same as the situation shown in FIG. 38A—FIG. 38C. According to FIG. 38D, when the second sound hole 1192 is disposed on the upper side of the sound production component 11 and the fourth distance OA is 2 mm, there is almost no difference between the amplitudes of sounds collected by the first microphone and the second microphone in a frequency band above 2.2 kHz, and the sound collection effect of the microphone assembly on the voice of the user's mouth may be seriously affected.

In some embodiments, to ensure that the first microphone and the second microphone have better sound collection effects and noise reduction effects, the distance between the second projection point O and the intersection point A of the second sound hole 1192 on the sagittal plane may be between 2 mm-10 mm. In some embodiments, the distance between the second projection point O and the intersection point A may be between 4 mm-10 mm. In some embodiments, the distance between the second projection point O and the intersection point A may be between 6 mm-10 mm. In some embodiments, the distance between the second projection point O and the intersection point A may be between 8 mm-10 mm. To further reduce the influence of the inner auricle 1014 of the auricle on the second microphone, the position of the first sound hole 1191 and/or the second sound hole 1192 on the sound production component may be adjusted, and the ratio of the first distance OP between the first projection point P and the second projection point O to the fourth distance OA between the second projection point O and the intersection point A may be between 1.8-4.4. To reduce the influence of the inner contour of the auricle on the second microphone and to facilitate the subsequent signal processing, the distance between the second sound hole 1192 and the inner contour of the auricle may be increased, the distance between the first sound hole 1191 and the second sound hole 1192 may be increased, and the ratio of the first distance OP between the first projection point P and the second projection point O to the fourth distance OA between the second projection point O and the intersection point A may be between 2.5-3.8. When the wearing position of the earphone remains unchanged, to further reduce the influence of the inner contour of the auricle on the second microphone, the distance between the second sound hole 1192 and the inner contour of the auricle may be increased, and the distance between the first sound hole 1191 and the second sound hole 1191 may be increased at the same time to facilitate the subsequent signal processing. In some embodiments, the ratio of the first distance OP between the first projection point P and the second projection point O to the fourth distance OA between the second projection point O and the intersection point A may be between 2.5-3.5. In some embodiments, the ratio of the first distance OP between the first projection point P and the second projection point O to the fourth distance OA between the second projection point O and the intersection point A may be between 2.5-3.3.

It should be noted that the above description is mainly aimed at the situation where the second sound hole 1192 is disposed on the upper side of the sound production component 11. When the second sound hole 1192 is disposed on the outer side of the sound production component, since the second sound hole 1192 is basically on the same plane with the user's helix, the distance between the second projection point O and the intersection point A has no significant influence on the sound collection effect of the second microphone. In such cases, it only needs to ensure that the user's helix is not significantly higher than the second sound hole 1192.

Continuing to refer to FIG. 35, in the second wearing state, the distance between the first sound hole 1191 and the user's mouth (referring to point Q in FIG. 35) may be smaller than the distance between the second sound hole 1192 and the user's mouth, so as to facilitate the subsequent signal processing. As shown in FIG. 35, when the earphone 10 is in the second wearing state, the first sound hole 1191 may have the first projection point P on the sagittal plane of the user (e.g., the T-S plane shown in FIG. 35), the second sound hole 1192 may have the second projection point O on the sagittal plane of the user, and the third projection point Q is used to indicate the projection of the user's mouth (e.g., the lip bead) on the sagittal plane of the user. The distance between PQ is less than the distance between OQ.

In some embodiments, the line connecting the first projection point P of the first sound hole 1191 on the sagittal plane of the user and the second projection point O of the second sound hole 1192 on the sagittal plane approximately points to the third projection point Q of the user's mouth on the sagittal plane. In such cases, a directivity algorithm may be constructed based on the sounds received by the first microphone and the second microphone such that the received voice of the user may be clearer. In some embodiments, the line PQ connecting the first projection point P and the third projection point Q may form a certain angle with respect to the line OQ connecting the second projection point O and the third projection point Q. To ensure the directivity of the first sound hole 1191 and the second sound hole 1192, an angle between PQ and OQ may be smaller than 30°. In some embodiments, the angle between PQ and OQ may be 0°-25°. In some embodiments, the angle between PQ and OQ may be 5°-20°. For example, in some embodiments, the angle between PQ and OQ may be 0°, 3°, 9°, 15°, etc.

Figure 39A:
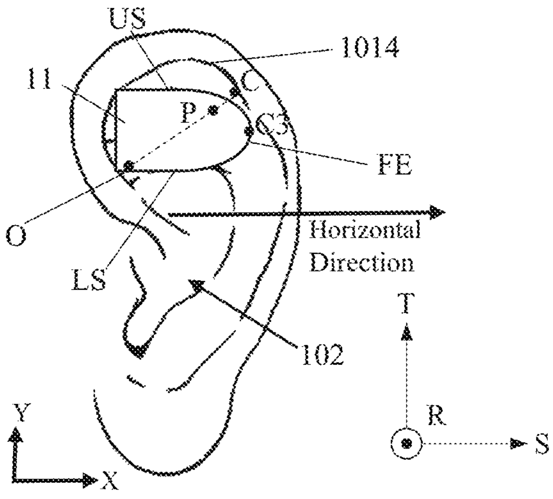
FIG. 39A is a schematic diagram illustrating an exemplary wearing of an earphone according to some embodiments of the present disclosure.
Figure 39B:
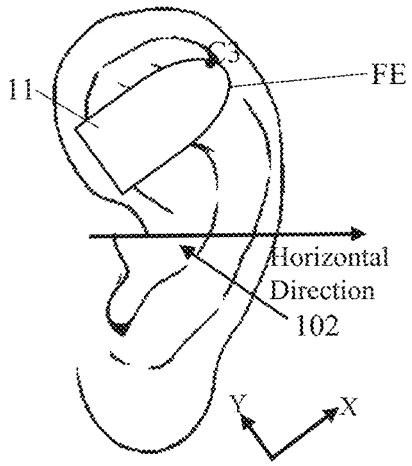
FIG. 39B is a schematic diagram illustrating an exemplary wearing of an earphone according to some embodiments of the present disclosure.
Figure 39C:
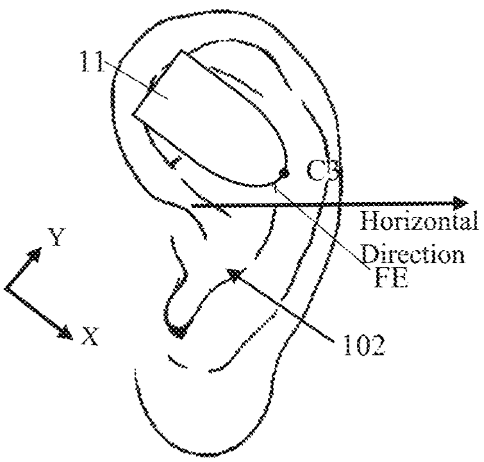
FIG. 39C is a schematic diagram illustrating an exemplary wearing of an earphone according to some embodiments of the present disclosure.

FIG. 39A-FIG. 39C are schematic diagram illustrating different exemplary fit positions of the earphone to a user's ear canal according to the present disclosure. As shown in FIG. 39A-FIG. 39C, the line connecting the first projection point P of the first microphone hole 1191 on the sagittal plane and the second projection point O of the second microphone hole 1192 on the sagittal plane intersects with the projection of the antihelix on the sagittal plane at the intersection point A. The intersection point A is relevant to the distribution of the first microphone hole 1191 and the second microphone hole 1192 on the sound production component 11, as well as the wearing position of the sound production component 11 relative to the concha cavity 102 and the inner contour 1014 of the auricle, especially to the distance from the rear side FE (also referred to as the end or free end of the sound production component 11) of the sound production component 11 relative to the concha cavity 102. In addition, the distance between the rear side of the sound production component 11 and the edge of the concha cavity and the distance between the rear side of the sound production component 11 and the inner contour 1014 of the auricle affect the comfort and stability of the sound production component 11 in the wearing state. The specific position of the sound production component 11 in the wearing state may be limited by limiting the distance of the rear side of the sound production component 11 relative to the edge of the concha cavity, so as to improve the listening volume at the opening of the ear canal of the user and at the same time improve the sound collection effect of the first microphone and the second microphone. Referring to FIG. 39A, in some embodiments, the upper side US or the lower side LS of the sound production component 11 may be parallel or approximately parallel to the horizontal plane in the wearing state, and the end FE of the sound production component 11 may be located between the inner contour 1014 of the auricle and the edge of the concha cavity 102, i.e., the midpoint C3 of the projection of the end FE of the sound production component 11 on the sagittal plane may be located between the projection of the inner contour 1014 of the auricle on the sagittal plane and the projection of the edge of the concha cavity 102 on the sagittal plane. As shown in FIG. 39B and FIG. 39C, in some embodiments, the upper side US or the lower side LS of the sound production component 11 may also be inclined at a certain angle relative to the horizontal plane in the wearing state. As shown in FIG. 39B, the end FE of the sound production component 11 may be inclined toward the region of the top of the auricle relative to the fixed end of the sound production component 11, and the end FE of the sound production component 11 may abut against the inner contour 1014 of the auricle. As shown in FIG. 39C, the fixed end of the sound production component 11 may be inclined toward the region of the top of the auricle relative to the end FE of the sound production component 11, and the end FE of the sound production component 11 may be located between the edge of the concha cavity 102 and the inner contour 1014 of the auricle. That is to say, the midpoint C3 of the projection of the end FE of the sound production component 11 on the sagittal plane may be located between the projection of the inner contour 1014 of the auricle on the sagittal plane and the projection of the edge of the concha cavity 102 on the sagittal plane. In some embodiments, the midpoint C3 of the projection of the end FE of the sound production component 11 on the sagittal plane may be located between the projection of the inner contour 1014 of the auricle on the sagittal plane and the projection of the edge of the concha cavity 102 on the sagittal plane. In the wearing state, if a distance between the midpoint C3 of the projection of the end FE of the sound production component 11 on the sagittal plane and the projection of the edge of the concha cavity 102 on the sagittal plane is too small, the end FE of the sound production component 11 may not abut against the inner contour 1014 of the auricle, and the sound production component 11 may not be limited and may be easy to fall off. If a distance between the midpoint C3 of the projection of the end FE of the sound production component 11 on the sagittal plane and the projection of the edge of the concha cavity 102 on the sagittal plane is too large, the sound production component 11 may squeeze the inner contour 1014 of the auricle, causing discomfort to the user after a long time of wearing. To ensure that the earphone 10 has a better listening effect and ensure the wearing comfort and stability for the user, in some embodiments, the distance between the midpoint C3 of the projection of the end FE of the sound production component 11 on the sagittal plane and the projection of the edge of the concha cavity on the sagittal plane may be not greater than 15 mm, and the distance between the second projection point O of the second sound hole 1192 on the sagittal plane and the intersection point A is within a range of 2 mm-10 mm. In some embodiments, the distance between the midpoint C3 of the projection of the end FE of the sound production component 11 on the sagittal plane and the projection of the edge of the concha cavity on the sagittal plane may be not greater than 13 mm, and the distance between the second projection point O of the second sound hole 1192 on the sagittal plane and the intersection point A is within a range of 4 mm-10 mm. In some embodiments, the distance between the midpoint C3 of the projection of the end FE of the sound production component 11 on the sagittal plane and the projection of the edge of the concha cavity on the sagittal plane may be not greater than 11 mm, and the distance between the second projection point O of the second sound hole 1192 on the sagittal plane and the intersection point A is within a range of 6 mm-10 mm. In addition, considering that a gap is formed between the end FE of the sound production component 11 and the inner contour 1014 of the auricle, the sound emitted from the sound guiding hole and the sound emitted from the pressure relief hole may have acoustic short circuit in a region between the end FE of the sound production component 11 and the inner contour 1014 of the auricle, resulting in a decrease in the listening volume at the opening of the ear canal of the user. The larger the region between the end FE of the sound production component 11 and the inner contour 1014 of the auricle, the more obvious the acoustic short circuit. To ensure the listening volume when the user wears the earphone 10, in some embodiments, the end FE of the sound production component 11 may abut against the inner contour 1014 of the auricle to close the acoustic short circuit between the end FE of the sound production component 11 and the inner contour 1014 of the auricle, thereby increasing the listening volume at the opening of the ear canal.

It should be noted that, when the projection of the end FE of the sound production component 11 on the sagittal plane is the curved line or the broken line, the midpoint C3 of the projection of the end FE of the sound production component 11 on the sagittal plane may be selected by the following exemplary method. A line segment may be drawn by selecting two farthest points on the projection of the end FE on the sagittal plane along the minor axis direction Y, a mid-perpendicular line may be drawn by selecting the midpoint on the line segment, and an interaction point of the mid-perpendicular line and the projection may be the midpoint C3 of the projection of the end FE of the sound production component 11 on the sagittal plane. In some embodiments, when the end FE of the sound production component 11 is the curved surface, the tangent point where a tangent line parallel to the minor axis direction Y on the projection may also be selected as the midpoint of the projection of the end FE of the sound production component 11 on the sagittal plane.

In addition, in some embodiments of the present disclosure, the distance between the midpoint of the projection of the end FE of the sound production component 11 on the sagittal plane and the projection of the edge of the concha cavity on the sagittal plane refers to a minimum distance between the midpoint of the projection of the end FE of the sound production component 11 on the sagittal plane and the projection region of the edge of the concha cavity on the sagittal plane. The distance between the midpoint C3 of the projection of the end FE of the sound production component 11 on the sagittal plane and the projection of the edge of the concha cavity on the sagittal plane refers to a distance between the midpoint C3 of the projection of the end FE of the sound production component 11 on the sagittal plane and the projection of the edge of the concha cavity on the sagittal plane in the sagittal axis.

The whole or a portion of the sound production component 11 may cover the antihelix region to form the baffle. The listening effect when the user wears the earphone 10 may be related to the distance between the sound guiding hole and the pressure relief hole of the sound production component 11. The less the distance between the sound guiding hole and the pressure relief hole, the more the sounds emitted from the sound guiding hole and the pressure relief hole cancel each other at the opening of the ear canal of the user, and the lower the listening volume at the opening of the ear canal of the user. The distance between the sound guiding hole and the pressure relief hole may be related to the size of the sound production component 11. For example, the sound guiding hole may be arranged on a sidewall (e.g., the lower side or the inner side) of the sound production component 11 close to the opening of the ear canal of the user. The pressure relief hole may be arranged on a sidewall (e.g., the upper side or the outer side) of the sound production component 11 away from the opening of the ear canal of the user. Therefore, the size of the sound production component may affect the listening volume at the opening of the ear canal of the user. For example, if the size is too large, pressure may be brought to most regions of the ear, affecting the wearing comfort of the user and the convenience of carrying around. In some embodiments, a distance between a midpoint of the projection of the upper side US and a highest point of the second projection and a distance between a midpoint of the projection of the lower side LS of the sound production component 11 on the sagittal plane and the highest point of the second projection may reflect the size of the sound production component 11 along the minor axis direction Y. Accordingly, in order to improve the listening effect of the earphone 10 while ensuring that the earphone 10 does not block the opening of the ear canal of the user, in some embodiments, when the wearing state of the earphone 10 is that at least a portion of the sound production component 11 covers the antihelix region of the user, the distance between the midpoint of the projection of the upper side US of the sound production component 11 on the sagittal plane and the highest point of the second projection may be within a range of 12 mm-24 mm, and the distance between the midpoint of the projection of the lower side LS of the sound production component 11 on the sagittal plane and the highest point of the second projection may be within a range of 22 mm-34 mm. In some embodiments, the distance between the midpoint of the projection of the upper side US of the sound production component 11 on the sagittal plane and the highest point of the second projection may be within a range of 12.5 mm-23 mm, and the distance between the midpoint of the projection of the lower side LS of the sound production component 11 on the sagittal plane and the highest point of the second projection may be within a range of 22.5 mm-33 mm. It should be noted that, when the projection of the upper side US of the sound production component 11 on the sagittal plane is a curved line or a broken line, the midpoint of the projection of the upper side US of the sound production component 11 on the sagittal plane may be selected by the following exemplary method. A line segment may be drawn by selecting two farthest points on the projection of the upper side US on the sagittal plane along the major axis direction X, a mid-perpendicular line may be drawn by selecting a midpoint on the line segment, and an interaction point of the mid-perpendicular line and the projection may be the midpoint of the projection of the upper side US of the sound production component 11 on the sagittal plane. In some alternative embodiments, a point on the projection of the upper side US on the sagittal plane with a smallest distance from the highest point of the second projection may be selected as the midpoint of the projection of the upper side US of the sound production component 11 on the sagittal plane. The midpoint of the projection of the lower side LS of the sound production component 11 on the sagittal plane may be selected in the same manner as above. For example, a point on the projection of the lower side LS on the sagittal plane with a largest distance from the highest point of the second projection may be selected as the midpoint of the projection of the lower side LS of the sound production component 11 on the sagittal plane.

In some embodiments, a distance between the midpoint of the projection of the upper side US of the sound production component 11 on the sagittal plane and a projection of the upper vertex of the ear hook on the sagittal plane and a distance between the midpoint of the projection of the lower side LS of the sound production component 11 on the sagittal plane and a projection of the upper vertex of the ear hook on the sagittal plane may reflect the size of the sound production component 11 along the minor axis direction Y. To improve the listening effect of the earphone 10 while ensuring that the earphone 10 does not block the opening of the ear canal of the user, in some embodiments, the distance between the midpoint of the projection of the upper side US of the sound production component 11 on the sagittal plane and the projection of the upper vertex of the ear hook on the sagittal plane may be within a range of 13 mm-20 mm, and the distance between the midpoint of the projection of the lower side LS of the sound production component 11 on the sagittal plane and the projection of the upper vertex of the ear hook on the sagittal plane may be within a range of 22 mm-36 mm. In some embodiments, the distance between the midpoint of the projection of the upper side US of the sound production component 11 on the sagittal plane and the projection of the upper vertex of the ear hook on the sagittal plane may be within a range of 14 mm-19.5 mm, and the distance between the midpoint of the projection of the lower side LS of the sound production component 11 on the sagittal plane and the projection of the upper vertex of the ear hook on the sagittal plane may be within a range of 22.5 mm-35 mm. In some embodiments, the distance between the midpoint of the projection of the upper side US of the sound production component 11 on the sagittal plane and the projection of the upper vertex of the ear hook on the sagittal plane may be within a range of 15 mm-18 mm, and the distance between the midpoint of the projection of the lower side LS of the sound production component 11 on the sagittal plane and the projection of the upper vertex of the ear hook on the sagittal plane may be within a range of 26 mm-30 mm.

Referring to FIG. 7, in some embodiments, the first sound hole 1191 may be disposed on a second portion 122 of the ear hook. Specifically, in some embodiments, the first sound hole 1191 may be disposed near a connection between the second portion 122 of the ear hook and the sound production component 11. For example, the first sound hole 1191 may be disposed on the second portion 122 of the ear hook or on the sound production component 11. In the present disclosure, the first sound hole 1191 being disposed near the connection between the second portion 122 of the ear hook and the sound production component 11 refers to that a minimum distance between the first sound hole 1191 and the connection is not greater than 4 mm. In some embodiments, a position relationship between the first sound hole 1191 and the second portion 122 of the ear hook as well as the sound production component 11 may be represented by a distance between the projection of the first sound hole 1191 on the sagittal plane and a projection of the connection on the sagittal plane. For example, in some embodiments, the minimum distance between the projection of the first sound hole 1191 on the sagittal plane and the projection of the connection on the sagittal plane may be not greater than 4 mm. In some embodiments, the first sound hole 1191 may be disposed at the connection between the sound production component 11 and the second portion 122 of the ear hook. In some embodiments, the sound production component 11 and the second portion 122 of the ear hook may be mutually independent structures, and the sound production component 11 and the second portion 122 of the ear hook may be connected through splicing, embedding, plugging, etc. The connection between the sound production component 11 and the second portion 122 of the ear hook may refer to a connection gap between the sound production component 11 and the second portion 122 of the ear hook. In some embodiments, the first sound hole 1191 disposed near the connection between the sound production component 11 and the second portion 122 of the ear hook (e.g., the first sound hole 1191 may be disposed on the second portion 122 of the ear hook) may ensure that the first sound hole 1191 is close to the user without occupying an inner space of the sound production component 11, which may facilitate an installation of the transducer and a wiring of an internal circuit, thereby effectively improving production efficiency.

When the first sound hole 1191 is disposed in the second portion 122 of the ear hook, the distribution of the first sound hole 1191 relative to the earphone 10 may be determined by a ratio of the minimum distance between the projection of the first sound hole 1191 on the sagittal plane (e.g., the first projection point P) and the projection of the connection between the sound production component and the second portion of the ear hook on the sagittal plane to a distance between the midpoint of the projection of the upper side or the lower side of the sound production component and the projection of the upper vertex of the ear hook on the sagittal plane. When the ratio of the minimum distance between the projection of the first sound hole 1191 on the sagittal plane and the projection of the connection between the sound production component and the second portion of the ear hook on the sagittal plane to the seventh distance or the eighth distance is too large, e.g., when the first sound hole 1191 is located at the upper vertex T1 of the ear hook, the first sound hole 1191 may be far away from the mouth of the user, which affects the sound collection effect of the first microphone. In addition, when the first sound hole 1191 is located too close to the upper vertex T1 of the ear hook, the line connecting the first sound hole 1191 and the second sound hole 1192 is unable to point to the region of the user's mouth, which affects the sound collection effect when the user speaks. Based on the above problems, in some embodiments, the ratio of the minimum distance between the projection of the first sound hole 1191 on the sagittal plane and the projection of the connection between the sound production component 11 and the second portion 122 of the ear hook to the distance between the midpoint C1 of the projection of the upper side of the sound production component on the sagittal plane and the projection of the upper vertex T1 of the ear hook on the sagittal plane is not greater than 0.27. In some embodiments, the ratio of the minimum distance between the projection of the first sound hole 1191 on the sagittal plane and the projection of the connection between the sound production component 11 and the second portion 122 of the ear hook to the distance between the midpoint C2 of the projection of the lower side of the sound production component 11 on the sagittal plane, and the projection of the upper vertex T1 of the ear hook on the sagittal plane is not greater than 0.18.

In some embodiments, the listening volume of the sound production component 11, the sound leakage reduction effect, and the wearing comfort and stability may also be improved by adjusting the distance between the centroid $O_1$ of the first projection and the contour of the second projection. For example, when the sound production component 11 is located at the top of the auricle, the earlobe, the facial region on the front side of the auricle, or between the inner contour of the auricle and the edge of the concha cavity, which may be specifically embodied as that the distance between the centroid $O_1$ of the first projection and a point in a certain region of the edge of the second projection is too small and the distance between the centroid $O_1$ of the first projection and a point in another region of the edge of the second projection is too large, the antihelix region may not cooperate with the sound production component 11 to act as the baffle, thereby affecting the acoustic output effect of the earphone. In addition, if the distance between the centroid $O_1$ of the first projection and the point in the certain region of the edge of the second projection is too large, a gap may be formed between the end FE of the sound production component 11 and the inner contour 1014 of the auricle, and the sound emitted from the sound guiding hole and the sound emitted from the pressure relief hole may produce an acoustic short circuit in a region between the end FE of the sound production component 11 and the inner contour 1014 of the auricle, resulting in a decrease in the listening volume at the opening of the ear canal of the user. The larger the region between the end FE of the sound production component 11 and the inner contour 1014 of the auricle, the more obvious the acoustic short circuit. In some embodiments, when the wearing state of the earphone 10 is that at least a portion of the sound production component 11 covers the antihelix region of the user, the centroid $O_1$ of the first projection of the sound production component 11 on the sagittal plane of the head of the user may also be located in a region enclosed by the contour of the second projection, but compared with the case that at least a portion of the sound production component 11 extends into the concha cavity of the user, in the wearing state, the distance between the centroid $O_1$ of the first projection of the sound production component 11 on the sagittal plane of the head of the user and the contour of the second projection may be different. In the earphones in FIG. 35-FIG. 37, at least a portion of the structure of the sound production component 11 may cover the antihelix region, which may fully expose the opening of the ear canal, and make the user better receive sounds from the external environment. In some embodiments, to consider the listening volume of the sound production component 11, the sound leakage reduction effect, the effect of receiving the sound of the external environment, and reducing the region between the end FE of the sound production component 11 and the inner contour 1014 of the auricle as much as possible in the wearing state to make the sound production component 11 have better acoustic output quality, the distance between the centroid $O_1$ of the first projection and the contour of the second projection may be within a range of 13 mm-54 mm. In some embodiments, the distance between the centroid $O_1$ of the first projection and the contour of the second projection may be within a range of 18 mm-50 mm. In some embodiments, the distance between the centroid $O_1$ of the first projection and the contour of the second projection may be within a range of 20 mm-45 mm. In some embodiments, by controlling the distance between the centroid $O_1$ of the first projection of the sound production component 11 on the sagittal plane of the head of the user and the contour of the second projection to be within a range of 23 mm-40 mm, the sound production component 11 may be approximately located in the antihelix region of the user, and at least a portion of the sound production component 11 may form the baffle with the antihelix region to increase the sound path of the sound emitted from the pressure relief hole to the external ear canal 101, thereby increasing the sound path difference between the sound guiding hole and the pressure relief hole to the external ear canal 101, increasing the sound intensity at the external ear canal 101, and reducing the volume of far-field sound leakage.

In some embodiments, to avoid that the distance between the centroid $O_1$ of the first projection and the projection of the first portion 121 of the ear hook on the sagittal plane is too large to cause unstable wearing and the problem that the region between the end FE of the sound production component 11 and the inner contour 1014 of the auricle is relatively large, and avoid that the distance between the centroid $O_1$ of the first projection and the projection of the first portion 121 of the ear hook 12 on the sagittal plane is too small to cause poor wearing comfort and the problem that the sound production component 11 is unable to match with the antihelix region to achieve relatively good acoustic output quality, the distance between the centroid $O_1$ of the first projection of the sound production component 11 on the sagittal plane of the user and the projection of the first portion 121 of the ear hook on the sagittal plane may be controlled to be within 8 mm-45 mm. It can be understood that by controlling the distance to be within the range of 8 mm-45 mm, the first portion 121 of the ear hook may fit well with the rear inner side of the auricle of the user when the user wears the earphone, and the sound production component 11 may be ensured to be just located in on the antihelix region of the user such that the sound production component 11 form the baffle with the antihelix region to increase the sound path of the sound emitted from the pressure relief hole to the external ear canal 101, thereby increasing the sound path difference between the sound guiding hole and the pressure relief hole to the external ear canal 101, increasing the sound intensity at the external ear canal 101, and reducing the volume of far-field sound leakage. In addition, the distance between the centroid $O_1$ of the first projection of the sound production component 11 on the sagittal plane of the user and the projection of the first portion 121 of the ear hook on the sagittal plane may be controlled within the range of 8 mm-45 mm, which may make the region between the end FE of the sound production component 11 and the inner contour 1014 of the auricle minimized to reduce the acoustic short circuit region around the sound production component 11, thereby increasing the listening volume at the opening of the ear canal of the user. In some embodiments, to further improve the wearing stability of the earphone, the distance between the centroid $O_1$ of the first projection of the sound production component 11 on the sagittal plane of the user and the projection of the first portion 121 of the ear hook on the sagittal plane may be within a range of 10 mm-41 mm. In some embodiments, the distance between the centroid $O_1$ of the first projection of the sound production component 11 on the sagittal plane of the user and the projection of the first portion 121 of the ear hook on the sagittal plane may be within a range of 13 mm-37 mm. In some embodiments, the distance between the centroid $O_1$ of the first projection of the sound production component 11 on the sagittal plane of the user and the projection of the first portion 121 of the ear hook on the sagittal plane may be within a range of 15 mm-33 mm. In some embodiments, the distance between the centroid $O_1$ of the first projection of the sound production component 11 on the sagittal plane of the user and the projection of the first portion 121 of the ear hook on the sagittal plane may be within a range of 20 mm-25 mm. In some embodiments, a ratio of the distance (the fourth distance) between the second projection point O of the second sound hole 1192 on the sagittal plane and the intersection point A to the distance (the sixth distance) between the centroid $O_1$ of the first projection and the projection of the first portion 121 of the ear hook in the sagittal plane may reflect the position of the second sound hole 1192 on the earphone and the distance of the second sound hole 1192 relative to the inner contour of the auricle, e.g., the greater the ratio, the greater the distance of the second sound hole 1192 relative to the inner contour. The sound enhancement effect of the antihelix on the second sound hole 1192 may be reduced by increasing the distance of the second sound hole 1192 relative to the antihelix, but since the size of the sound production component 11 is limited, the distance between the first microphone hole 1191 and the second microphone hole 1192 should also be considered. In such cases, in some embodiments, the ratio of the fourth distance OA to the distance between the centroid $O_1$ of the first projection and the projection of the first portion 121 of the ear hook on the sagittal plane may be 0.32-1. To further reduce the sound enhancement effect of the antihelix on the second sound hole 1192, the distance between the second projection point O of the second sound hole 1192 on the sagittal plane and the intersection point A may be further increased. In some embodiments, the fourth distance OA to the distance between the centroid $O_1$ of the first projection and the projection of the first portion 121 of the ear hook on the sagittal plane may be 0.45-0.8. In some embodiments, the ratio of the fourth distance OA to the distance between the centroid $O_1$ of the first projection and the projection of the first portion 121 of the ear hook on the sagittal plane may be 0.5-0.7.

Exemplarily, in some embodiments, the ear hook 12 may be elastic and may deform to a certain extent in the wearing state compared with the non-wearing state. For example, in some embodiments, the distance between the centroid $O_1$ of the first projection of the sound production component 11 on the sagittal plane of the user and the projection of the first portion 121 of the ear hook on the sagittal plane in the wearing state may be greater than that in the non-wearing state. Exemplarily, in some embodiments, when the earphone 10 is in the non-wearing state, the distance between the centroid of the projection of the sound production component 11 on a specific reference plane and the projection of the first portion 121 of the ear hook on the specific reference plane may be within a range of 6 mm-40 mm. In some embodiments, the distance between the centroid of the projection of the sound production component 11 on the specific reference plane and the projection of the first portion 121 of the ear hook on the specific reference plane may be within a range of 9 mm-32 mm. It can be understood that in some embodiments, by making the distance between the centroid of the projection of the sound production component 11 on the specific reference plane and the projection of the first portion 121 of the ear hook on the specific reference plane in the non-wearing state slightly smaller than that in the wearing state, when the earphone 10 is in the wearing state, the ear hook and the sound production component may product a certain clamping force on the ear of the user to improve the wearing stability for the user without affecting the wearing experience of the user. Descriptions regarding the specific reference plane may be found elsewhere in the present disclosure, which is not repeated herein.

In some embodiments, when the wearing state of the earphone 10 is that at least a portion of the sound production component 11 covers the antihelix region of the user, the centroid $O_1$ of the first projection of the sound production component 11 on the sagittal plane of the user may be located outside a projection region of the opening of the ear canal on the sagittal plane, making the opening of the ear canal fully open to better receive sound information from the external environment. The position of the centroid $O_1$ of the first projection may be related to the size of the sound production component. If the size of the sound production component 11 in the major axis direction X or the minor axis direction Y is too small, the volume of the sound production component 11 may be relatively small, and then an area of a diaphragm inside the sound production component 11 may also be relatively small, resulting in low efficiency of the diaphragm pushing the air inside the housing of the sound production component 11 to produce sound, which may affect the acoustic output effect of the earphone. When the size of the sound production component 11 in the major axis direction X is too large, the sound production component 11 may exceed the auricle, the inner contour of the auricle may not support and limit the sound production component 11, and thus the earphone may be liable to fall off in the wearing state. In addition, if the size of the sound production component 11 in the major direction X is too small, a gap may be formed between the end FE of the sound production component 11 and the inner contour 1014 of the auricle, and the sound emitted from the sound guiding hole and the sound emitted from the pressure relief hole may have acoustic short circuit in the region between the end FE of the sound production component 11 and the inner contour 1014 of the auricle, resulting in a decrease in the listening volume at the opening the ear canal of the user. The larger the region between the end FE of the sound production component 11 and the inner contour 1014 of the auricle, the more obvious the acoustic short circuit. When the size of the sound production component 11 in the minor axis direction Y is too large, the sound production component 11 may cover the opening of the ear canal of the user, affecting the user obtaining sound information from the external environment. In some embodiments, to make the sound production component have better acoustic output quality, when the earphone is in the wearing state, the distance between the centroid of the first projection of the sound production component on the sagittal plane of the user and the centroid of the projection of the opening of the ear canal of the user on the sagittal plane may not be greater than 25 mm. In some embodiments, the distance between the centroid of the first projection of the sound production component on the sagittal plane of the user and the centroid of the projection of the opening of the ear canal of the user on the sagittal plane may be within a range of 5 mm-23 mm. In some embodiments, the distance between the centroid of the first projection of the sound production component on the sagittal plane of the user and the centroid of the projection of the opening of the ear canal of the user on the sagittal plane may be within a range of 8 mm-20 mm. In some embodiments, by controlling the distance between the centroid of the first projection of the sound production component on the sagittal plane of the user and the centroid of the projection of the opening of the ear canal of the user on the sagittal plane to be within the range of 10 mm-17 mm, the centroid $O_1$ of the first projection may be approximately located in the antihelix region of the user. Therefore, the sound output by the sound production component may be better transmitted to the user, the opening of the ear canal may be kept fully open to obtain the sound information from the external environment. Meanwhile, the inner contour of the auricle may also make at least a portion of the sound production component 11 be subjected to a force that prevents its downward movement, thereby improving the wearing stability of the earphone 10. It should be noted that the shape of the projection of the opening of the ear canal on the sagittal plane may be approximately regarded as an ellipse. Correspondingly, the centroid of the projection of the opening of the ear canal on the sagittal plane may be a geometric center of the ellipse.

Referring to FIG. 39A, in some embodiments, when the sound production component 11 is a quasi-cuboid structure, the upper side US or the lower side LS of the sound production component 11 may be parallel to a horizontal plane (e.g., the ground plane) in the wearing state. Referring to FIG. 39B and FIG. 39C, in some embodiments, the upper side US or the lower side LS of the sound production component 11 may also be inclined at a certain angle relative to the horizontal plane. Referring to FIG. 39A and FIG. 39B, when the sound production component 11 is inclined upward relative to the horizontal direction, if an inclination angle of the upper side US or the lower side LS of the sound production component 11 relative to the horizontal plane is too large, the sound guiding hole of the sound production component 11 to be away from the opening of the ear canal, affecting the listening volume at the opening of the ear canal of the user. Referring to FIG. 39A and FIG. 39C, when the sound production component is inclined downward relative to the horizontal direction, if the inclination angle of the upper side US or the lower side LS of the sound production component 11 relative to the horizontal plane is too large, the sound production component 11 may cover the opening of the ear canal, affecting user obtaining sound information from the external environment. Based on the above problems, to make the opening of the ear canal of the user have a better listening effect in the wearing state, and ensure that the opening of the ear canal of the user remains fully open, in some embodiments, in the wearing state of the earphone 10, an inclination angle of a projection of the upper side US or the lower side LS of the sound production component 11 on the sagittal plane relative to the horizontal direction may be not greater than 40°. In some embodiments, in the wearing state of the earphone 10, the inclination angle of the projection of the upper side US or the lower side LS of the sound production component 11 on the sagittal plane relative to the horizontal direction may be greater than 25°. In some embodiments, in the wearing state of the earphone 10, the inclination angle of the projection of the upper side US or the lower side LS of the sound production component 11 on the sagittal plane relative to the horizontal direction may be not greater than 10°.

It should be noted that the inclination angle of the projection of the upper side US of the sound production component 11 on the sagittal plane relative to the horizontal direction may be the same as or different from the inclination angle of the projection of the lower side LS of the sound production component 11 on the sagittal plane relative to the horizontal direction. For example, when the upper side US is parallel to the lower side LS of the sound production component 11, the inclination angle of the projection of the upper side US on the sagittal plane relative to the horizontal direction and the inclination angle of the projection of the lower side LS on the sagittal plane relative to the horizontal direction may be the same. As another example, when the upper side US is not parallel to the lower side LS of the sound production component 11, or one of the upper side US and the lower side LS is a planar wall, and the other one of the upper side US and the lower side LS is a non-planar wall (e.g., a curved wall), the inclination angle of the projection of the upper side US on the sagittal plane relative to the horizontal direction and the inclination angle of the projection of the lower side LS on the sagittal plane relative to the horizontal direction may be different. In addition, when the upper side US or the lower side LS is a curved surface or a concave-convex surface, the projection of the upper side US or the lower side LS on the sagittal plane may be a curved line or a broken line. Then the inclination angle of the projection of the upper sidewall on the sagittal plane relative to the horizontal direction may be an included angle between a tangent line of a point at which the curved line or the broken line has a largest distance relative to the ground plane and the horizontal direction, and the inclination angle of the projection of the lower sidewall on the sagittal plane relative to the horizontal direction may be an included angle between a tangent line of a point at which the curved line or the broken line has a smallest distance relative to the ground plane and the horizontal direction.

In addition to this, when the user wears the earphone, the line connecting the first sound hole 1191 and the second sound hole 1192 needs to be pointed toward the mouth of the user to better collect the sound of the user's speech. On the basis that there exists a certain inclination angle of the upper side US or the lower side LS of the sound production component 11 relative to the horizontal direction, the line connecting the first sound hole 1191 and the second sound hole 1192 is further provided to tilt relative to the upper side US or the lower side LS of the sound production component 11, such that the directivity of the first microphone and the second microphone may be better satisfied. For example, the directivity of the first microphone and the second microphone may be reflected by the inclination angle of the sound production component relative to the horizontal direction in the wearing state, and by the inclination angle between a line connecting the first projection point P of the first sound hole 1191 on the sagittal plane and the second projection point O of the second sound hole 1192 on the sagittal plane and the projection of the upper side or the lower side of the sound production component on the sagittal plane. The angle between the line connecting the first projection point P and the second projection point O and the projection of the upper side or the lower side of the sound production component on the sagittal plane may be represented by an included angle θ8 between the line connecting the first projection point P and the second projection point O and the major direction X of the projection of the sound production component 11 on the sagittal plane.

Figure 40:
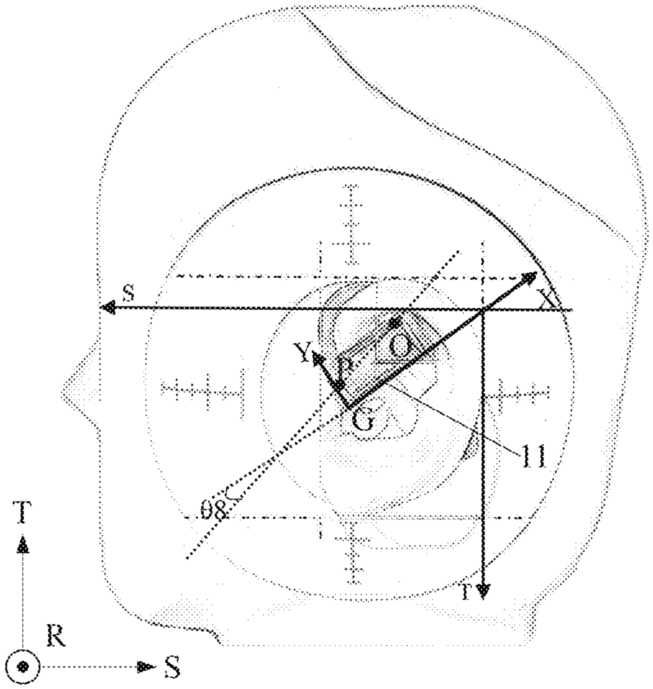
FIG. 40 is a schematic diagram illustrating an exemplary wearing of an earphone according to some embodiments of the present disclosure.

FIG. 40 is a schematic diagram illustrating an exemplary wearing of an earphone according to some other embodiments of the present disclosure. Referring to FIG. 40, a projection of the sound production component 11 on a sagittal plane may include a major axis direction X and a minor axis direction Y. The major axis direction X refers to a length extension direction of the sound production component 11, and the minor axis direction Y refers to a height (or width) extension direction of the sound production component 11. When the earphone 10 is in the second wearing state, the first sound hole 1191 may have a first projection point P on the sagittal plane of the user, and the second sound hole 1192 may have a second projection point O on the sagittal plane of the user. The angle between the line connecting the projection point P and the second projection point O and the major axis direction X of the projection of the sound production component 11 on the sagittal plane may be indicated as θ8. In some embodiments, the sound collection effects of the first sound hole 1191 and the second sound hole 1192 may be controlled by adjusting the angle θ8.

As shown in FIG. 40, the sagittal axis S and the vertical axis T may represent the critical directions of the line connecting the first projection point P and the second projection point O relative to the major axis direction X of the projection of the sound production component 11 on the sagittal plane. In other words, in some embodiments of the present disclosure, the direction of the line connecting the first projection point P and the second projection point O may be between the sagittal axis S and the vertical axis T, so as to improve the sound collection effects of the first microphone and the second microphone when the user speaks. In some embodiments, an angle between the line connecting the first projection point P and the second projection point O and the major axis direction X of the projection of the sound production component 11 on the sagittal plane may be indicated by taking a negative direction of the major axis direction X shown in FIG. 40 as 0° and the counterclockwise direction as the positive direction. Specifically, in some embodiments of the present disclosure, to ensure a good listening effect at the opening of the ear canal of the user, make the first microphone and the second microphone have better sound collection effects, and make the opening of the ear canal fully open, in the wearing state, the inclination angle of the projection of the upper side US or the lower side LS of the sound production component 11 on the sagittal plane relative to the horizontal direction may be not greater than 40°, and the angle θ8 between the line connecting the first projection point P and the second projection point O and the major axis direction X of the projection of the sound production component 11 on the sagittal plane may be between −45°-45°. In some embodiments, the inclination angle of the projection of the upper side US or the lower side LS of the sound production component 11 on the sagittal plane relative to the horizontal direction may be not greater than 25°, and the angle θ8 between the line connecting the first projection point P and the second projection point O and the major axis direction X of the projection of the sound production component 11 on the sagittal plane may be −25°-30°. In such cases, the inclination angle of the projection of the upper side US or the lower side LS of the sound production component 11 on the sagittal plane relative to the horizontal direction is reduced, the sound guiding hole of the sound production component is closer to the opening of the ear canal of the user, which improves the listening volume at the opening of the ear canal of the user. In addition, the angle between the line connecting the first projection point P and the second projection point O and the major axis direction X is appropriately reduced such that the line connecting the first projection point P and the second projection point O may point to a region of the user's mouth. In some embodiments, the inclination angle of the projection of the upper side US or the lower side LS of the sound production component 11 on the sagittal plane relative to the horizontal direction may be not greater than 25°, and the angle θ8 between the line connecting the first projection point P and the second projection point O and the major axis direction X of the projection of the sound production component 11 on the sagittal plane may be −20°-25°. In such cases, the inclination angle of the projection of the upper side US or the lower side LS of the sound production component 11 on the sagittal plane relative to the horizontal direction is reduced and the angle between the line connecting the first projection point P and the second projection point O and the major axis direction X is reduced such that the sound guiding hole of the sound production component is further closer to the opening of the ear canal of the user, which improves the listening volume at the opening of the ear canal of the user, and makes the line connecting the first projection point P and the second projection point O point to the region of the user's mouth more accurately. It should be noted that, in some embodiments, the earphone may further be in the wearing state shown in FIG. 42A, at this time the upper or lower side of the sound production component is approximately parallel to the horizontal direction (e.g., the inclination angle between the projection of the upper side US or the lower side LS and the horizontal direction is not greater than 10°). In such cases, the angle θ8 between the line connecting the first projection point P and the second projection point O and the major axis direction X of the projection of the sound production component 11 on the sagittal plane may be 0-90°.

Similar to the wearing state in which at least a portion of the sound production component 11 extends into the user's concha cavity, in some embodiments, when the earphone 10 is worn by the user with at least a portion of the sound production component 11 covers the antihelix region of the user, to ensure that the line connecting the first sound hole 1191 and the second sound hole 1192 has a better directivity, an angle between the line connecting the first sound hole 1191 and the second sound hole 1192 and the coronal axis of the user may be between −30°-−135°. In some embodiments, the angle between the line connecting the first sound hole 1191 and the second sound hole 1192 and the coronal axis of the user may be between −50°-−135°. In such cases, the line connecting the first sound hole 1191 and the second sound hole 1192 points to the region near the left and right sides of the user's mouth. In some embodiments, the angle between the line connecting the first sound hole 1191 and the second sound hole 1192 and the coronal axis of the user may be between −90°-−135°. In such cases, the line connecting the first sound hole 1191 and the second sound hole 1192 may point to the user's mouth. When the angle between the line connecting the first sound hole 1191 and the second sound hole 1192 and the coronal axis of the user is −90°, the line connecting the first sound hole 1191 and the second sound hole 1192 is parallel to the sagittal plane of the user.

Figure 41:
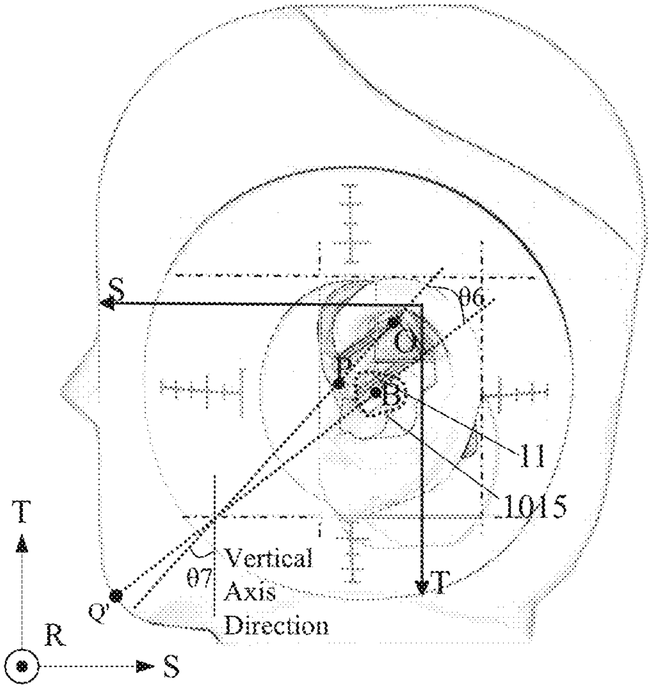
FIG. 41 is a schematic diagram illustrating an exemplary wearing of an earphone according to some embodiments of the present disclosure.

FIG. 41 is a schematic diagram illustrating an exemplary wearing of an earphone according to some other embodiments of the present disclosure. Referring to FIG. 41, when the earphone 10 is in the second wearing state, the bottom of the mandible of the user may have a fifth projection point Q' on the sagittal plane of the user, and a centroid of the projection of the opening of the ear canal of the user on the sagittal plane (e.g., the dotted line region 1015 in FIG. 41) is B. The line connecting the fifth projection point Q' and the centroid B of the projection of the opening of the ear canal of the user on the sagittal plane may reflect a relative position between the sound production component 11 and the bottom of the mandible of the user.

Continuing to refer to FIG. 41, the first sound hole 1191 may have a first projection point P on the sagittal plane of the user, and the second sound hole 1192 may have a second projection point O on the sagittal plane of the user. In some embodiments, to make the first sound hole 1191 and the second sound hole 1192 have better directivity, that is, the line connecting the first sound hole 1191 and the second sound hole 1192 point to the region between the user's mouth and the bottom of the mandible of the user, an angle θ6 between the line connecting the first projection point P and the second projection point O and a line connecting the fifth projection point Q' and the centroid B of the projection of the opening of the ear canal on the sagittal plane may be not greater than 45°. In some embodiments, when the earphone 10 is in the second wearing state, the angle θ6 between the line connecting the first projection point P and the second projection point O and the line connecting the fifth projection point Q' and the centroid B of the projection of the opening of the ear canal on the sagittal plane may be 6°-35°. In such cases, the line connecting the first sound hole 1191 and the second sound hole 1192 may point to the region close to the user's mouth. In some embodiments, the angle θ6 between the line connecting the first projection point P and the second projection point O and the line connecting the fifth projection point Q' and the centroid B of the projection of the opening of the ear canal on the sagittal plane may b may be 10°-25°. In such cases, the line connecting the first sound hole 1191 and the second sound hole 1192 may point to the user's mouth more accurately.

Continuing to refer to FIG. 26, the sagittal axis S and the vertical axis T may represent critical directions of the line connecting the first sound hole 1191 and the second sound hole 1192. That is, in some embodiments of the present disclosure, to improve the sound collection effects of the first microphone and the second microphone when collecting the user's speech, the line connecting the first sound hole 1191 and the second sound hole 1192 may be between the sagittal axis S and the vertical axis T. The line connecting the first projection point P and the second projection point O may form a certain angle θ7 with the vertical axis of the user. The angle θ7 may reflect the directivity of the line connecting the first sound hole 1191 and the second sound hole 1192. Based on this, in some embodiments, the angle θ7 between the line connecting the first sound hole 1191 and the second sound hole 1192 and the vertical axis of the user may be not greater than 90°. In some embodiments, to make the line connecting the first sound hole 1191 and the second sound hole 1192 point to the user's mouth to improve the sound collection effects of the first sound hole 1191 and the second sound hole 1192, the angle θ7 between the line connecting the first projection point P and the second projection point O and the vertical axis of the user may be appropriately reduced. In some embodiments, the angle θ7 between the line connecting the first projection point P and the second projection point O and the vertical axis of the user may be within a range of 20°-80°. In some embodiments, to make the line connecting the first sound hole 1191 and the second sound hole 1192 point to the mouth of the user, thereby ensuring the sound collection effect of the first sound hole 1191 and the second sound hole 1192, the angle θ7 between the line connecting the first sound hole 1191 and the second sound hole 1192 and the vertical axis of the user may be further reduced. In some embodiments, the angle θ7 between the line connecting the first sound hole 1191 and the second sound hole 1192 and the vertical axis of the user may be within a range of 40°-70°. In some embodiments, the angle θ7 between the line connecting the first sound hole 1191 and the second sound hole 1192 and the vertical axis of the user may be within a range of 42°-65°. At this time, the line connecting the first projection point P and the second projection point O may point to the user's mouth, and the sound collection effects of the first sound hole 1191 and the second sound hole 1192 may be improved.

Figure 42A:
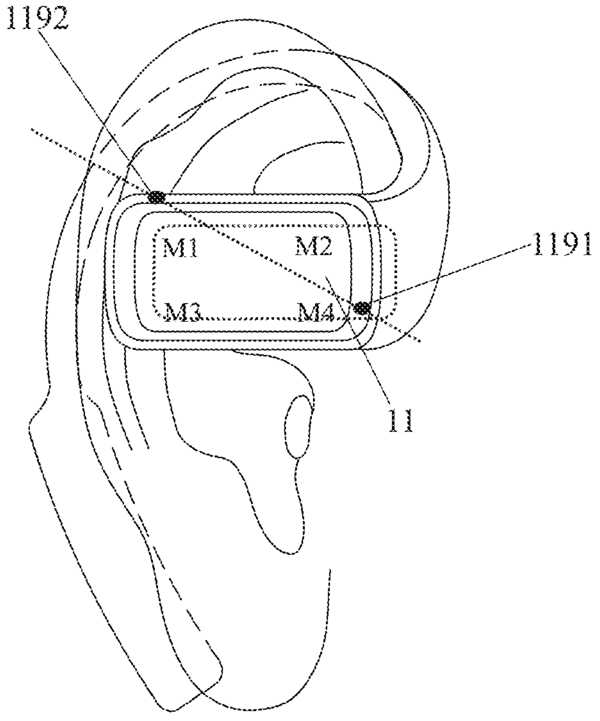
FIG. 42A is a schematic diagram illustrating an exemplary wearing of an earphone according to some embodiments of the present disclosure.
Figure 42B:
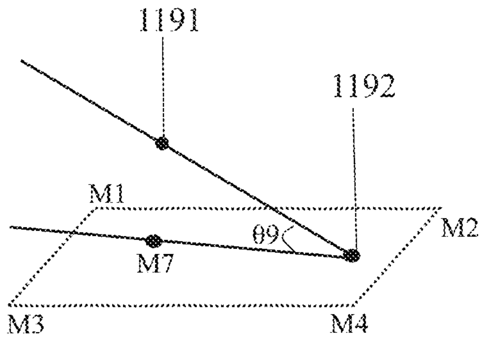
FIG. 42B is a schematic diagram illustrating an angle between a line connecting a first sound hole and a second sound hole and an outer side of a sound production component according to some embodiments of the present disclosure.

FIG. 42A is a schematic diagram illustrating an exemplary wearing of an earphone according to some embodiments of the present disclosure. FIG. 42B is a schematic diagram illustrating an angle between a line connecting a first sound hole and a second sound hole and an outer side of a sound production component according to some embodiments of the present disclosure.

In some embodiments, to make a portion of or the whole structure of the sound production component cover the antihelix region when the user wears the earphone as shown in FIG. 40, a certain included angle may be formed between the upper side US of the sound production component 11 and the second portion 122 of the ear hook. Similar to that at least a portion of the sound production component extends into the concha cavity, referring to FIG. 16A, the included angle may be represented by an included angle β between the projection of the upper side US of the sound production component 11 on the sagittal plane and a tangent line 126 of a projection of a connection between the second portion 122 of the ear hook and the upper side US of the sound production component 11 on the sagittal plane. Specifically, the upper side of the sound production component 11 and the second portion 122 of the ear hook may have the connection. The projection of the connection on the sagittal plane may be a point U. The tangent line 126 of the projection of the second portion 122 of the ear hook on the sagittal plane may be drawn through the point U. When the upper side US is a curved surface, the projection of the upper side US on the sagittal plane may be a curved line or a broken line. At this time, the included angle between the projection of the upper side US on the sagittal plane and the tangent line 126 may be an included angle between a tangent line to a point at which the curved line or the broken line has a largest distance from the ground plane and the tangent line 126. In some embodiments, when the upper side US is the curved surface, a tangent line parallel to the major axis direction X on the projection may also be selected, and an included angle between the tangent line and the horizontal direction may be used to represent the included angle between the projection of the upper side US on the sagittal plane and the tangent line 126. In some embodiments, the included angle β may be within a range of 45°-110°. In some embodiments, the included angle β may be within a range of 60°-100°. In some embodiments, the included angle β may be within a range of 80°-95°.

The human head is approximately regarded as a quasi-sphere structure, and the auricle is a structure that protrudes relative to the head. When the user wears the earphone, a portion of the ear hook 12 may be attached to the head of the user. To make the sound production component 11 in contact with the antihelix region, in some embodiments, a certain inclination angle may be formed between the sound production component 11 and the ear hook plane when the earphone is in the wearing state. The inclination angle may be represented by an included angle between a plane corresponding to the sound production component 11 and the ear hook plane. In some embodiments, the plane 11 corresponding to the sound production component 11 may include an outer side and an inner side. In some embodiments, when the outer side or the inner side of the sound production component 11 is a curved surface, the plane corresponding to the sound production component 11 refers to a tangent plane corresponding to the curved surface at a center position, or a plane roughly coinciding with a curve enclosed by the edge contour of the curved plane. Taking the inner side of the sound production component 11 as an example, the included angle formed between the inner side and the ear hook plane may be the inclination angle of the sound production component 11 relative to the ear hook plane.

Considering that if the angle is too large, the contact area between the sound production component 11 and the antihelix region of the user may be small, sufficient contact resistance may not be provided, and the earphone may be liable to fall off when the user wears the earphone. In addition, the size (especially the size along major axis direction X of the sound production component 11) of the baffle formed by the antihelix region covered by at least a portion of the sound production component 11 may be too small, and the sound path difference from the sound guiding hole and the pressure relief hole to the external ear canal 101 may be small, affecting the listening volume at the opening of the ear canal of the user. Furthermore, if the size of the sound production component 11 along the major axis direction X is too small, the region between the end FE of the sound production component 11 and the inner contour 1014 of the auricle may be relatively large, and the sound emitted from the sound guiding hole and the sound emitted from the pressure relief hole may have the acoustic short circuit in the region between the end FE of the sound production component 11 and the inner contour 1014 of the auricle, resulting in a decrease in the listening volume at the opening of the ear canal of the user. To ensure that the user has a better listening effect when wearing the earphone 10, while ensuring the wearing stability and comfort, for example, in some embodiments, when the wearing manner of the earphone is that at least a portion of the sound production component covers the antihelix region of the user and the earphone is in the wearing state, the inclination angle of the plane corresponding to the sound production component 11 relative to the ear hook plane may be not greater than 8°. Therefore, the sound production component 11 and the antihelix region of the user may have a relatively large contact area, thereby improving the wearing stability. Meanwhile, most of the structure of the sound production component 11 may be located in the antihelix region, making the opening of the ear canal completely open, and facilitating the user to receive the sound from the external environment. In some embodiments, the inclination angle of the plane corresponding to the sound production component 11 relative to the ear hook plane may be within a range of 2°-7°. In some embodiments, the inclination angle of the plane corresponding to the sound production component 11 relative to the ear hook plane may be within a range of 3°-6°.

Due to the elasticity of the ear hook, the inclination angle of the sound production component relative to the ear hook plane may vary in the wearing state and the non-wearing state. For example, the inclination angle in the non-wearing state may be smaller than that in the wearing state. In some embodiments, when the earphone is in the non-wearing state, the inclination angle of the sound production component relative to the ear hook plane may be within a range of 0°-6°. By making the inclination angle of the sound production component relative to the ear hook plane in the non-wearing state slightly smaller than that in the wearing state, the ear hook of the earphone 10 may clamp the ear of the user (e.g., the antihelix region) when the earphone is in the wearing state. Therefore, the wearing stability for the user may be improved without affecting the wearing experience of the user. In some embodiments, in the non-wearing state, the inclination angle of the sound production component relative to the ear hook plane may be within a range of 1°-6°. In some embodiments, in the non-wearing state, the inclination angle of the sound production component relative to the ear hook plane may be within a range of 2°-5°.

When the size of the sound production component 11 in the thickness direction Z is too small, the volume of the front cavity and the volume of the rear cavity formed by the diaphragm and the housing of the sound production component 11 may be too small, the vibration amplitude of the vibration may be limited, and a large sound volume may not be provided. When the size of the sound production component 11 in the thickness direction Z is too large, the overall size or weight of the sound production component 11 is relatively large in the wearing state, which may affect the wearing stability and comfort. In some embodiments, to ensure that the sound production component 11 has a better acoustic output effect and ensure the wearing stability, in some embodiments, when the wearing mode of the earphone is that at least a portion of the sound production component covers the antihelix region of the user and the earphone is in the wearing state, a distance between a point on the sound production component farthest from the ear hook plane and the ear hook plane may be within a range of 12 mm-19 mm, and a distance between a point on the sound production component closest to the ear hook plane and the ear hook plane may be within a range of 3 mm-9 mm. In some embodiments, when the earphone is in the wearing state, the distance between the point on the sound production component farthest from the ear hook plane and the ear hook plane may be within a range of 13.5 mm-17 mm, and the distance between the point on the sound production component closest to the ear hook plane and the ear hook plane may be within a range of 4.5 mm-8 mm. In some embodiments, when the earphone is in the wearing state, the distance between the point on the sound production component farthest from the ear hook plane and the ear hook plane may be within a range of 14 mm-17 mm, and the distance between the point on the sound production component closest to the ear hook plane and the ear hook plane may be within a range of 5 mm-7 mm. In some embodiments, by controlling the distance between the point on the sound production component farthest from the ear hook plane and the ear hook plane to be within a range of 12 mm-19 mm, and controlling the distance between the point on the sound production component closest to the ear hook plane and the ear hook plane to be within a range of 3 mm-9 mm, the size of the sound production component along the thickness direction Z and the major axis direction X may be constrained such that at least a portion of the sound production component may cooperate with the antihelix region of the user to form the baffle, and the earphone may have better wearing comfort and stability. The overall structure of the earphone shown in FIG. 40 may be approximately the same as that of the earphone shown in FIG. 16A and FIG. 16B. Relevant descriptions regarding the inclination angle of the sound production component relative to the ear hook plane of the earphone shown in FIG. 40, and the distance between the point on the sound production component 11 farthest from the ear hook plane and the ear hook plane may be found in FIG. 16A and FIG. 16B.

In some embodiments, when the wearing manner of the earphone 10 is that at least a portion of the sound production component covers the antihelix region of the user and the earphone is in the wearing state, at least a portion of the sound production component 11 may be subjected to a force preventing the earphone from sliding down from the antihelix, thereby ensuring the acoustic output effect of the sound production component 11 and improving the wearing stability of the earphone through the force of the antihelix region on the sound production component 11. At this time, the sound production component 11 may have a certain inclination angle relative to the auricular plane of the user. When the inclination angle of the sound production component 11 relative to the auricular plane is large, the sound production component 11 may abut against the antihelix region, and the user may feel a strong sense of discomfort after wearing the earphone for a long time. Therefore, to make the user have better stability and comfort when wearing the earphone, and make that the sound production component 11 have a better acoustic output effect, the inclination angle of the sound production component of the earphone relative to the auricular plane may be within a range of 5°-40° in the wearing state. In some embodiments, to further optimize the acoustic output quality and the wearing experience of the earphone in the wearing state, the inclination angle of the sound production component relative to the auricular plane may be controlled to be within a range of 8°-35°. In some embodiments, the inclination angle of the sound production component relative to the auricular plane may be controlled to be within a range of 15°-25°. It should be noted that the inclination angle of the sidewall of the sound production component 11 away from the head of the user or facing the opening of the ear canal of the user relative to the auricular plane of the user may be a sum of an included angle $\gamma 1$ between the auricular plane and the sagittal plane and an included angle $\gamma 2$ between the sidewall of the sound production component 11 away from the head of the user or facing the opening of the ear canal of the user and the sagittal plane. The content regarding the inclination angle of the sound production component relative to the auricular plane may be found elsewhere in the embodiments of the present disclosure, e.g., FIG. 18 and related descriptions thereof.

Considering from the perspective of microphone collection, the line connecting the first sound hole 1191 and the second sound hole 1192 on the sound production component 11 needs to point to the region of the mouth of the user as far as possible to ensure the microphone sound collection effect. In such cases, the line connecting the first sound hole 1191 and the second sound hole 1192 needs to be at an angle to the outer or inner side of the sound production component 11. Specific descriptions are found in FIG. 42A or FIG. 42B and their corresponding contents. FIG. 42A is a schematic diagram illustrating an exemplary structure of an earphone according to some other embodiments of the present disclosure. FIG. 42B is a schematic diagram illustrating an included angle between the line connecting the first sound hole and the second sound hole and the outer side of the sound production component according to some embodiments of the present disclosure. Referring to FIGS. 42A and 42B, in some embodiments, when the earphone 10 is in the second wearing state, the angle between the line connecting the first sound hole 1191 and the second sound hole 1192 and the outer side of the sound production component 11 may be indicated as $\theta 5$. In some embodiments, the outer side of the sound production component 11 may be a plane. In such cases, the angle between the line connecting the first sound hole and the second sound hole and the outer side may be an angle between the line connecting the first sound hole and the second sound hole and the plane. In some embodiments, the outer side of the sound production component 11 may be a curved plane, and the angle between the line connecting the first sound hole and the second sound hole and the outer side refers to an angle between the line connecting the first sound hole and the second sound hole and a plane tangent to the curved plane of the outer side. Take the outer side being a plane as an example for illustration. In some embodiments, the outer side of the sound production component 11 may be indicated by four points M1, M2, M3, and M4 on the outer side. In some embodiments, the first sound hole 1191 and the second sound hole 1192 may be disposed on the same side or on different sides of the sound production component 11. For example, in some embodiments, the first sound hole 1191 and the second sound hole 1192 may both be disposed on the outer side of the sound production component 11. As another example, in some embodiments, the first sound hole 1191 may be disposed on the front side of the sound production component 11, and the second sound hole 1192 may be disposed on the outer side of the sound production component 11. As another example, in some embodiments, the first sound hole 1191 may be disposed on the lower side of the sound production component 11, and the second sound hole 1192 may be disposed on the outer side of the sound production component 11.

As shown in FIG. 42B, in some embodiments, in some embodiments, the first sound hole 1191 has a projection point M7 on the outer side M1M2M3M4, and the second sound hole 1192 may be disposed on the outer side of the sound production component 11 (that is, on the plane M1M2M3M4). The angle $\theta 9$ between the line connecting the first sound hole 1191 and the second sound hole 1192 and the outer side of the sound production component 11 refers to an angle between the line connecting the projection point M7 and the second sound hole 1192 and the line connecting the first sound hole 1191 and the second sound hole. In some embodiments, when the second sound hole 1192 is not disposed on the outer side of the sound production component 11, the second sound hole 1192 may have a projection point M8 (not shown) on the outer side M1M2M3M4. The angle $\theta 9$ between the line connecting the first sound hole 1191 and the second sound hole 1192 and the outer side of the sound production component 11 refers to an angle between the line connecting the projection point M7 and the projection point M8 and the line connecting the first sound hole 1191 and the second sound hole 1192.

It should be understood that the angle $\theta 9$ may reflect the relative position relationship between the first sound hole 1191 and the second sound hole 1192 in the thickness direction of the sound production component 11, and may further reflect the directivity of the line connecting the first sound hole 1191 and the second sound hole 1192 relative to the user's mouth. Accordingly, in some embodiments, to make the line connecting the first sound hole 1191 and the second sound hole 1192 have the better directivity so as to ensure that the first sound hole 1191 and the second sound hole 1192 have the better sound collection effect, the included angle θ5 between the line connecting first sound hole 1191 and the second sound hole 1192 and the outer side of the sound production component 11 may be within a range of 0°-60°, in such cases, the line connecting the first sound hole 1191 and the second sound hole 1192 may approximately point to the region in front of the user's face such that the first microphone and the second microphone may have the better sound collection effects. Exemplarily, the included angle θ5 between the line connecting the first sound hole 1191 and the second sound hole 1192 and the outer side of the sound production component 11 may be 10°-40°, in such cases, the line connecting the first sound hole 1191 and the second sound hole 1192 may approximately point to a region near the left and right of the user's mouth to improve the better sound collection effects of the first microphone and the second microphone. In some embodiments, the included angle θ9 between the line connecting the first sound hole 1191 and the second sound hole 1192 and the outer side of the sound production component 11 may be 25°-38°, in such cases, the line connecting the first sound hole 1191 and the second sound hole 1192 may point to the user's mouth to further improve the better sound collection effects of the first microphone and the second microphone. It should be noted that, to allow the line connecting first sound hole 1191 and the second sound hole 1192 to point to the region on the front side of the user, the inclination direction of the sound production component 11 (the outer side) relative to the auricular plane may be different from the inclination direction of the line connecting the sound hole 1191 and the second sound hole 1192 relative to the outer side of the sound production component 11, and considering from the perspective of vectors, if the included angle of the sound production component 11 (the outer side of the sound production component 11) relative to the auricular plane is considered to be positive, the included angle of the line connecting the first sound hole 1191 and the second sound hole 1192 relative to the outer side of the sound production component 11 is negative.

In some embodiments, when the earphone 10 is in the second wearing state, a coordinate system may be established with the major axis direction X, the minor axis direction Y, and the thickness direction Z of the sound production component 11, and positions of the sound hole 1191 and/or the second sound hole 1192 relative to the sound production component 11 may be indicated by the coordinates in the coordinate system. For example, the distances between the first sound hole 1191 and/or the second sound hole 1192 relative to the inner side of the sound production component 11 may be represented by Z values in the coordinate system. The distances between the first sound hole 1191 and/or the second sound hole 1191 relative to the front side of the sound production component 11 may be represented by X values in the coordinate system. The distances between the first sound hole 1191 and/or the second sound hole 1192 relative to the lower side of the sound production component 11 may be represented by Y values in the coordinate system. In some embodiments, the greater the Z value in the coordinate system, the farther the distance between the first sound hole 1191 and the inner side of the sound production component 11; the greater the X value, the farther the distance between the first sound hole 1191 and the front side of the sound production component 11; the greater the Y value, the farther the distance between the first sound hole 1191 and the lower side of the sound production component 11.

Similar to the wearing state in which at least a portion of the sound production component 11 extends into the user's concha cavity, in some embodiments, when the earphone 10 is in the second wearing mode, to make the first microphone have a better sound collection effect, a ratio of the distance between the first projection point P of the first sound hole 1191 on the sagittal plane and the projection of the front side of the sound production component 11 on the sagittal plane in the major axis direction X to a size of the projection of the sound production component 11 on the sagittal plane along the major axis direction may be not greater than 0.75. That is, when the sound production component 11 is divided into 4 equal portions along the major axis direction X, the first projection point P may be disposed in a region where X≤3. To make the first sound hole 1191 close to the user's mouth so as to improve the sound collection effect of the first microphone, in some embodiments, the ratio of the distance between the first projection point P of the first sound hole 1191 on the sagittal plane and the projection of the front side of the sound production component 11 on the sagittal plane in the major axis direction X to the size of the projection of the sound production component 11 on the sagittal plane along the major axis direction may be not greater than 0.5. In some embodiments, to make the first sound hole 1191 closer to the user's mouth so as to improve the sound collection effect of the first microphone, the ratio of the distance between the first projection point P of the first sound hole 1191 on the sagittal plane and the projection of the front side of the sound production component 11 on the sagittal plane in the major axis direction X to the size the projection of the sound production component 11 on the sagittal plane in the major axis direction may be not greater than 0.3. In some embodiments, to make the first sound hole 1191 closer to the user's mouth so as to improve the sound collection effect of the first microphone, the ratio of the distance between the first projection point P of the first sound hole 1191 on the sagittal plane and the projection of the front side of the sound production component 11 on the sagittal plane in the major axis direction X to the size of the projection of the sound production component 11 on the sagittal plane along the major axis direction may be not greater than 0.2. Moreover, the first sound hole 1191 may be disposed near the front side of the sound production component such that more choices for the position of the second sound hole 1192 may be provided, which may ensure that the second sound hole may have a specific distance from the first sound hole and that the second sound hole may be as far away from the antihelix as possible. Accordingly, in some embodiments, the ratio of the distance between the first projection point P of the first sound hole 1191 on the sagittal plane and the projection of the front side of the sound production component 11 on the sagittal plane in the major axis direction X to the size of the projection of the sound production component 11 on the sagittal plane along the major axis direction X may be not greater than 0.1. In some embodiments, the first sound hole 1191 may be disposed on the front side of the sound production component 11. In such cases, the first sound hole 1191 may be closer to the user's mouth in the horizontal direction, and the sound collection effect of the first microphone may be improved.

In some embodiments, to make the first microphone have a better sound collection effect, a ratio of a distance between the first projection point P of the first sound hole 1191 on the sagittal plane and the projection of the lower side of the sound production component 11 on the sagittal plane in the minor axis direction Y to a size of the projection of the sound production component 11 on the sagittal plane in the minor axis direction Y may be not greater than 0.5. That is, when the sound production component is divided into 4 equal parts along the minor axis direction Y, the first projection point P is disposed in a region where Y≤2. In some embodiments, to make the first sound hole 1191 closer to the user's mouth and improve the sound collection effect of the first microphone, the ratio of the distance between the first projection point P of the first sound hole 1191 on the sagittal plane and the projection of the lower side of the sound production component 11 on the sagittal plane in the minor axis direction Y to the size of the projection of the sound production component 11 on the sagittal plane along the minor axis direction may be not greater than 0.4. In some embodiments, the ratio of the distance between the first projection point P of the first sound hole 1191 on the sagittal plane and the projection of the lower side of the sound production component 11 on the sagittal plane in the minor axis direction Y to the size of the projection of the sound production component 11 on the sagittal plane along the minor axis direction may be not greater than 0.3. Moreover, the first sound hole 1191 may be disposed near the lower side of the sound production component such that more choices for the position of the second sound hole 1192 may be provided, which may ensure that the second sound hole may have a specific distance from the first sound hole and that the line connecting the first sound hole and the second sound hole may point to the user's mouth more accurately. Accordingly, in some embodiments, the ratio of the distance between the first projection point P of the first sound hole 1191 on the sagittal plane and the projection of the lower side of the sound production component 11 on the sagittal plane in the minor axis direction Y to the size of the projection of the sound production component 11 on the sagittal plane along the minor axis direction may be less than or equal to 0.1. In some embodiments, the first sound hole 1911 may be disposed on the lower side of the sound production component 11. In such cases, the first sound hole 1191 may be closer to the user's mouth in the vertical direction, and the sound collection effect of the first microphone may be improved.

Similar to the wearing state in which at least a portion of the sound production component 11 extends into the user's concha cavity, in some embodiments, when the earphone 10 is worn by the user with at least a portion of the sound production component 11 covers the antihelix region of the user, the first sound hole 1192 may be disposed on the lower side or the front side of the sound production component 11. In some embodiments, considering that when the first sound hole 1191 is too close to the inner side of the sound production component 11 (e.g., less than 2 mm), the first sound hole 1191 may be blocked by the user's ear in the wearing state, and the first microphone may collect the noise generated by a friction between the user's ear and the sound production component 11, and on the other hand, when the first sound hole 1191 is disposed on the lower side or the front side of the sound production component 11, the greater the distance between the first sound hole 1191 and the inner side of the portion 11, the smaller the volume of sound collected by the first sound hole 1191 from the user's mouth. Therefore, in some embodiments, to simultaneously improve the sound collection effect of the first sound hole 1191 and the volume of the sound collected from the user's mouth, a ratio of a distance between the first sound hole 1191 and the inner side of the sound production component 11 in the thickness direction Z to a size of the sound production component 11 along the thickness direction Z may be within a range of 0.25-0.7. For example, in some embodiments, the ratio of the distance between the first sound hole 1191 and the inner side of the sound production component 11 in the thickness direction Z to the size of the sound production component 11 along the thickness direction Z may be within a range of 0.25-0.65. The first sound hole 1191 may be disposed at a position with a relatively far distance from the inner side of the sound production component 11, which may reduce the influence of the noise generated by the friction between the sound production component 11 and the ear. Moreover, the distance between the first sound hole 1191 and the outer side of the sound production component 11 may be reduced such that the line connecting the first sound hole 1191 and the second sound hole 1192 may point to the user's mouth. In some embodiments, the ratio of the distance between the first sound hole 1191 and the inner side of the sound production component 11 in the thickness direction Z to the size of the sound production component 11 along the thickness direction Z may be within a range of 0.3-0.65. In such cases, the distance between the first sound hole 1191 and the outer side of the sound production component 11 may be further reduced such that the line connecting the first sound hole 1191 and the second sound hole 1192 may point to the user's mouth more accurately.

Referring to FIG. 27, in some embodiments, the projection (or an extension line of the projection) of the front side of the sound production component 11 on the sagittal plane of the user may have an intersection point G with the projection (or an extension line of the projection) of the lower side of the sound production component 11 on the sagittal plane of the user. The greater the distance between the first projection point P of the first sound hole 1191 on the sagittal plane and the intersection G, the greater the distance between the first projection point P and the user's mouth, and the worse the sound collection effect of the first microphone. Accordingly, in some embodiments, to improve the sound collection effect of the first microphone, the distance between the first projection point P and the intersection point G may be not greater than 5 mm. To improve the sound collection effect of the first microphone, the first sound hole 1191 may be disposed on the sound production component 11 closer to the user's mouth. In some embodiments, the distance between the first projection point and the intersection point G may be not greater than 3 mm. In some embodiments, the distance between the first projection point and the intersection point G may be not greater than 1 mm, in such cases, the first sound hole 1191 may be closer to the position of the user's mouth, which may further improve the sound collection effect of the first microphone.

Similar to the wearing state in which at least a portion of the sound production component 11 extends into the user's concha cavity, in some embodiments, when the earphone 10 is worn by the user with at least a portion of the sound production component 11 covers the antihelix region of the user, the second sound hole 1192 may be disposed on a side of the sound production component 11 that does not form an auxiliary cavity with the antihelix of the user. For example, the second sound hole 1192 may be disposed on the upper side US, the lower side LS, the outer side OS, etc. of the sound production component 11. In some embodiments, the second sound hole 1192 may be disposed on the outer side OS of the sound production component 11. In some embodiments, to avoid that the distance between the second sound hole 1192 and the user's auricle is too small to affect the quality of the sound collected by the earphone 10, the distance between the second sound hole 1192 and the upper side US of the sound production component 11 may be 1 mm-3 mm. The distance between the second sound hole 1192 and the rear side FE is 8 mm-12 mm. In some embodiments, the distance between the second sound hole 1192 and the upper side US may be 2 mm-2.5 mm, and the distance between the second sound hole 1192 and the rear side FE may be 9 mm-10 mm. In some embodiments, the distance between the second sound hole 1192 and the upper side US may be 2.47 mm, and the distance between the second sound hole 1192 and the rear side FE may be 9.96 mm. Similarly, to avoid that the distance between the second sound hole 1192 and the first sound hole 1191 is too small, in some embodiments, the distance between the second sound hole 1192 and the front side CE may be 8 mm-12 mm. In some embodiments, the distance between the second sound hole 1192 and the front side CE may be 8.5 mm-12 mm. In some embodiments, the distance between the second sound hole 1192 and the lower side LS may be 4 mm-8 mm. In some embodiments, the distance between the second sound hole 1192 and the lower side LS may be 6 mm-8 mm. It should be noted that, in the present disclosure, the distances from the first sound hole 1192 to the upper side, the front side, the rear side, and the lower side of the sound production component 11 refer to distances from the center of the opening of the first sound hole 1192 on the outer side of the housing of the sound production component 11 to the upper side, the front side, the rear side, and the lower side of the sound production component 11. When the side of the sound production component 11 (such as the upper side, the front side, the rear side, and the lower side) is a plane, the distance refers to the center of the opening of the first sound hole 1192 on the outer side of the housing of the sound production component 11 to the side. When the side of the sound production component 11 is a curved plane, the distance refers to a distance from the center of the opening of the first sound hole 1192 on the outer surface of the housing of the sound production component 11 to a tangent plane corresponding to the curved plane.

More details regarding the second wearing state may refer to the descriptions described elsewhere in the present disclosure (e.g., the relevant descriptions regarding the wearing state in which at least a portion of the sound production component extends into the concha cavity of the user) under the condition of no conflict, which is not repeated herein.

In some embodiments, when the earphone 10 is in the wearing state and at least a portion of the sound production component 11 covers the antihelix region of the user, the distance between the centroid of the first projection of the sound production component and the centroid of the projection of the battery compartment 13 on the sagittal plane is somewhat different from the distance between the centroid of the sound production component 11 and the centroid of the projection of the battery compartment 13 on the sagittal plane in the wearing state in which at least a portion of the sound production component 11 extends into the user's concha cavity. Similar to the wearing manner in which at least a portion of the sound production component 11 extends into the concha cavity of the user, to make the user have better stability and comfort when wearing the earphone 10, in the wearing state, a distance between the centroid of the projection of the sound production component 11 on the sagittal plane and the centroid of the projection of the battery compartment 13 on the sagittal plane may be within a range of 20 mm-30 mm. In some embodiments, the distance between the centroid of the projection of the sound production component 11 on the sagittal plane and the centroid of the projection of the battery compartment 13 on the sagittal plane may be within a range of 22 mm-28 mm. In some embodiments, the distance between the centroid of the projection of the sound production component 11 on the sagittal plane and the centroid of the projection of the battery compartment 13 on the sagittal plane may be within a range of 23 mm-26 mm. Due to the elasticity of the ear hook, the distance between the centroid of the projection of the sound production component 11 on the sagittal plane and the centroid of the projection of the battery compartment 13 on the sagittal plane may vary in the wearing state and the non-wearing state of the earphone. In some embodiments, in the non-wearing state, the distance (the fifth distance) between the centroid of the projection of the sound production component 11 on a specific reference plane and the centroid of the projection of the battery compartment 13 on the specific reference plane may be within a range of 16.7 mm-25 mm. In some embodiments, in the non-wearing state, the distance between the centroid of the projection of the sound production component 11 on the specific reference plane and the centroid of the projection of the battery compartment 13 on the specific reference plane may be within a range of 18 mm-23 mm. In some embodiments, in the non-wearing state, the distance between the centroid of the projection of the sound production component 11 on the specific reference plane and the centroid of the projection of the battery compartment 13 on the specific reference plane may be within a range of 19.6 mm-21.8 mm.

Taking the specific reference plane as the sagittal plane for an example, in some embodiments, when the earphone 10 is in the wearing state and the non-wearing state, a variation value of the distance between the centroid of the projection corresponding to the sound production component 11 and the centroid of the projection corresponding to the battery compartment 13 may reflect a softness of the ear hook. It can be understood that when the softness of the ear hook is too large, the overall structure and shape of the earphone 10 may be unstable, the sound production component 11 and the battery compartment 13 may not be strongly supported, the wearing stability may also be poor, and the earphone 10 may be liable to fall off. Considering that the ear hook needs to be hung at a connection between the auricle and the head, when the softness of the ear hook is too small, the earphone 10 may not be liable to deform, and when the user wears the earphone, the ear hook may stick tightly and even compress a region between the human ear and the head, affecting the wearing comfort. Accordingly, to make the user have better stability and comfort when wearing the earphone 10, in some embodiments, a ratio of the variation value of the distances between the centroid of the first projection and the centroid of the projection of the battery compartment 13 on the sagittal plane in the wearing state and the non-wearing state of the earphone 10 to the distance between the centroid of the first projection and the centroid of the projection of the battery compartment 13 on the sagittal plane in the non-wearing state of the earphone may be within a range of 0.3-0.7. In some embodiments, the ratio of the variation value of the distances between the centroid of the projection on the sagittal plane and the centroid of the projection of the battery compartment 13 on the sagittal plane in the wearing state and the non-wearing state of the earphone 10 to the distance between the centroid of the projection and the centroid of the projection of the battery compartment 13 in the non-wearing state of the earphone may be within a range of 0.45-0.68. Descriptions regarding the specific reference plane may be found elsewhere in the present disclosure.

The basic concept has been described above. Obviously, for those skilled in the art, the above detailed disclosure is only an example, and does not constitute a limitation to the present disclosure. Although not explicitly stated here, those skilled in the art may make various modifications, improvements, and amendments to the present disclosure. These alterations, improvements, and modifications are intended to be suggested by this disclosure, and are within the spirit and scope of the exemplary embodiments of this disclosure.

Moreover, certain terminology has been used to describe embodiments of the present disclosure. For example, "one embodiment", "an embodiment", and/or "some embodiments" refer to a certain feature, structure or characteristic related to at least one embodiment of the present disclosure. Therefore, it should be emphasized and noted that references to "one embodiment" or "an embodiment" or "an alternative embodiment" two or more times in different places in the present disclosure do not necessarily refer to the same embodiment. In addition, some features, structures, or features in the present disclosure of one or more embodiments may be appropriately combined.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. However, this disclosure does not mean that the present disclosure object requires more features than the features mentioned in the claims. Rather, claimed subject matter may lie in less than all features of a single foregoing disclosed embodiment.

At last, it should be understood that the embodiments described in the present disclosure are merely illustrative of the principles of the embodiments of the present disclosure. Other modifications that may be employed may be within the scope of the present disclosure. Thus, by way of example, but not of limitation, alternative configurations of the embodiments of the present disclosure may be utilized in accordance with the teachings herein. Accordingly, embodiments of the present disclosure are not limited to that precisely as shown and described.

What is claimed is:

1. An earphone, comprising:

a sound production component;

an ear hook configured to place the sound production component near an ear canal of a user without blocking an opening of the ear canal, at least a portion of the sound production component extending into a concha cavity of the user; and a microphone assembly, at least including a first microphone and a second microphone, the first microphone or the second microphone being disposed in the sound production component or the ear hook, the sound production component or the ear hook including a first sound hole and a second sound hole corresponding to the first microphone and the second microphone, respectively;

wherein a projection of the first sound hole on a sagittal plane and a projection of the second sound hole on the sagittal plane have a first distance, a ratio of the first distance to a dimension of a first projection of the sound production component on the sagittal plane along a major axis direction is 0.7-1.2.

2. The earphone of claim 1, wherein the sound production component has the first projection on the sagittal plane, an auricle of the user has a second projection on the sagittal plane, a centroid of the first projection has a second distance from a highest point of the second projection in a vertical axis direction, a ratio of the second distance to a height of the second projection in the vertical axis direction is between 0.35-0.6, the centroid of the first projection has a third distance from an end point of the second projection in a sagittal axis direction, and a ratio of the third distance to a width of the second projection in the sagittal axis direction is between 0.4-0.65.

3. The earphone of claim 1, wherein the first sound hole is closer to a mouth of the user relative to the second sound hole, a line connecting the projection of the first sound hole on the sagittal plane and the projection of the second sound hole on the sagittal plane have an intersection with a projection of an antihelix of the user on the sagittal plane, the projection of the second sound hole on the sagittal plane has a fourth distance from the intersection, and the fourth distance is 2 mm-10 mm; and/or a projection of a rear side of the sound production component on the sagittal plane has a fifth distance from a projection of an edge of the concha cavity on the sagittal plane, and the fifth distance is not greater than 13 mm.

4. The earphone of claim 3, wherein a ratio of the first distance to the fourth distance is 1.8-4.4.

5. The earphone of claim 4, wherein the ratio of the first distance to the fourth distance is 2.5-3.8.

6. The earphone of claim 3, wherein the ear hook includes a first portion and a second portion connected in sequence, the first portion is hooked between the auricle and a head of the user, the second portion extends to an anterolateral side of the auricle and is connected to the sound production component, the centroid of the first projection of the sound production component on the sagittal plane has a sixth distance from a projection of the first portion of the ear hook on the sagittal plane, and a ratio of the fourth distance to the sixth distance is 0.19-0.44.

7. The earphone of claim 1, wherein an angle between a projection of an upper side or a lower side of the sound production component on the sagittal plane and a horizontal direction is within a range of 13°-21°, and/or, an angle between a line connecting the projection of the first sound hole on the sagittal plane and the projection of the second sound hole on the sagittal plane and the projection of the upper side or the lower side on the sagittal plane is within a range of 20°-135°.

8. The earphone of claim 1, wherein an angle between a projection of an upper side or a lower side of the sound production component on the sagittal plane and a horizontal direction is within a range of 13°-21°, and/or an angle between a line connecting the projection of the first sound hole on the sagittal plane and the projection of the second sound hole on the sagittal plane and a vertical axis of the user is not greater than 90°.

9. The earphone of claim 1, wherein an angle of the sound production component relative to an ear hook plane of the ear hook is within a range of 15°-28°, and/or an angle between a line connecting the projection of the first sound hole on the sagittal plane and the projection of the second sound hole on the sagittal plane and an outer side of the sound production component is within a range of 0°-60°.

10. The earphone of claim 1, wherein an angle of the sound production component relative to an auricular plane is 40°-60°, and/or an angle between a line connecting the projection of the first sound hole on the sagittal plane and the projection of the second sound hole on the sagittal plane and an outer side of the sound production component is within a range of 0°-60°.

11. The earphone of claim 1, wherein the ear hook includes a first portion and a second portion connected in sequence, the first portion is hooked between an auricle and a head of the user, the second portion extends to an anterolateral side of the auricle and is connected to the sound production component, a midpoint of a projection of an upper side of the sound production component on the sagittal plane and a projection of an upper vertex of the ear hook on the sagittal plane have a seventh distance, and a ratio of a minimum distance between the projection of the first sound hole on the sagittal plane and a projection of a connection between the sound production component and the second portion of the ear hook on the sagittal plane to the seventh distance is not greater than 0.25.

12. The earphone of claim 1, wherein the ear hook includes a first portion and a second portion connected in sequence, the first portion is hooked between an auricle and a head of the user, the second portion extends to an anterolateral side of the auricle and is connected to the sound production component, a midpoint of a projection of a lower side of the sound production component on the sagittal plane and a projection of an upper vertex of the ear hook on the sagittal plane have an eighth distance, and a ratio of a minimum distance between the projection of the first sound hole on the sagittal plane and a projection of a connection between the sound production component and the second portion of the ear hook on the sagittal plane to the eighth distance is not greater than 0.15.

13. The earphone of claim 1, wherein the projection of the first sound hole on the sagittal plane and a projection of a front side of the sound production component on the sagittal plane has a ninth distance along a major axis direction of the first projection of the sound production component on the sagittal plane, and a ratio of the ninth distance to the dimension of the projection of the sound production component on the sagittal plane along the major axis direction is not greater than 0.75.

14. The earphone of claim 1, wherein the projection of the first sound hole on the sagittal plane and a projection of a lower side of the sound production component on the sagittal plane have a tenth distance along a minor axis direction of the first projection of the sound production component on the sagittal plane, and a ratio of the tenth distance to a dimension of the first projection of the sound production component on the sagittal plane along the minor axis direction is not greater than 0.5.

15. The earphone of claim 1, wherein the second sound hole is located on any one of an upper side, a lower side, or an outer side of the sound production component.

16. The earphone of claim 1, wherein the second sound hole is located on an outer side of the sound production component, and a distance from the second sound hole to an upper side of the sound production component is within a range of 1 mm-3 mm.

17. The earphone of claim 15, wherein a distance from the second sound hole to a front side of the sound production component is within a range of 8 mm-12 mm.

18. The earphone of claim 1, wherein an inner side of the sound production component facing an anterolateral side of an auricle of the user is provided with a sound guiding hole, and at least one pressure relief hole is provided on at least one other side of the sound production component.

19. The earphone of claim 18, wherein the at least one pressure relief hole includes a first pressure relief hole and a second pressure relief hole, the first pressure relief hole is provided on an upper side of the sound production component, and the second pressure relief hole is provided on a lower side of the sound production component.

* * * * *